US012030170B2

(12) United States Patent
Kaneko et al.

(10) Patent No.: US 12,030,170 B2
(45) Date of Patent: Jul. 9, 2024

(54) ELECTRIC POWER TOOL

(71) Applicant: MAKITA CORPORATION, Anjo (JP)

(72) Inventors: Hiroki Kaneko, Anjo (JP); Akira Mizutani, Anjo (JP); Ryosuke Otani, Anjo (JP); Shunpei Yamaji, Anjo (JP); Junya Ishikawa, Anjo (JP); Fumiyoshi Saito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 324 days.

(21) Appl. No.: 17/640,643

(22) PCT Filed: Aug. 6, 2020

(86) PCT No.: PCT/JP2020/030217
§ 371 (c)(1),
(2) Date: Sep. 15, 2022

(87) PCT Pub. No.: WO2021/044799
PCT Pub. Date: Mar. 11, 2021

(65) Prior Publication Data

US 2023/0011055 A1 Jan. 12, 2023

(30) Foreign Application Priority Data

Sep. 6, 2019 (JP) ................................ 2019-162965

(51) Int. Cl.
*B25F 5/00* (2006.01)
*B24B 47/12* (2006.01)
*B25F 5/02* (2006.01)

(52) U.S. Cl.
CPC ............. *B25F 5/026* (2013.01); *B24B 47/12* (2013.01)

(58) Field of Classification Search
CPC ........................................................ B25F 5/026
See application file for complete search history.

(56) References Cited

U.S. PATENT DOCUMENTS

| | | | |
|---|---|---|---|
| 5,005,295 | A | 4/1991 | Fushiya |
| 5,138,243 | A | 8/1992 | Kress et al. |

(Continued)

FOREIGN PATENT DOCUMENTS

| | | | |
|---|---|---|---|
| CN | 102039582 | A | 5/2011 |
| CN | 104669209 | A | 6/2015 |

(Continued)

OTHER PUBLICATIONS

Nov. 2, 2020 International Search Report issued in International Patent Application No. PCT/JP2020/030217.

(Continued)

*Primary Examiner* — Eyamindae C Jallow
(74) *Attorney, Agent, or Firm* — Oliff PLC

(57) ABSTRACT

The disclosure discloses an electric power tool. The electric power tool may include a motor, a power transmission mechanism connected to the motor, a housing that houses the motor and the power transmission mechanism, an end tool holder to which an end tool is configured to be attached and from which the end tool is configured to be detached, and connected to the power transmission mechanism, and a handle attached to the housing. The electric power tool may be configured to prohibit rotation of the motor when a user is not gripping the handle.

16 Claims, 43 Drawing Sheets

(56) References Cited

U.S. PATENT DOCUMENTS

| | | | | |
|---|---|---|---|---|
| 5,170,851 | A | 12/1992 | Kress et al. | |
| 5,196,747 | A | 3/1993 | Kress et al. | |
| 2005/0161241 | A1 | 7/2005 | Frauhammer et al. | |
| 2011/0088922 | A1 | 4/2011 | Hirayama et al. | |
| 2012/0317821 | A1 | 12/2012 | Tsuchiya et al. | |
| 2013/0162188 | A1 * | 6/2013 | Koeder | B23B 45/001 318/434 |
| 2014/0231113 | A1 * | 8/2014 | Steurer | B25F 5/00 173/1 |
| 2015/0144368 | A1 | 5/2015 | Machida | |
| 2018/0126534 | A1 | 5/2018 | Iida et al. | |
| 2018/0272494 | A1 | 9/2018 | Schadow et al. | |
| 2019/0232478 | A1 | 8/2019 | Zawisza et al. | |
| 2019/0239445 | A1 | 8/2019 | Iwase | |
| 2019/0262972 | A1 | 8/2019 | Nakamura et al. | |

FOREIGN PATENT DOCUMENTS

| | | | | |
|---|---|---|---|---|
| CN | 108015720 | A | 5/2018 | |
| CN | 110181369 | A | 8/2019 | |
| DE | 40 19 894 | A1 | 4/1991 | |
| JP | H02-303776 | A | 12/1990 | |
| JP | 2002-205285 | A | 7/2002 | |
| JP | 2005-138239 | A | 6/2005 | |
| JP | 2011-173219 | A | 9/2011 | |
| JP | 2013-233636 | A | 11/2013 | |
| JP | 2013-233637 | A | 11/2013 | |
| JP | 2019-135075 | A | 8/2019 | |
| KR | 10-1408278 | B1 | 6/2014 | |
| WO | WO-2009065681 | A2 * | 5/2009 | B25F 5/006 |
| WO | 2017/051892 | A1 | 3/2017 | |
| WO | WO-2017051892 | A1 * | 3/2017 | |

OTHER PUBLICATIONS

Nov. 2, 2020 Written Opinion issued in International Patent Application No. PCT/JP2020/030217.

Apr. 12, 2023 Office Action issued in Chinese Patent Application No. 202080062316.7.

Apr. 25, 2023 Office Action issued in Japanese Patent Application No. 2021-543664.

* cited by examiner

ELECTRIC POWER TOOL

TECHNICAL FIELD

The technique disclosed herein relates to an electric power tool.

BACKGROUND

Japanese Patent Application Publication No. 2005-138239 describes an electric power tool comprising; a motor; a power transmission mechanism connected to the motor; a housing that houses the motor and the power transmission mechanism; an end tool holder to which an end tool is configured to be attached and from which the end tool is configured to be detached, and connected to the power transmission mechanism; and a handle attached to the housing.

SUMMARY

Technical Problem

When a user uses an electric power tool, it is preferable that the user performs a work while holding the electric power tool stably by gripping a handle. However, in the electric power tool of Japanese Patent Application Publication No. 2005-138239, there is a possibility that the electric power tool is used while the handle is not gripped. The present disclosure provides a technique that can prevent an electric power tool from being used while its handle is not gripped.

Solution to Technical Problem

The disclosure discloses an electric power tool. The electric power tool may comprise a motor; a power transmission mechanism connected to the motor; a housing that houses the motor and the power transmission mechanism; an end tool holder to which an end tool is configured to be attached and from which the end tool is configured to be detached, and connected to the power transmission mechanism; and a handle attached to the housing. The electric power tool may be configured to prohibit rotation of the motor when a user is not gripping the handle.

According to the above configuration, since the rotation of the motor is prohibited when the user is not gripping the handle, it is possible to prevent the electric power tool from being used while the handle is not gripped.

DESCRIPTION OF EMBODIMENTS

Figure 1:
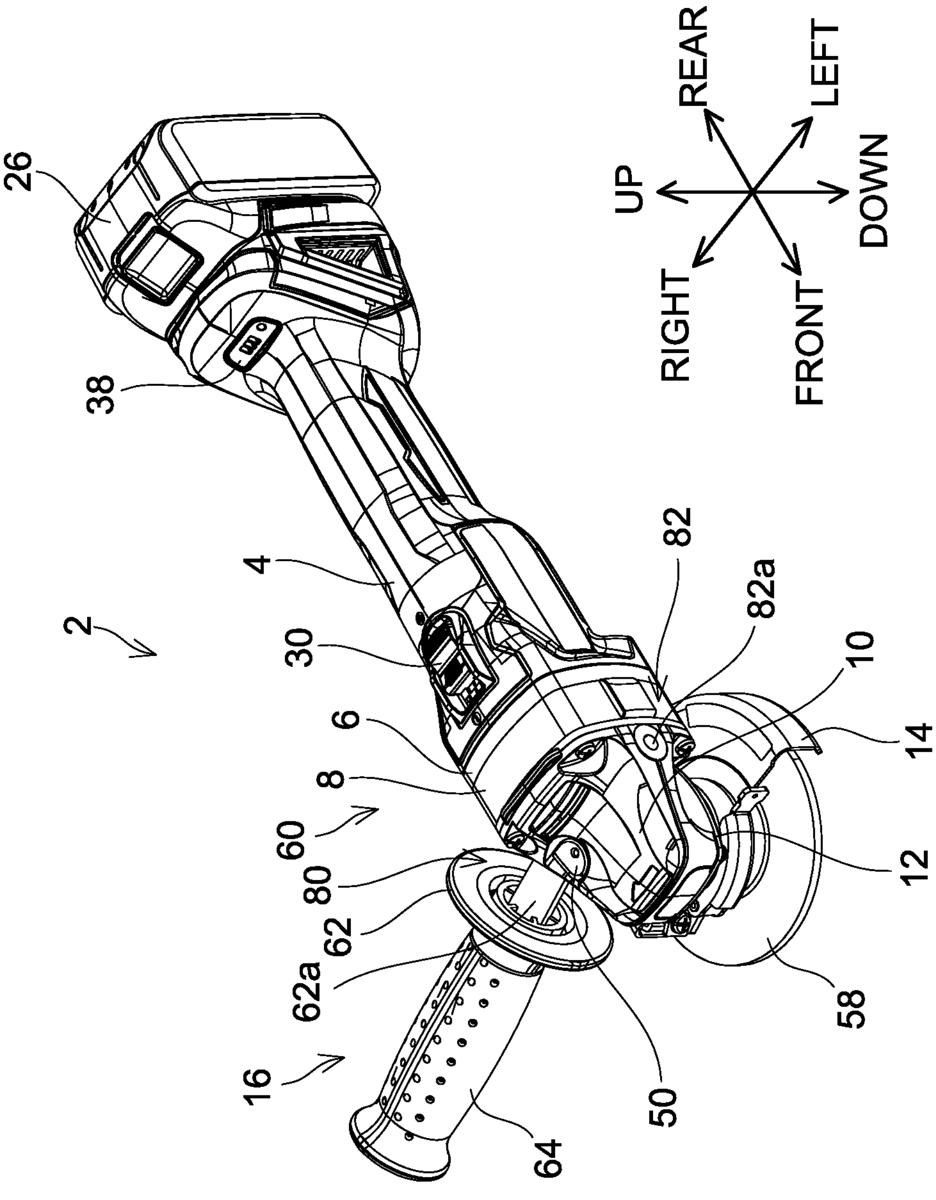
FIG. 1 illustrates a perspective view of an electric power tool 2 of a first embodiment viewed from the front left upper side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved electric power tools as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, an electric power tool may comprise: a motor; a power transmission mechanism connected to the motor; a housing that houses the motor and the power transmission mechanism; an end tool holder to which an end tool is configured to be attached and from which the end tool is configured to be detached, and connected to the power transmission mechanism; and a handle attached to the housing. The electric power tool may be configured to prohibit rotation of the motor when a user is not gripping the handle.

According to the above configuration, since the rotation of the motor is prohibited when the user is not gripping the handle, it is possible to prevent the electric power tool from being used while the handle is not gripped.

In one or more embodiments, the electric power tool may further comprise an intermediate member configured to move between a first position and a second position. The intermediate member may be in the first position when the user is not gripping the handle, and move from the first position to the second position in response to a manipulation performed by the user while the user is gripping the handle. The electric power tool may be configured to prohibit the rotation of the motor when the intermediate member is in the first position, and allow the rotation of the motor when the intermediate member is in the second position.

According to the above configuration, the rotation of the motor can be prohibited when the user is not gripping the handle, and the rotation of the motor can be allowed in response to the manipulation performed by the user while the user is gripping the handle.

In one or more embodiments, the handle may comprise a handle body, and a handle manipulation member disposed on the handle body and configured to be manipulated by the user. The intermediate member may move from the first position to the second position in conjunction with a manipulation to the handle manipulation member by the user.

According to the above configuration, with a simple configuration, the rotation of the motor can be prohibited when the user is not gripping the handle, and the rotation of the motor can be allowed in response to the manipulation performed by the user while the user is gripping the handle.

In one or more embodiments, one of the handle and the housing may comprise an insertion pin having a non-circular shape. The other of the handle and the housing may comprise an insertion hole that accepts the insertion pin such that the insertion pin is unable to rotate. The electric power tool may further comprise a lock member that prevents the insertion pin from coming out of the insertion hole.

For example, in the configuration in which the handle is attached to the housing by screwing the handle onto the housing is employed, a position of the handle manipulation member when the handle is attached to the housing is not constant and there is a possibility that the handle manipulation member is disposed at a position which makes it difficult for the user to manipulate the handle manipulation member. According to the above-described configuration, since the position of the handle manipulation member when the handle is attached to the housing is constant, it is possible to arrange the handle manipulation member at a position for the user to easily manipulate the handle manipulation member.

In one or more embodiments, the electric power tool may further comprise a control unit configured to control an operation of the motor, and a detection sensor connected to the control unit and configured to detect a movement of the intermediate member. The control unit may be configured to prohibit the rotation of the motor when the detection sensor does not detect that the intermediate member has moved from the first position to the second position, and allow the rotation of the motor when the detection sensor detects that the intermediate member has moved from the first position to the second position.

According to the above configuration, since the state in which the rotation of the motor is prohibited and the state in which the rotation of the motor is allowed are switched in the control unit, it is possible to further simplify the mechanical configuration of the electric power tool.

In one or more embodiments, the detection sensor may be a non-contact type detection sensor.

According to the above configuration, it is possible to suppress the detection sensor from failing due to vibration and/or impact being transmitted to the detection sensor via the intermediate member.

In one or more embodiments, the detection sensor and the intermediate member may be disposed in the housing. The handle may further comprise a relay member that moves the intermediate member from the first position to the second position in conjunction with the manipulation to the handle manipulation member by the user.

According to the above configuration, since both the detection sensor and the intermediate member are disposed in the housing, it is possible to accurately align the detection sensor and the intermediate member with each other, by which detection accuracy of the detection sensor can be enhanced.

In one or more embodiments, the detection sensor may comprise a light emitting element and a light receiving element corresponding to the light emitting element.

According to the above configuration, it is possible to realize a detection sensor having a compact size and high detection accuracy.

In one or more embodiments, the light emitting element and the light receiving element may be arranged to face each other. The intermediate member may obstruct a space between the light emitting element and the light receiving element when the intermediate member is in one of the first position and the second position. The intermediate member may not obstruct the space between the light emitting element and the light receiving element when the intermediate member is in the other of the first position and the second position.

According to the above configuration, movement of the intermediate member from the first position to the second position can be detected with a simple configuration.

In one or more embodiments, the light emitting element and the light receiving element may be arranged to be oriented in a same direction. Light emitted by the light emitting element may be reflected by the intermediate member and received by the light receiving element when the intermediate member is in one of the first position and the second position. The light emitted by the light emitting element may not be received by the light receiving element when the intermediate member is in the other of the first position and the second position.

According to the above configuration, the movement of the intermediate member from the first position to the second position can be detected with a simple configuration.

In one or more embodiments, the detection sensor may be a contact type detection sensor. The intermediate member may press the detection sensor when the intermediate member is in one of the first position and the second position. The intermediate member may not press the detection sensor when the intermediate member is in the other of the first position and the second position.

According to the above configuration, it is possible to further simplify the configuration of an electric system of the electric power tool.

In one or more embodiments, the intermediate member may be swingably supported by the housing. The handle may be fixed to the intermediate member. The intermediate member may swing from the first position to the second position by the user swinging the handle with respect to the housing.

According to the above configuration, with a simple configuration, it is possible to prohibit the rotation of the motor when the user is not gripping the handle, and it is possible to allow the rotation of the motor when the user has swung the handle by gripping the handle.

In one or more embodiments, the intermediate member may be slidably supported by the housing. The electric power tool may further comprise a relay member swingably supported by the housing, and a bias member that biases the intermediate member in a direction to press the intermediate member against the relay member. The handle may be fixed to the relay member. The relay member may swing and the intermediate member may slide from the first position to the second position by the user swinging the handle with respect to the housing.

According to the above configuration, the movement of the intermediate member from the first position to the second position can be detected with a simple configuration.

In one or more embodiments, the relay member may be swingably supported by the housing about a first swing axis and a second swing axis orthogonal to the first swing axis.

According to the above configuration, the user can move the intermediate member from the first position to the second position by swinging the handle in a desired direction.

In one or more embodiments, the electric power tool may further comprise a main manipulation member configured to move between an on position and an off position according to a manipulation by the user. The electric power tool may be configured to rotate the motor when the main manipulation member is in the on position and stop the rotation of the motor when the main manipulation member is in the off position. A movement of the main manipulation member from the off position to the on position may be prohibited when the intermediate member is in the first position. The movement of the main manipulation member from the off position to the on position may be allowed when the intermediate member is in the second position.

In the above configuration, when the movement of the main manipulation member from the off position to the on position is prohibited, the rotation of the motor is prohibited, and when the movement of the main manipulation member from the off position to the on position is allowed, the rotation of the motor is allowed. According to the above configuration, with a simple configuration, it is possible to prohibit the rotation of the motor when the user is not gripping the handle, and it is possible to allow the rotation of the motor in response to the manipulation performed by the user while the user is gripping the handle.

In one or more embodiments, the electric power tool may further comprise a battery detachably attached to the housing and configured to supply power to the motor.

According to the above configuration, it is possible to supply power to the motor without connecting the electric power tool to an external power source with a power cable.

In one or more embodiments, the electric power tool may be configured to use a grinding wheel as the end tool. The electric power tool may be configured to function as a grinder.

According to the above configuration, it is possible to prevent the electric power tool functioning as the grinder from being used while the handle is not gripped.

In one or more embodiments, the housing may include a grip. The user may be able to use the electric power tool with one hand gripping the grip and the other hand gripping the handle.

According to the above configuration, when using the electric power tool, the user can stably hold the electric power tool by gripping the grip with his/her one hand and gripping the handle with the other hand.

First Embodiment

As illustrated in FIG. 1, an electric power tool 2 of the present embodiment is, for example, a grinder. The electric power tool 2 includes a motor housing 4, a motor cover 6, a spacer housing 8, a gear housing 10, a bearing box 12, a wheel cover 14, and a side handle 16. In the following explanation, the longitudinal direction of the motor housing 4 is referred to as a front-rear direction, a direction orthogonal to the front-rear direction is referred to as a left-right direction, a direction orthogonal to the front-rear direction and the left-right direction is referred to as an up-down direction.

Figure 2:
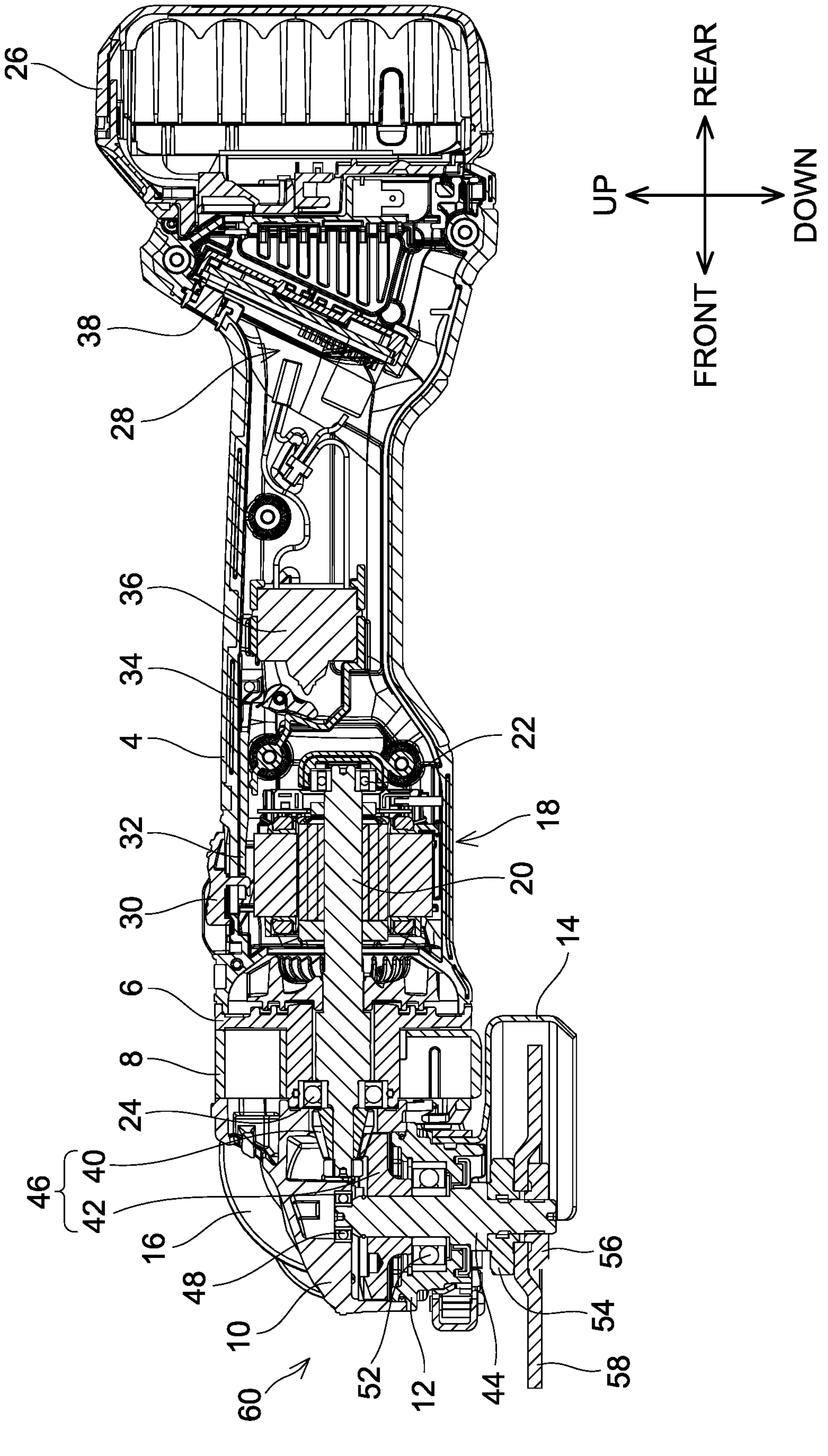
FIG. 2 illustrates a vertical cross-sectional view of the electric power tool 2 of the first embodiment.

As illustrated in FIG. 2, the motor 18 that is a prime mover is housed in a front portion of the motor housing 4. The motor 18 is, for example, a brushless DC motor of an inner rotor type. The motor 18 has an output shaft 20 extending in the front-rear direction. The motor cover 6 is attached to the front end of the motor housing 4. The output shaft 20 is rotatably supported by the motor housing 4 via a bearing 22, and is rotatably supported by the motor cover 6 via a bearing 24. A battery 26 is attached to the rear end of the motor housing 4. The battery 26 is a rechargeable secondary battery, such as, for example, a lithium-ion battery. The battery 26 is a slide-type battery that is configured to be attached and detached by sliding it in the up-down direction with respect to the motor housing 4. The control unit 28 is housed in a rear portion of the motor housing 4. Power supplied from the battery 26 is supplied to the motor 18 via the control unit 28.

A main manipulation member 30 which is configured to slide in the front-rear direction is disposed on the front upper surface of the motor housing 4. The main manipulation member 30 is configured to move between an on position on the front side and an off position on the rear side according to a manipulation by the user. A first link member 32 is engaged with the main manipulation member 30. The first link member 32 is supported by the motor housing 4 such that the first link member 32 can slide in the front-rear direction. The upper end of a second link member 34 is rotatably connected to the rear end of the first link member 32. The second link member 34 is supported by the motor housing 4 such that the second link member 34 can rotate with the left-right direction as its rotation axis. The lower end of the second link member 34 is disposed to face the main switch 36. The main switch 36 is connected to the control unit 28. When the main manipulation member 30 moves from the off position to the on position, the first link member 32 moves forward, and the second link member 34 rotates in a direction in which its lower end moves rearward. Consequently, the lower end of the second link member 34 makes contact with the main switch 36, and the main switch 36 outputs an on signal to the control unit 28. When the control unit 28 receives the on signal from the main switch 36, the control unit 28 supplies power from the battery 26 to the motor 18. Consequently, the motor 18 rotates the output shaft 20. When the main manipulation member 30 moves from the on position to the off position, the first link member 32 moves rearward and the second link member 34 rotates in a direction in which its lower end moves frontward. Consequently, the lower end of the second link member 34 is separated away from the main switch 36, and the main switch 36 outputs an off signal to the control unit 28. When the control unit 28 receives the off signal from the main switch 36, the control unit 28 stops the supply of the power from the battery 26 to the motor 18. Consequently, the motor 18 stops the rotation of the output shaft 20.

A display 38 is disposed on the rear upper surface of the motor housing 4. The display 38 is connected to the control unit 28. The display 38 notifies the user of the operating state of the electric power tool 2 and remaining battery charge of the battery 26 by changing its display according to the operating state of the electric power tool 2 and the remaining battery charge of the battery 26.

A spacer housing 8 is attached in front of the motor cover 6. The gear housing 10 is attached in front of the spacer housing 8. A first bevel gear 40 and a second bevel gear 42 that are disposed to mesh with each other are housed in the gear housing 10. The first bevel gear 40 is fixed to the front end of the output shaft 20. The second bevel gear 42 is fixed to the upper end of a spindle 44 extending in the up-down direction. Hereinafter, the first bevel gear 40 and the second bevel gear 42 are collectively and simply referred to as the bevel gear 46. The bevel gear 46 is a reduction mechanism configured to reduce the rotation of the motor 18 and transmit the same to the spindle 44, and it can be referred to as a power transmission mechanism. The gear housing 10 rotatably supports the upper end of the spindle 44 via a bearing 48. As illustrated in FIG. 1, a shaft lock 50 is disposed on the upper surface of the gear housing 10. When the user manipulates the shaft lock 50 and press it downward, the rotation of the second bevel gear 42 is prohibited and the rotation of the spindle 44 is thereby prohibited.

As illustrated in FIG. 2, the bearing box 12 is attached below the gear housing 10. The bearing box 12 rotatably supports the spindle 44 via a bearing 52. The spindle 44 is configured to rotate about a rotation axis along the up-down direction with respect to bearing box 12. A grinding wheel 58 is configured to be attached to the lower end of the spindle 44 via an inner flange 54 and an outer flange 56. The inner flange 54 is fitted to the spindle 44. The grinding wheel 58 is attached to the spindle 44 from below the inner flange 54 and is fitted to the inner flange 54. The outer flange 56 is screwed from the lower end of the spindle 44 onto the spindle 44 to hold the grinding wheel 58 between outer flange 56 and the inner flange 54. In the electric power tool 2, when the motor 18 rotates, the grinding wheel 58 rotates together with the spindle 44 about the rotation axis, by which grinding of a workpiece can be performed. The spindle 44 may also be referred to as an end tool holder configured to hold the grinding wheel 58 which is an end tool. In the present embodiment, the motor housing 4, the motor cover 6, the spacer housing 8, the gear housing 10 and the bearing box 12 may collectively and simply be referred to as a housing 60.

A wheel cover 14 is detachably attached to the bearing box 12. The wheel cover 14 is formed into a shape that at least partially covers the grinding wheel 58 when the wheel cover 14 is attached to the electric power tool 2. It can also be said that the wheel cover 14 has a shape which at least partially covers the spindle 44 when the wheel cover 14 is attached to the electric power tool 2. The wheel cover 14 prevents powder generated in grinding from being scattered to the user side when the grinding wheel 58 grinds the workpiece.

As illustrated in FIG. 1, the side handle 16 is detachably attached to the gear housing 10. When the user uses the electric power tool 2, the user grips the motor housing 4 with his/her one hand and grips the side handle 16 with the other hand, by which the user can stably hold the electric power tool 2.

Figure 3:
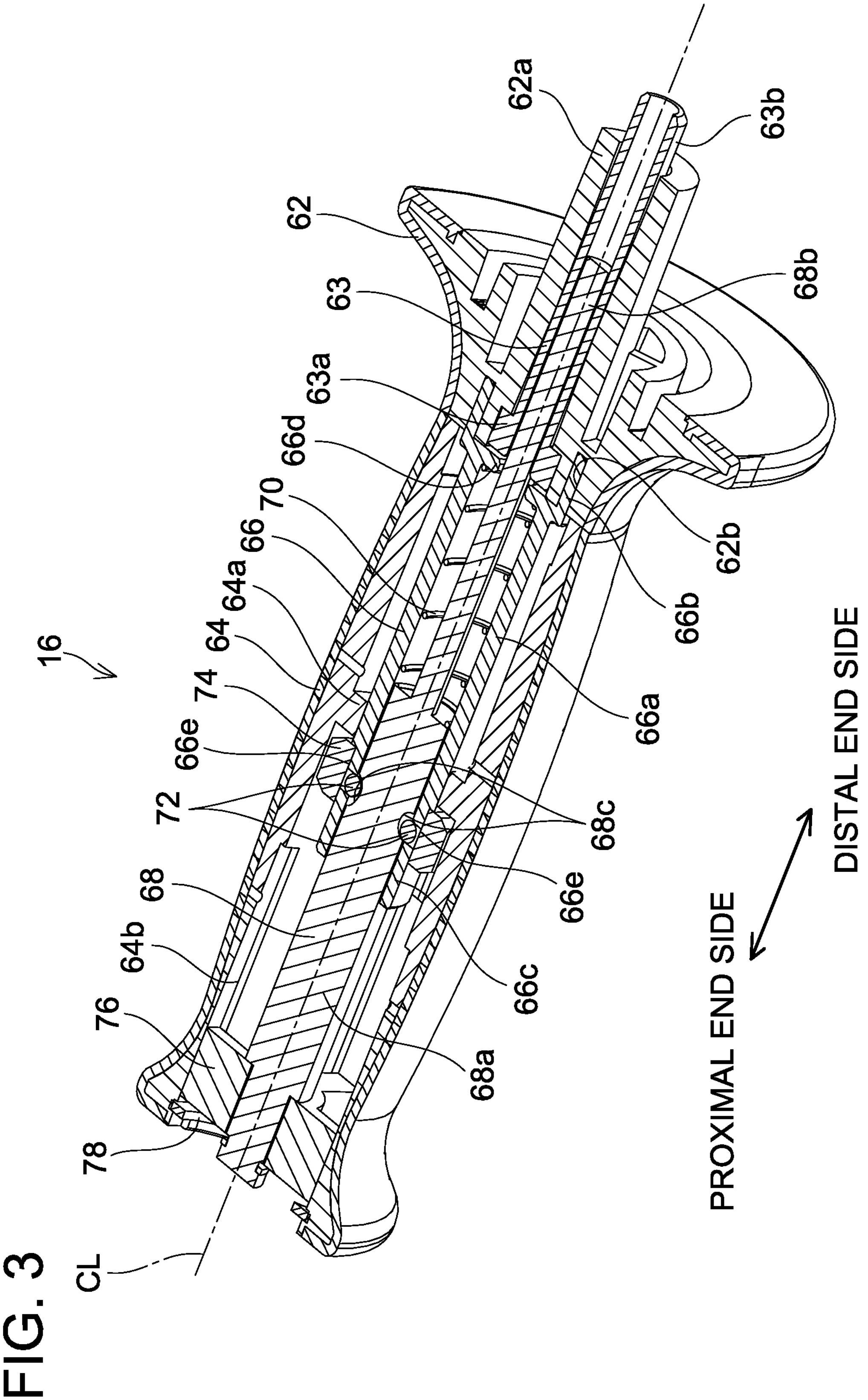
FIG. 3 illustrates a perspective cross-sectional view of a side handle 16 of the electric power tool 2 of the first embodiment in the state in which a protrusion **68*b* of an inner pin 68 has retracted into the interior of a hollow bolt 63**.

As illustrated in FIG. 3, the side handle 16 includes a flange portion 62 and a handle portion 64. The handle portion 64 is supported by the flange portion 62 such that the handle portion 64 can rotate about a central axis CL with respect to the flange portion 62. In the following explanation, along the central axis CL, a side where the flange portion 62 is when viewed from the handle portion 64 is referred to as the distal end side, and the opposite side of the distal end side is referred to as the proximal end side.

The flange portion 62 includes a cylindrical portion **62*a* which protrudes along the central axis CL toward the distal end side in a substantially cylindrical shape. A hollow bolt 63 is housed inside the flange portion 62. A head portion 63*a* of the hollow bolt 63 is non-rotatably supported by the flange portion 62, and a shaft portion 63*b* protrudes beyond the end of the cylindrical portion 62*a* to the outside. An external thread is defined on the outer peripheral surface of the shaft portion 63*b* of the hollow bolt 63**.

Figure 4:
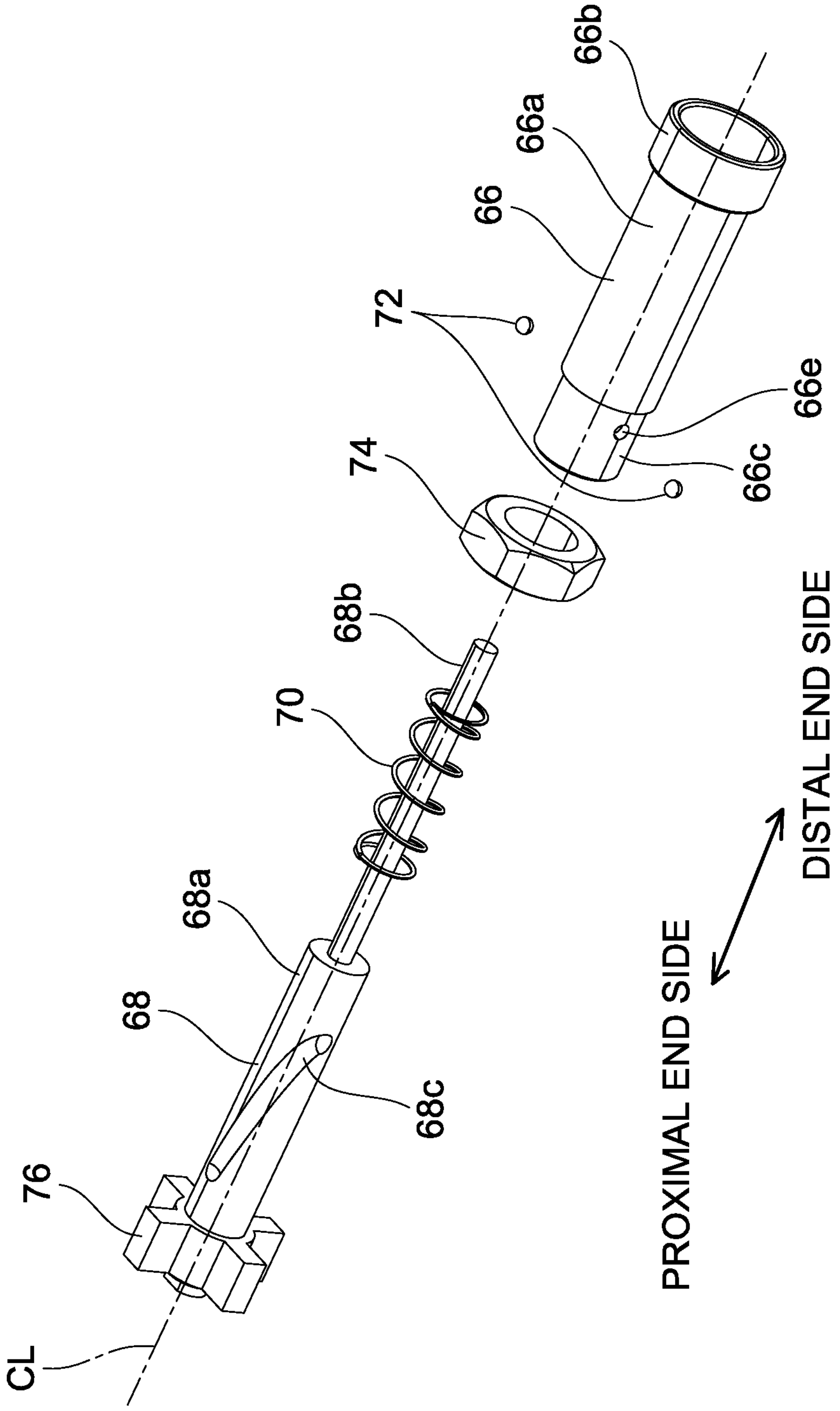
FIG. 4 illustrates exploded perspective views of an inner sleeve 66, the inner pin 68, a compression spring 70, balls 72, a nut 74 and a guide member 76 of the side handle 16 of the electric power tool 2 of the first embodiment.

An inner sleeve 66, an inner pin 68, a compression spring 70, balls 72, a nut 74, and the guide member 76 are housed inside the handle portion 64. As illustrated in FIG. 4, the inner sleeve 66 includes a base portion **66*a* having a substantially cylindrical shape, an engagement portion 66*b* that is disposed at the end of the base portion 66*a* on the distal end side and has a substantially cylindrical shape having a larger inner diameter than the base portion 66*a*, and a screw portion 66*c* disposed at the end of the base portion 66*a* on the proximal end side, and having a substantially cylindrical shape having the same inner diameter as the base portion 66***a*. As illustrated in FIG. 3, the engagement portion 66*b* is non-rotatably fitted in a fitting groove 62*b* defined in the flange portion 62. Therefore, the inner sleeve 66 is non-rotatably supported by the flange portion 62. A circular spring seat portion 66*d* is defined inside the engagement portion 66*b* at the end of the engagement portion 66*b* on the proximal end side. The compression spring 70 is housed in the base portion 66*a*. An external thread is defined on the outer peripheral surface of the screw portion 66*c*. Further, bole holes 66*e* of which diameters are slightly greater than the balls 72 and through which the balls 72 can pass through are defined in the screw portion 66*c*.

As illustrated in FIG. 4, the inner pin 68 includes a base portion 68*a* having a substantially column shape, and a protrusion 68*b* having a substantially column shape and extending from the end of the base portion 68*a* on the distal end side. A guide member 76 is non-rotatably fitted to the end of the base portion 68*a* on the proximal end side. An outer diameter of the base portion 68*a* is slightly smaller than inner diameters of the base portion 66*a* and the screw portion 66*c* of the inner sleeve 66. An outer diameter of the protrusion 68*b* is slightly smaller than an inner diameter of the hollow bolt 63 (see FIG. 3). A ball groove 68*c* that spirally extends is defined in the outer circumferential surface of the base portion 68*a*. As illustrated in FIG. 3, the inner pin 68 is inserted into the inner sleeve 66 such that the protrusion 68*b* partially enters the interior of the hollow bolt 63 and the base portion 68*a* partially enters the interiors of the base portion 66*a* and the screw portion 66*c* of the inner sleeve 66. With the inner pin 68 inserted into the inner sleeve 66, the end of the compression spring 70 on the distal end side makes contact with the spring seat portion 66*d* of the inner sleeve 66 and the end of the compression spring 70 on the proximal end side makes contact with the base portion 68*a* of the inner pin 68. The compression spring 70 biases the inner pin 68 with respect to the inner sleeve 66 in the direction in which the inner pin 68 comes out of the inner sleeve 66. The balls 72 are housed in the ball holes 66*e* such that the balls 72 partially enter the ball groove 68*c* through the ball holes 66*e* with the inner pin 68 inserted into the inner sleeve 66. Further, the nut 74 is screwed onto the screw portion 66*c* to cover the balls 72 housed in the ball holes 66*e* from the outside.

A holding portion 64*a* having a substantially annular shape for slidably holding the base portion 66*a* of the inner sleeve 66 and guide grooves 64*b* arranged corresponding to the guide member 76 are disposed on the inner surface of the handle portion 64. An inner diameter of the holding portion 64*a* is slightly larger than the outer diameter of the base portion 66*a* of the inner sleeve 66 and is smaller than the outer diameter of the nut 74. Therefore, the nut 74 also functions as a retainer to prevent the handle portion 64 from coming out of the flange portion 62. The guide grooves 64*b* extend substantially parallel to the central axis CL. The inner pin 68 is inserted into the handle portion 64 such that the guide member 76 enters the guide grooves 64*b*. Therefore, the inner pin 68 is supported by the handle portion 64 such that the inner pin 68 cannot rotate about the central axis CL and the inner pin 68 can move along the central axis CL. A retaining member 78 which prevents the inner pin 68 from coming out of the handle portion 64 is disposed at the end of the handle portion 64.

Figure 5:
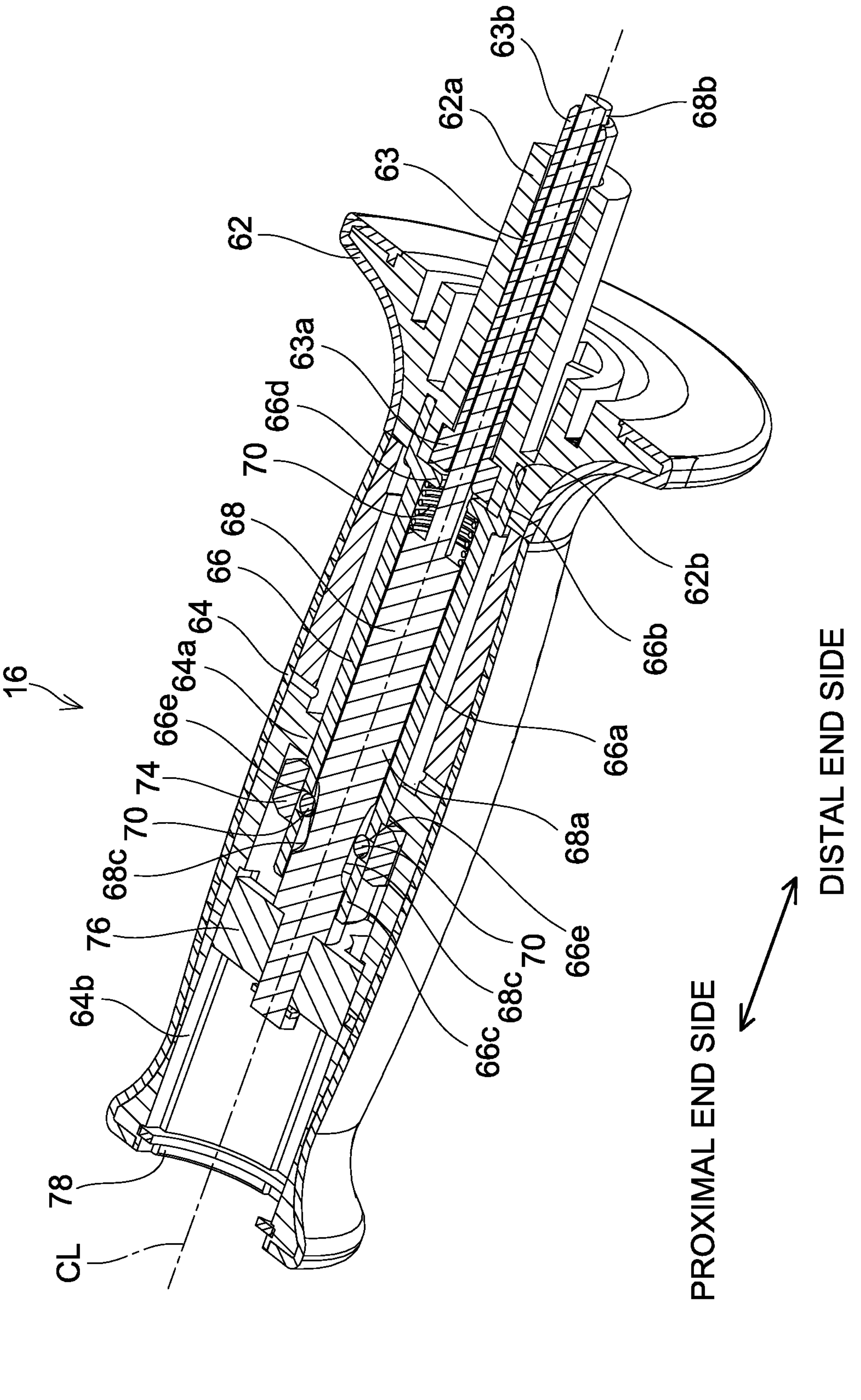
FIG. 5 illustrates a perspective cross-sectional view of the side handle 16 of the electric power tool 2 of the first embodiment in the state in which the protrusion **68*b* of the inner pin 68 protrudes beyond the end of the hollow bolt 63**.

At the side handle 16, when the user grips and rotates the handle portion 64 forward with respect to the flange portion 62, the inner pin 68 rotates forward with respect to the inner sleeve 66. In this case, the inner pin 68 moves toward the distal end side along the central axis CL with respect to the inner sleeve 66 such that the balls 72 supported in the ball holes 66*e* of the inner sleeve 66 move along the ball groove 68*c* of the inner pin 68. Consequently, as illustrated in FIG. 5, the inner pin 68 moves in the direction further entering the interior of the inner sleeve 66 against the biasing force of the compression spring 70, and the protrusion 68*b* of the inner pin 68 protrudes beyond the end of the hollow bolt 63 to the outside. The position of the inner pin 68 illustrated in FIG. 5 is also referred to as a protruding position. From this state, when the user releases his/her hand from the handle portion 64, the inner pin 68 is biased in the direction coming out of the inner sleeve 66 by the compression spring 70, and the inner pin 68 and the handle portion 64 rotate in the opposite direction with respect to the flange portion 62. Thus, as illustrated in FIG. 3, the inner pin 68 moves toward the proximal end side along the central axis CL with respect to the inner sleeve 66, and the protrusion 68*b* of the inner pin 68 retracts to the interior of the hollow bolt 63. The position of the inner pin 68 illustrated in FIG. 3 may also be referred to as a retracted position.

Figure 6:
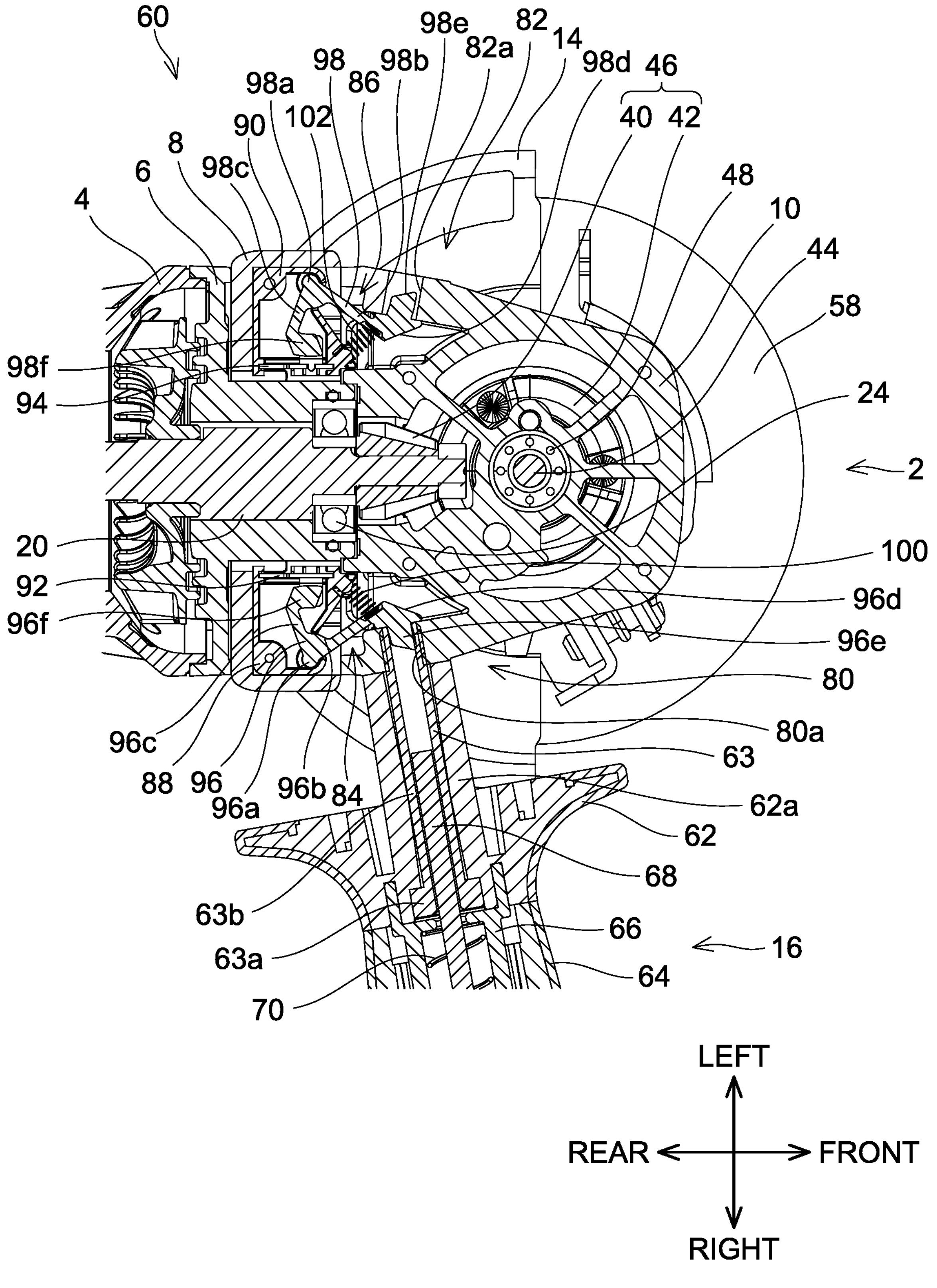
FIG. 6 illustrates a horizontal cross-sectional view of internal structures of handle attachment portions 80, 82 and their vicinity in the electric power tool 2 of the first embodiment, in the state in which the side handle 16 is attached to a handle attachment portion 80 and the user has not rotated a handle portion 64 of the side handle 16 with respect to a flange portion 62.

As illustrated in FIG. 6, handle attachment portions 80, 82 are disposed at the gear housing 10. The handle attachment portion 80 is disposed at the right surface of the gear housing 10, and the handle attachment portion 82 is disposed at the left surface of the gear housing 10. The handle attachment portions 80, 82 include handle attachment holes 80*a*, 82*a*. The handle attachment holes 80*a*, 82*a* penetrate the gear housing 10 from the outside to the inside, and internal threads corresponding to the external screw of the hollow bolt 63 of the side handle 16 are defined in the inner circumferential surfaces. The side handle 16 can be attached to the handle attachment portion 80 by screwing the hollow bolt 63 onto the handle attachment hole 80*a*, and it can also be attached to the handle attachment portion 82 by screwing the hollow bolt 63 onto the handle attachment hole 82*a*.

Sensor units 84, 86 are housed in the spacer housing 8. The sensor unit 84 is disposed corresponding to the handle attachment portion 80, and the sensor unit 86 is disposed corresponding to the handle attachment portion 82. The sensor units 84, 86 are connected to the control unit 28. The sensor unit 86 has the same configuration as the sensor unit 84 except that it is mirror-reversed. Hereinafter, the configurations of the sensor units 84 and 86 will be explained with reference to FIGS. 7 to 9, which illustrate the configuration of the sensor unit 84.

Figure 7:
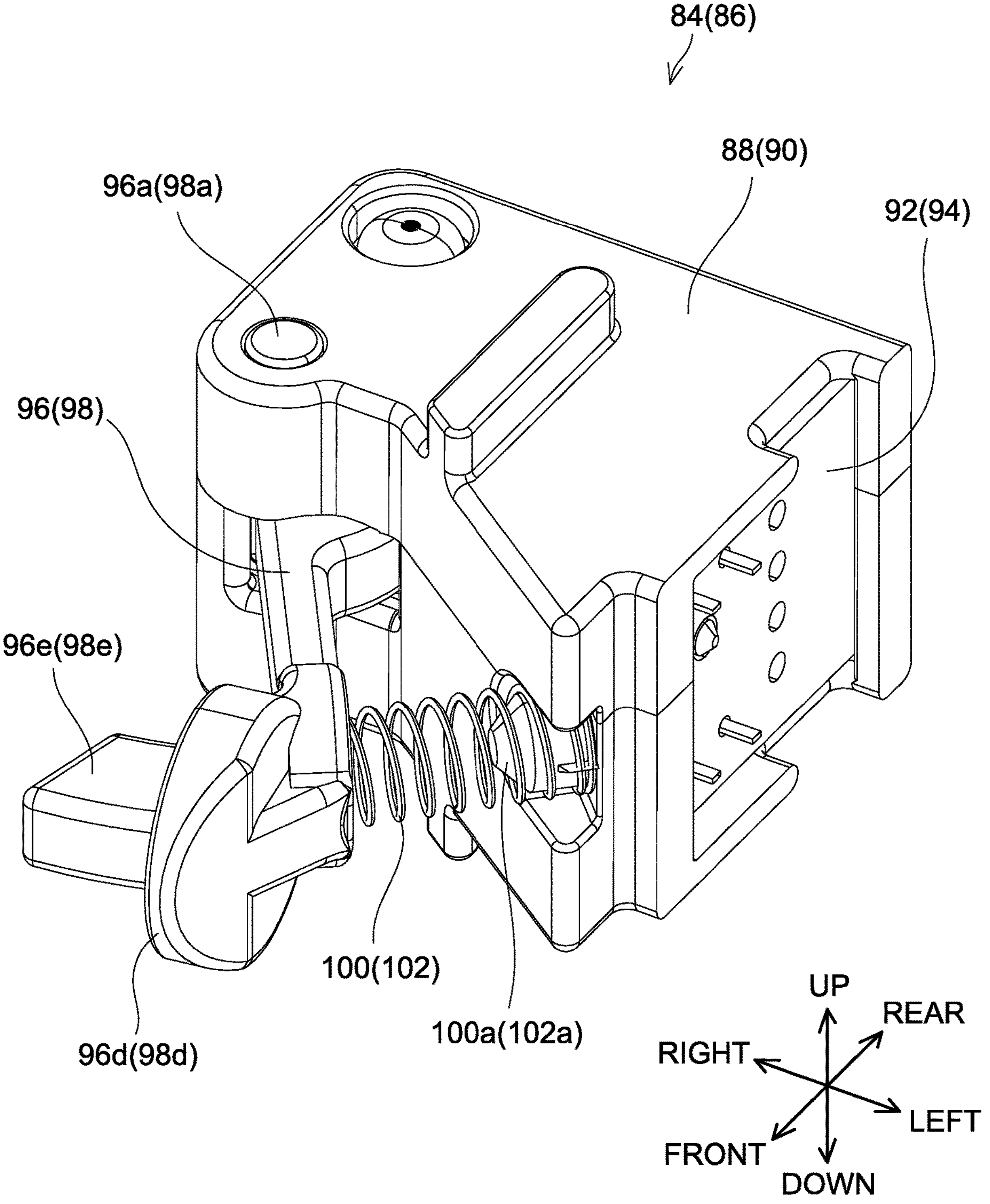
FIG. 7 illustrates a perspective view of a sensor unit 84 of the electric power tool 2 of the first embodiment.
Figure 8:
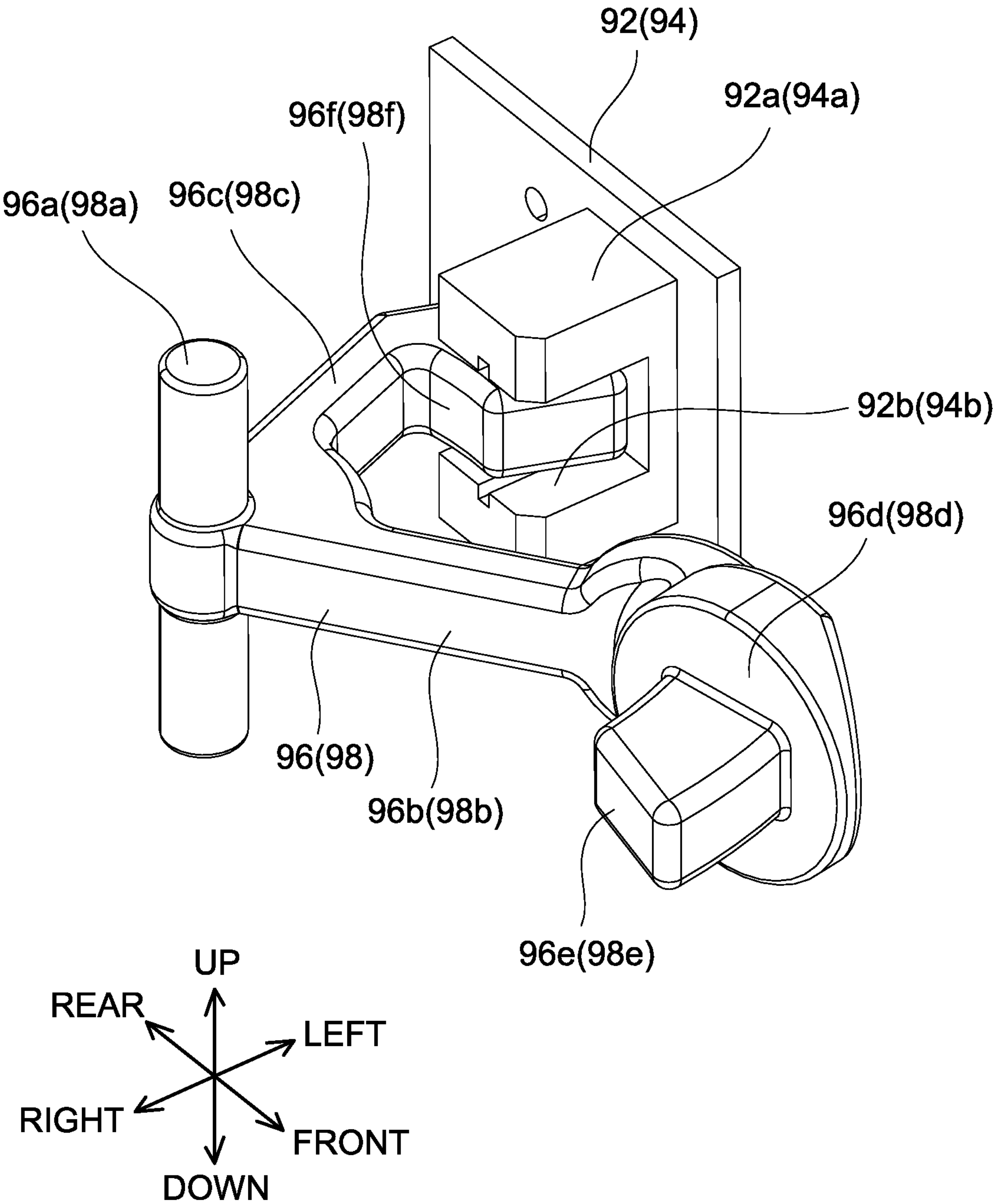
FIG. 8 illustrates perspective views of a swing member 96 and a detection sensor 92 in the sensor unit 84 of the electric power tool 2 of the first embodiment, in the state in which the swing member 96 is in a first position.
Figure 9:
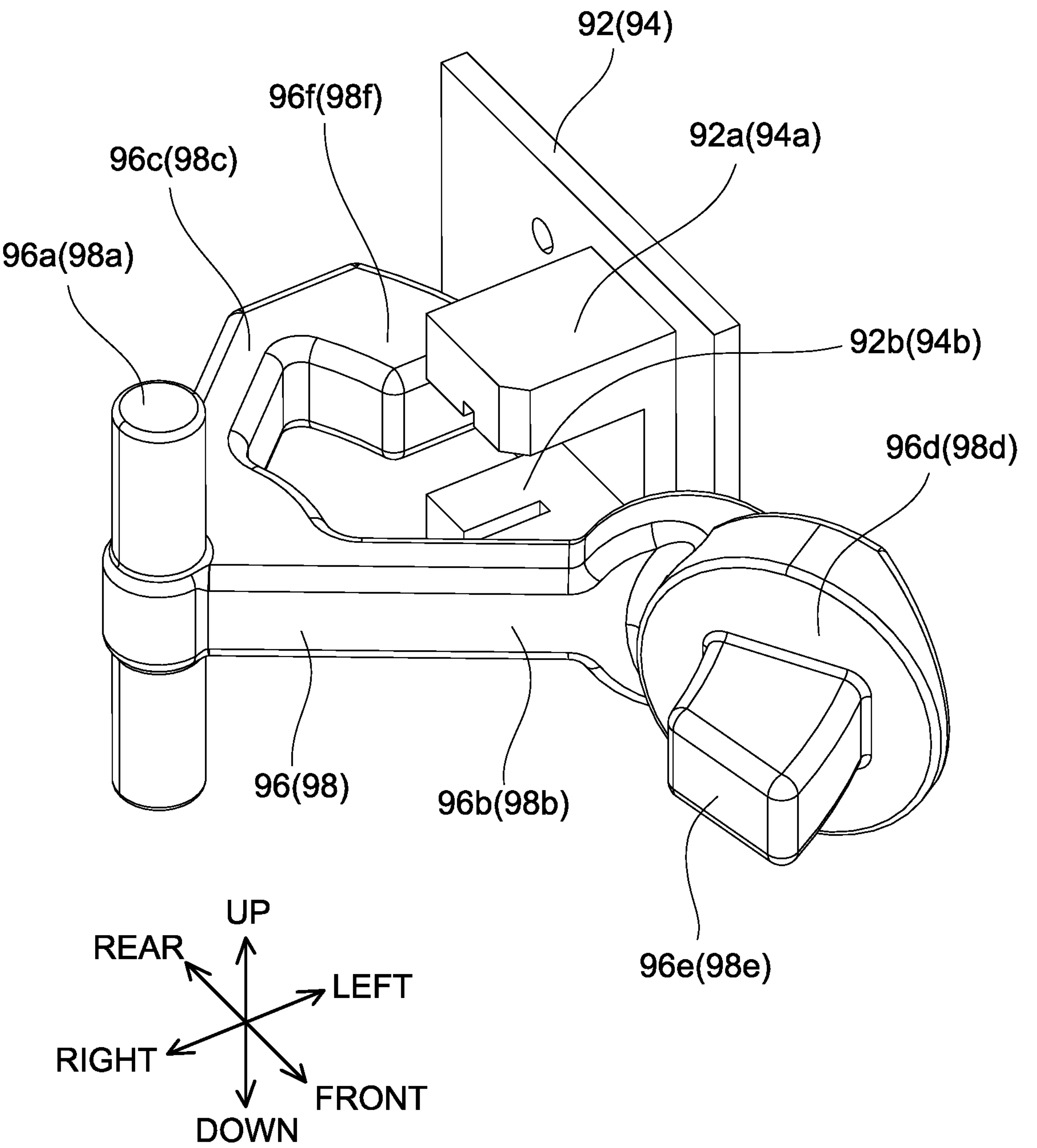
FIG. 9 illustrates perspective views of the swing member 96 and the detection sensor 92 in the sensor unit 84 of the electric power tool 2 of the first embodiment, in the state in which the swing member 96 is in a second position.

As illustrated in FIG. 7, the sensor units 84, 86 include sensor cases 88, 90, detection sensors 92, 94, swing members 96, 98, and compression springs 100, 102. As illustrated in FIGS. 8 and 9, the detection sensors 92, 94 include the light emitting elements 92*a*, 94*a* and the light receiving elements 92*b*, 94*b*. The detection sensors 92, 94 of the present embodiment are so-called photo interrupters in which the light emitting elements 92*a*, 94*a* and the light receiving element 92*b*, 94*b* are arranged to face each other. The detection sensors 92, 94 are connected to the control unit 28. The detection sensors 92, 94 are supported in the sensor cases 88, 90 such that the light emitting elements 92*a*, 94*a* and the light receiving elements 92*b*, 94*b* are housed in the sensor cases 88, 90. The detection sensors 92, 94 are configured to transmit an on signal to the control unit 28 when spaces between the light emitting elements 92*a*, 94*a* and the light receiving elements 92*b*, 92*b* are not obstructed, and configured to transmit an off signal to the control unit 28 when spaces between the light emitting elements 92*a*, 94*a* and the light receiving element 92*b*, 92*b* are obstructed.

The swing members 96, 98 include swing shafts 96*a*, 98*a*, contact arms 96*b*, 98*b*, and detection arms 96*c*, 98*c*. The swing shafts 96*a*, 98*a* are swingably supported by the sensor cases 88, 90. The swing members 98, 98 are supported by the sensor cases 88, 90 such that the contact arms 96*b*, 98*b* protrude outside the sensor cases 88, 90 and the detection arms 96*c*, 98*c* are housed within the sensor cases 88, 90. The contact arms 96*b*, 98*b* include flanges 96*d*, 98*d* and the protrusions 96*e*, 98*e* protruding from the flanges 98*d*, 98*d*. The detection arms 96*c*, 98*c* include obstruction portions 96*f*, 98*f* that have shapes obstructing the spaces between the light emitting elements 92*a*, 94*a* and the light receiving elements 92*b*, 94*b*. Each of the swing members 96, 98 is configured to swing between an obstructing position where the obstruction portions 96*f*, 98*f* are positioned to obstruct the spaces between the light emitting elements 92*a*, 94*a* and the light receiving elements 92*b*, 94*b* (see FIG. 8), and a release position where the obstruction portions 96*f*, 98*f* are positioned not to obstruct the spaces between the light emitting elements 92*a*, 94*a* and the light receiving elements 92*b*, 94*b* (see FIG. 9).

As illustrated in FIG. 7, the compression springs 100, 102 are attached to protrusions 100*a*, 102*a* disposed on the exterior of the sensor cases 88, 90. The compression springs 100, 102 bias the swing members 96, 98 with respect to the sensor cases 88, 90 such that the swing members 96, 98 swing toward the obstructing position (see FIG. 8) from the release position (see FIG. 9).

As illustrated in FIG. 6, the sensor units 84, 86 are supported in the spacer housing 8 such that the swing shafts 96*a*, 98*a* are disposed along the up-down direction and the flanges 96*d*, 98*d* and the protrusions 96*e*, 98*e* of the contact arms 96*b*, 98*b* are disposed within the gear housing 10. In the state in which the sensor units 84, 86 are supported in the spacer housing 8, the protrusions 96*e*, 98*e* enter the handle attachment holes 80*a*, 82*a* and the flanges 96*d*, 98*d* make contact with the inner surface of the gear housing 10. In this state, the swing members 96, 98 are at the obstructing positions, and the obstruction portions 96*f*, 98*f* obstruct the spaces between the light emitting elements 92*a*, 94*a* and the light receiving elements 92*b*, 94*b*. For example, even when the side handle 16 is attached to the handle attachment portion 80 as illustrated in FIG. 6, since the protrusion 96*e* enters the interior of the hollow bolt 63, the swing member 96 remains at the obstructing position without swinging. Therefore, both the sensor units 84, 86 transmit the off signal to the control unit 28. In this case, the control unit 28 determines that the side handle 16 is not gripped by the user, and prohibits the rotation of the motor 18.

Figure 10:
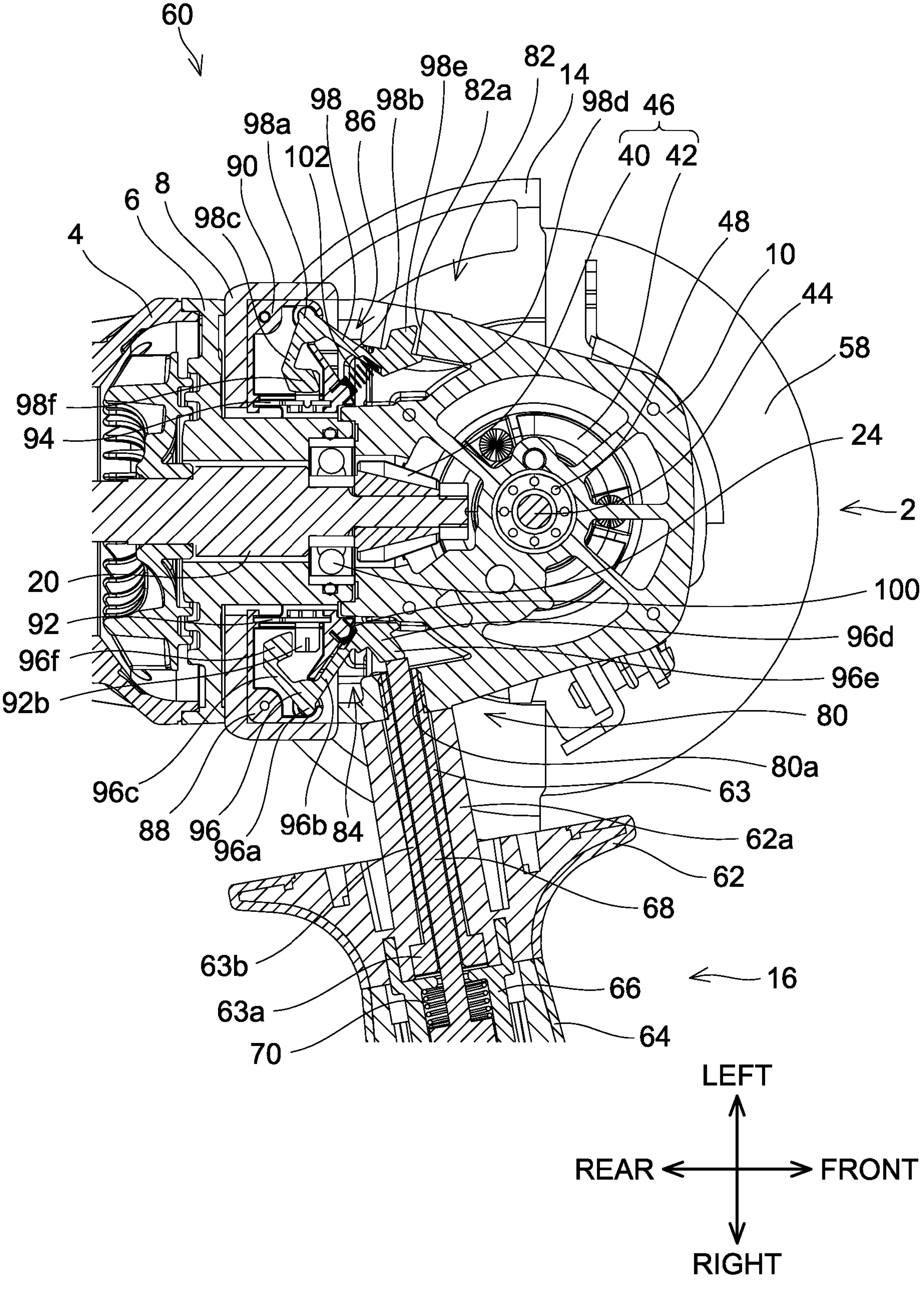
FIG. 10 illustrates a horizontal cross-sectional view of the internal structures of the handle attachment portions 80, 82 and their vicinity in the electric power tool 2 of the first embodiment, in the state in which the side handle 16 is attached to the handle attachment portion 80 and the user has rotated the handle portion 64 of the side handle 16 with respect to the flange portion 62.

When the user rotates the handle portion 64 of the side handle 16 with respect to the flange portion 62 from the state illustrated in FIG. 6, the protrusion 68*b* of the inner pin 68 protrudes beyond the end of the hollow bolt 63 and presses the protrusion 96*e* of the contact arm 96*b* as illustrated in FIG. 10. Consequently, the swing member 96 swings from the obstructing position to the release position and is positioned such that the obstruction portion 96*f* does not obstruct the space between the light emitting element 92*a* and the light receiving element 92*b*. In this case, although the sensor unit 86 transmits the off signal to the control unit 28, the sensor unit 84 transmits the on signal to the control unit 28. Consequently, the control unit 28 determines that the side handle 16 is gripped by the user and allows rotation of the motor 18.

As described above, the electric power tool 2 of the present embodiment comprises: the motor 18; the bevel gear 46 (an example of the power transmission mechanism) connected to the motor 18; the housing 60 that houses the motor 18 and the bevel gear 46; the spindle 44 (an example of the end tool holder) to which the grinding wheel 58 (an example of the end tool) is configured to be attached and from which the grinding wheel 58 is configured to be detached, and connected to the bevel gear 46; and the side handle 16 (an example of the handle) attached to the housing 60. The electric power tool 2 is configured to prohibit rotation of the motor 18 when the user is not gripping the side handle 16.

According to the above configuration, since the rotation of the motor 18 is prohibited when the user is not gripping the side handle 16, it is possible to prevent the electric power tool 2 from being used while the side handle 16 is not gripped.

The electric power tool 2 of the present embodiment further comprises the swing members 96, 98 (examples of the intermediate member) each configured to move between the obstructing position (an example of the first position) and the release position (an example of the second position). The swing members 96, 98 are in the obstructing positions when the user is not gripping the side handle 16, and move from the obstructing positions to the release positions in response to the manipulation performed by the user while the user is gripping the side handle 16. The electric power tool 2 is configured to prohibit the rotation of the motor 18 when the swing members 96, 98 are in the obstructing positions, and allow the rotation of the motor 18 when the swing members 96, 98 are in the release positions.

According to the above configuration, the rotation of the motor 18 can be prohibited when the user is not gripping the side handle 16, and the rotation of the motor 18 can be allowed in response to the manipulation performed by the user while the user is gripping the side handle 16.

In the electric power tool 2 of the present embodiment, the side handle 16 comprises: the flange portion 62 (an example of the handle body); and the handle portion 64 (an example of the handle manipulation member) disposed on the flange portion 62 and configured to be manipulated by the user. The swing members 96, 98 move from the obstructing positions to the release positions in conjunction with the manipulation to the handle portion 64 by the user.

According to the above configuration, with a simple configuration, the rotation of the motor 18 can be prohibited when the user is not gripping the side handle 16, and the rotation of the motor 18 can be allowed in response to the manipulation performed by the user while the user is gripping the side handle 16.

The electric power tool 2 of the present embodiment further comprises: the control unit 28 configured to control an operation of the motor 18; and the detection sensors 92, 94 connected to the control unit 28 and configured to detect movements of the swing members 96, 98. The control unit 28 is configured to prohibit the rotation of the motor 18 when the detection sensors 92, 94 do not detect that the swing members 96, 98 have moved from the obstructing positions to the release positions, and allow the rotation of the motor 18 when the detection sensors 92, 94 detect that the swing members 96, 98 have moved from the obstructing positions to the release positions.

According to the above configuration, since the state in which the rotation of the motor 18 is prohibited and the state in which the rotation of the motor 18 is allowed are switched in the control unit 28, it is possible to further simplify the mechanical configuration of the electric power tool 2.

In the electric power tool 2 of the present embodiment, the detection sensors 92, 94 are non-contact type detection sensors.

According to the above configuration, it is possible to suppress the detection sensors 92, 94 from failing due to vibration and/or impact being transmitted to the detection sensors 92, 94 via the swing members 96, 98.

In the electric power tool 2 of the present embodiment, the detection sensors 92, 94 and the swing members 96, 98 are disposed in the housing 60. The side handle 16 further comprises the inner pin 68 (an example of the relay member) that moves the swing members 96, 98 from the obstructing positions to the release positions in conjunction with the manipulation to the handle portion 64 by the user.

According to the above configuration, since both the detection sensors 92, 94 and the swing members 96, 98 are disposed in the housing 60, it is possible to accurately align the detection sensors 92, 94 and the swing members 96, 98 with each other, by which detection accuracy of the detection sensors 92, 94 can be enhanced.

In the electric power tool 2 of the present embodiment, the detection sensors 92, 94 comprises the light emitting elements 92*a*, 94*a* and the light receiving elements 92*b*, 94*b* corresponding to the light emitting elements 92*a*, 94*a*.

According to the above configuration, it is possible to realize the detection sensors 92, 94 having compact sizes and high detection accuracy.

In the electric power tool 2 of the present embodiment, the light emitting elements 92*a*, 94*a* and the light receiving elements 92*b*, 94*b* are arranged to face each other. The swing members 96, 98 obstruct the spaces between the light emitting elements 92*a*, 94*a* and the light receiving elements 92*b*, 94*b* when the swing members 96, 98 are in the obstructing positions. The swing members 96, 98 do not obstruct the spaces between the light emitting elements 92*a*, 94*a* and the light receiving elements 92*b*, 94*b* when the swing members 96, 98 are in the release positions.

According to the above configuration, the movements of the swing members 96, 98 from the obstructing positions to the release positions can be detected with a simple configuration.

The electric power tool 2 of the present embodiment further comprises the battery 26 detachably attached to the housing 60 and configured to supply power to the motor 18.

According to the above configuration, it is possible to supply power to the motor 18 without connecting the electric power tool 2 to an external power source with a power cable.

The electric power tool 2 of the present embodiment is configured to use the grinding wheel 58 as the end tool. The electric power tool 2 is configured to function as a grinder.

According to the above configuration, it is possible to prevent the electric power tool 2 functioning as the grinder from being used while the side handle 16 is not gripped.

In the electric power tool 2 of the present embodiment, the housing 60 includes the motor housing 4 (an example of the grip). The user is able to use the electric power tool 2 with one hand gripping the motor housing 4 and the other hand gripping the side handle 16.

According to the above configuration, when using the electric power tool 2, the user can stably hold the electric power tool 2 by gripping the motor housing 4 with his/her one hand and gripping the side handle 16 with the other hand.

Second Embodiment

Figure 11:
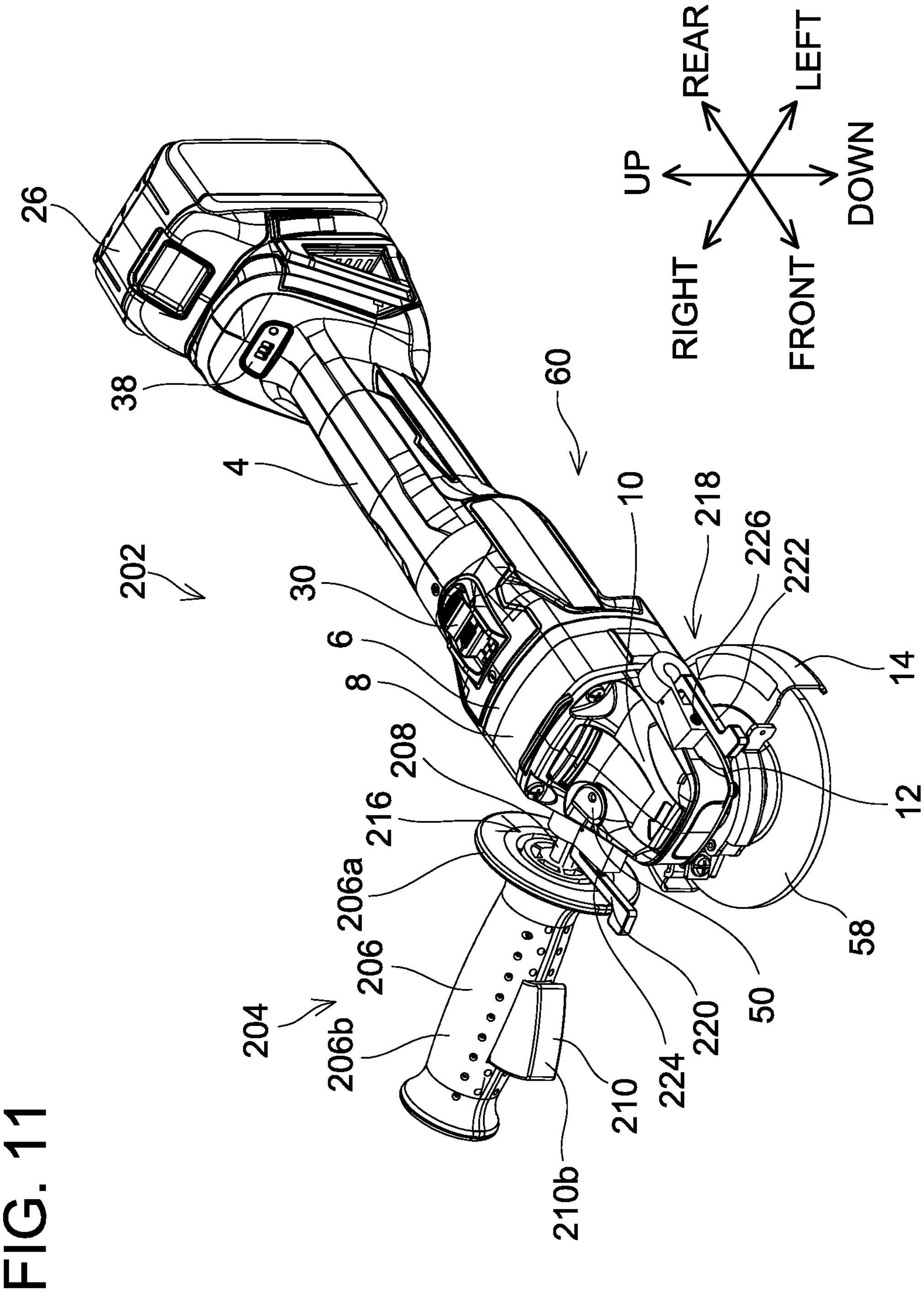
FIG. 11 illustrates a perspective view of an electric power tool 202 of a second embodiment viewed from the front left upper side.

As illustrated in FIG. 11, an electric power tool 202 of the present embodiment has a configuration substantially similar to the electric power tool 2 of the first embodiment. Hereinafter, points of the electric power tool 202 of the present embodiment different from the electric power tool 2 of the first embodiment will be described.

In the electric power tool 202 of the present embodiment, instead of the side handle 16, a side handle 204 is detachably attached to the gear housing 10. When the user uses the electric power tool 202, the user can stably hold the electric power tool 202 by gripping the motor housing 4 with one hand and gripping the side handle 204 with the other hand.

Figure 12:
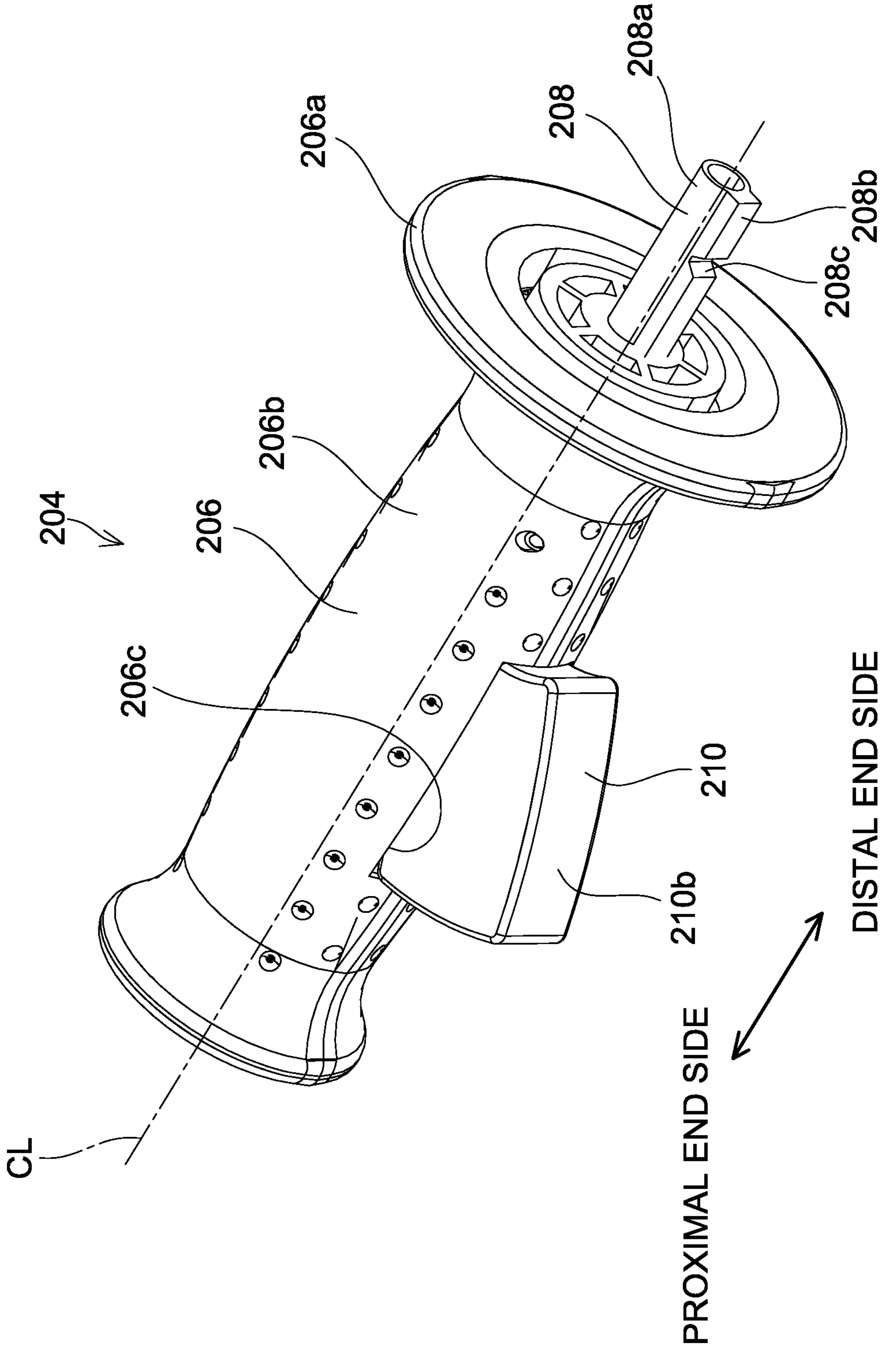
FIG. 12 illustrates a perspective view of a side handle 204 of the electric power tool 202 of the second embodiment.

As illustrated in FIG. 12, the side handle 204 includes a handle body 206, an engagement member 208, and a lever member 210. The handle body 206 includes a flange portion 206*a* and a handle portion 206*b*. The flange portion 206*a* and the handle portion 206*b* are integrally formed. In the following explanation, along the central axis CL, a side where the flange portion 206*a* is when viewed from the handle portion 206*b* is referred to as the distal end side, and the opposite side of the distal end side is referred to as the proximal end side.

The engagement member 208 is fixed to the flange portion 206*a* of the handle body 206. The engagement member 208 includes a cylindrical portion 208*a* that is substantially cylindrical and extends along the central axis CL, a protruding ridge 208*b* that protrudes from the outer surface of the cylindrical portion 208*a* and extends along the central axis CL, and a notch 208*c* defined in the protruding ridge 208*b*.

Figure 13:
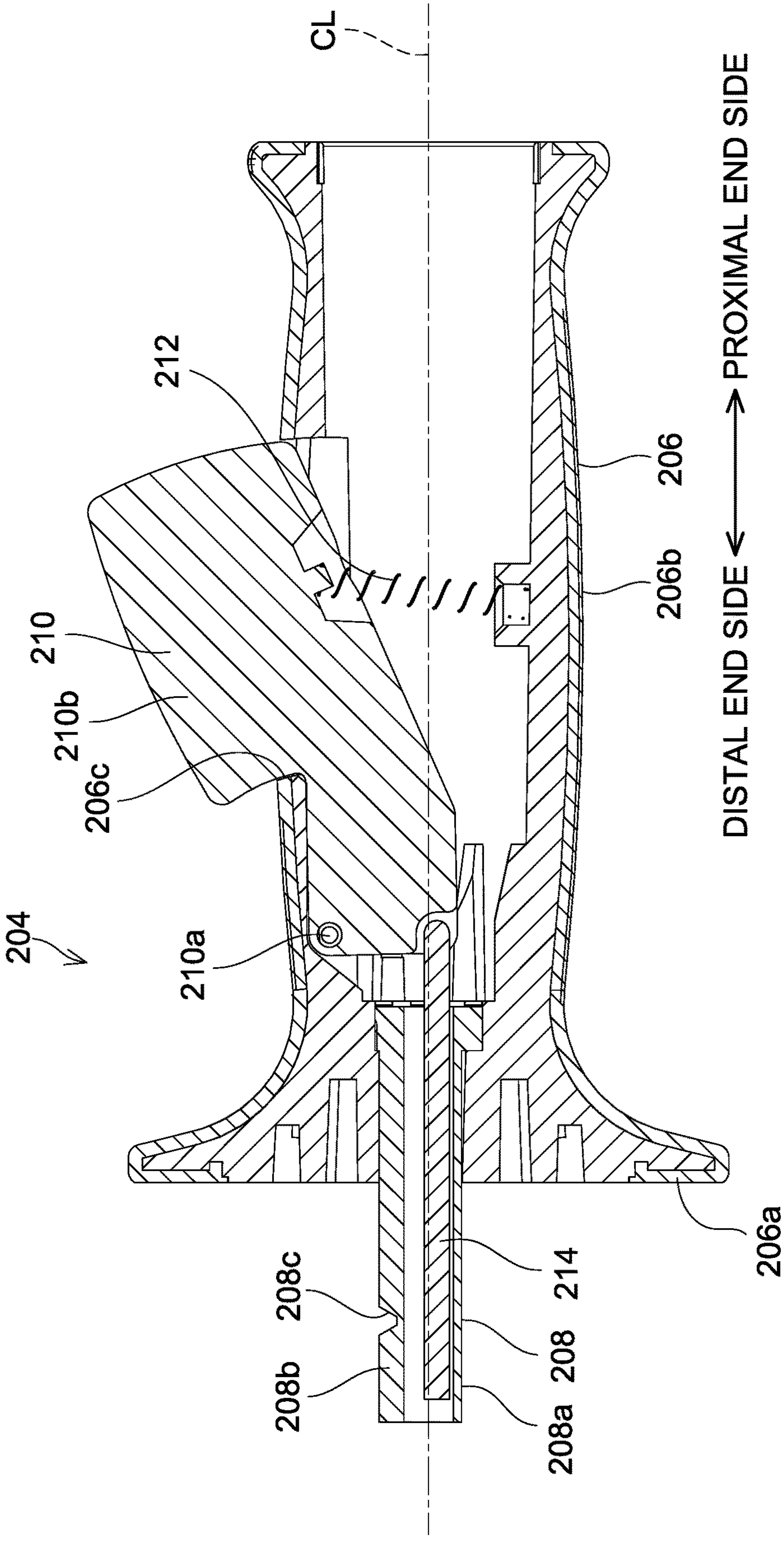
FIG. 13 illustrates a vertical cross-sectional view of the side handle 204 of the electric power tool 202 of the second embodiment in the state in which the user has not pressed a lever member 210.
Figure 14:
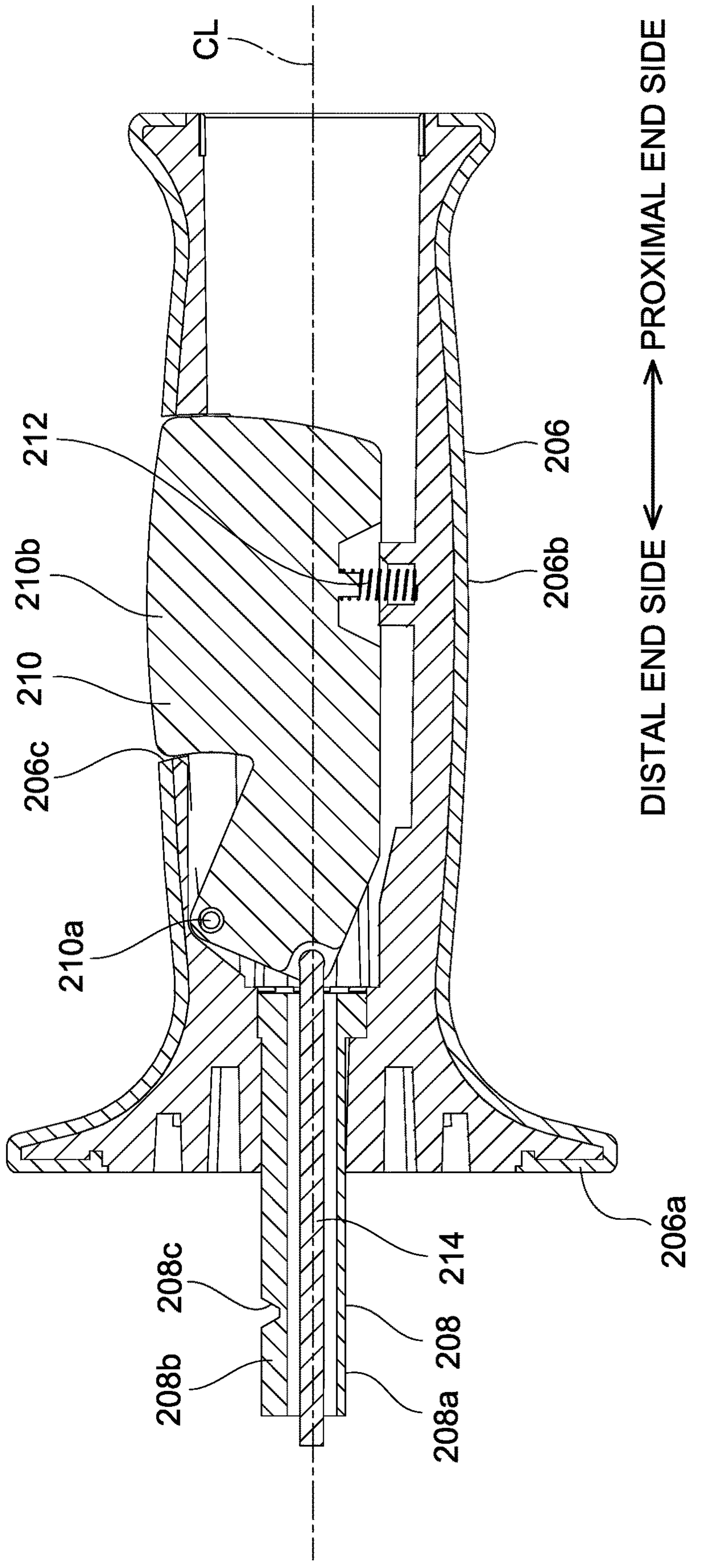
FIG. 14 illustrates a vertical cross-sectional view of the side handle 204 of the electric power tool 202 of the second embodiment in the state in which the user has pressed the lever member 210.

As illustrated in FIGS. 13 and 14, the lever member 210 is swingably supported by the handle body 206 via a swing shaft 210*a*. The lever member 210 includes a manipulation portion 210*b* on which the user, who is gripping the side handle 204, can perform a pressing manipulation. The manipulation portion 210*b* is exposed to the outside of the handle portion 206*b* through an opening 206*c* defined in the handle portion 206*b*. The lever member 210 is biased by the compression spring 212 housed inside the handle portion 206*b* in a direction in which the manipulation portion 210*b* protrudes to the outside of the handle portion 206*b*. An inner pin 214 housed in the cylindrical portion 208*a* of the engagement member 208 is rotatably coupled to the lever member 210. As illustrated in FIG. 13, in the state in which the user has not performed the pressing manipulation to the manipulation portion 210*b* and the manipulation portion 210*b* of the lever member 210 protrudes to the outside of the handle portion 206*b* by the biasing force of the compression spring 212, the end of the inner pin 214 is retracted to the inside of the cylindrical portion 208*a*. As illustrated in FIG. 14, when the user performs a pressing manipulation to the manipulation portion 210*b* against the biasing force of the compression spring 212, the inner pin 214 moves to the distal end side with respect to the cylindrical portion 208*a*, and the end of the inner pin 214 protrudes from beyond the end of the cylindrical portion 208*a*.

Figure 15:
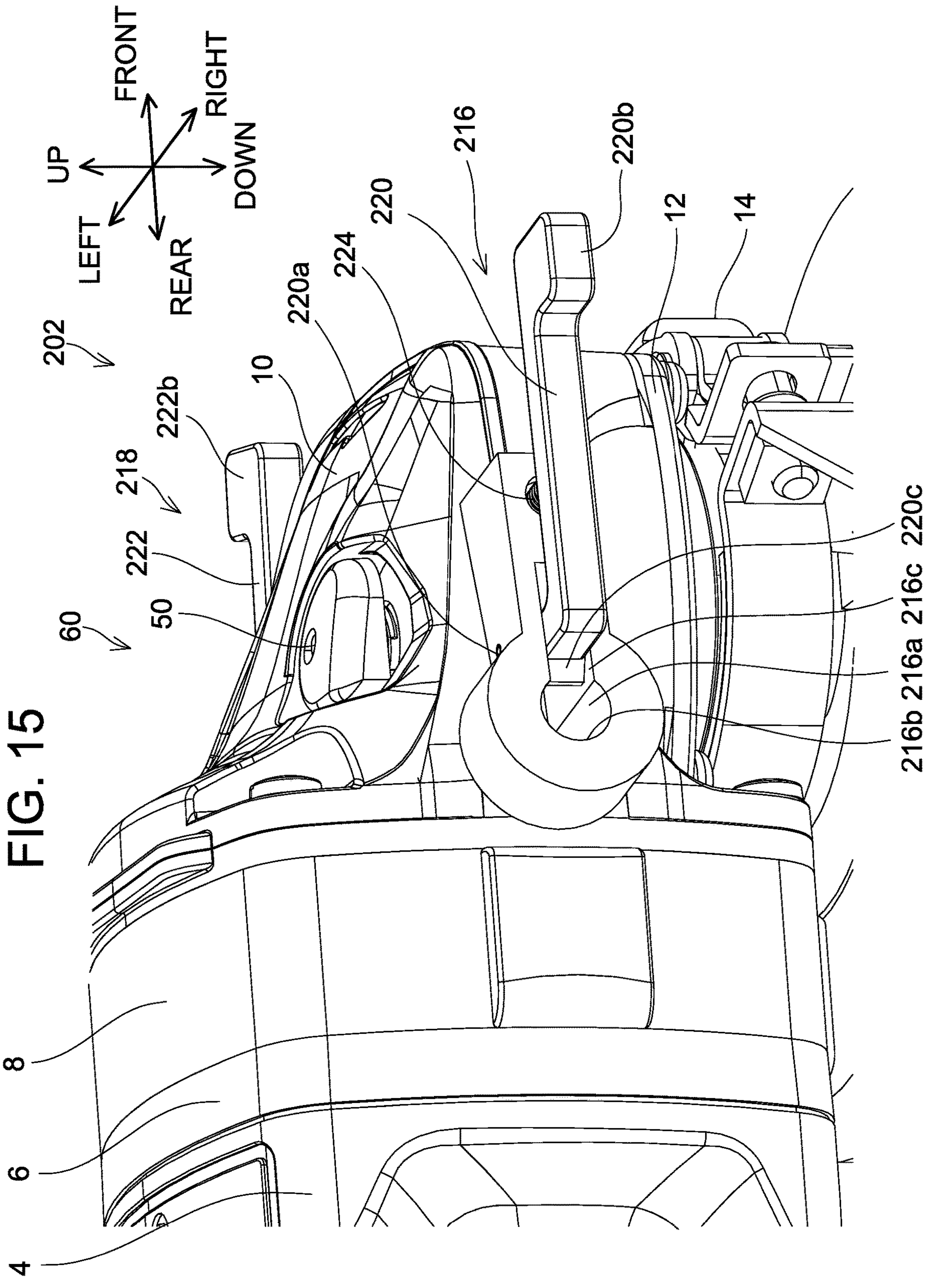
FIG. 15 illustrates a perspective view of a handle attachment portion 216 and its vicinity of the electric power tool 202 of the second embodiment viewed from the rear right upper side.
Figure 16:
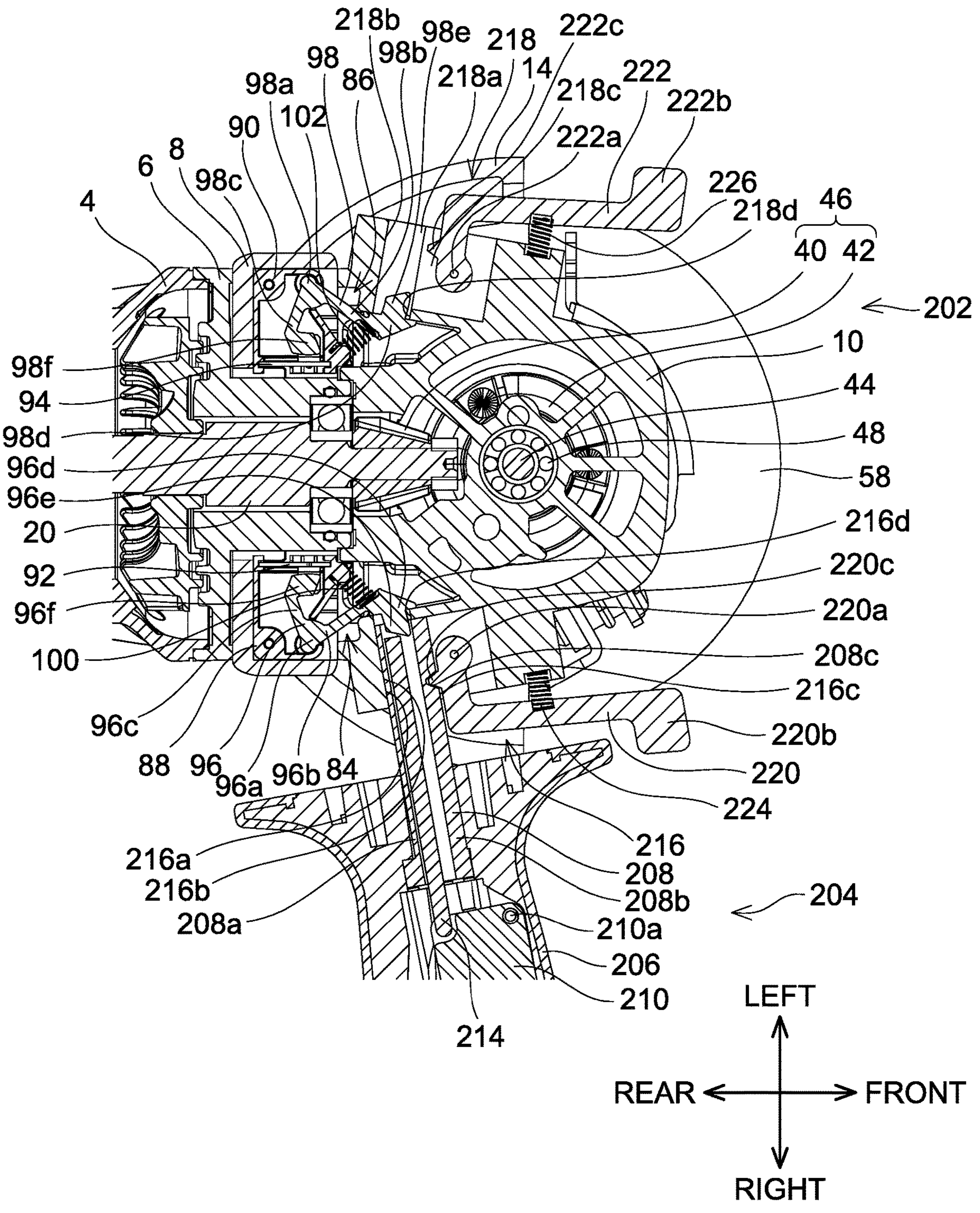
FIG. 16 illustrates a horizontal cross-sectional view of inner structures of handle attachment portions 216, 218 and their vicinity in the electric power tool 202 of the second embodiment, in the state in which the side handle 204 is attached to the handle attachment portion 216 and the user has not pressed the lever member 210 of the side handle 16.
Figure 17:
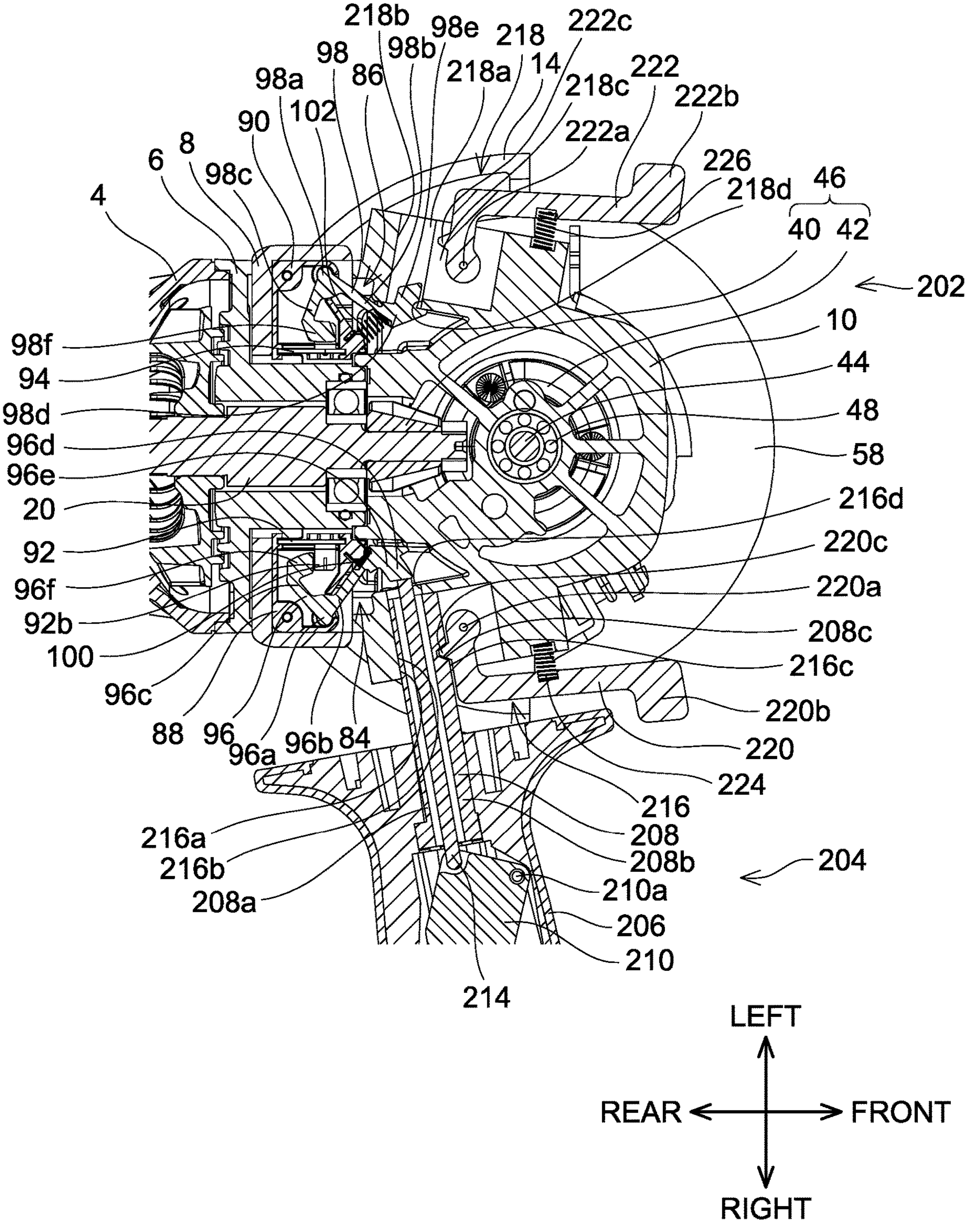
FIG. 17 illustrates a horizontal cross-sectional view of the inner structures of the handle attachment portions 216, 218 and their vicinity in the electric power tool 202 of the second embodiment, in the state in which the side handle 204 is attached to the handle attachment portion 216 and the user has pressed the lever member 210 of the side handle 16.

As illustrated in FIG. 11, in the electric power tool 202 of the present embodiment, instead of the handle attachment portions 80, 82, the handle attachment portions 216, 218 are disposed at the gear housing 10. The handle attachment portion 216 is disposed at the right surface of the gear housing 10, and the handle attachment portion 218 is disposed at the left surface of the gear housing 10. As illustrated in FIGS. 11 and 15, the handle attachment portions 216, 218 include the handle attachment holes 216*a*, 218*a*. The handle attachment holes 216*a*, 218*a* include column recesses 216*b*, 218*b* which have substantially column shapes and through which the cylindrical portion 208*a* of the side handle 204 can pass, rectangular parallelepiped recesses 216*c*, 218*c* which have substantially rectangular parallelepiped shapes and through which the protruding ridge 208*b* of the side handle 204 can pass, and through holes 216*d*, 218*d* (see FIGS. 16 and 17) penetrating the gear housing 10 from the outside to the inside. Further, as illustrated in FIGS. 16 and 17, lock levers 220, 222 and compression springs 224, 226 are disposed at the handle attachment portions 216, 218. The lock levers 220, 222 are swingably supported by the gear housing via swing shafts 220*a* and 222*a*. Manipulation portions 220*b*, 222*b* on which the user can perform a pressing manipulation and engagement portions 220*c*, 222*c* that can engage with the notch 208*c* of the side handle 204 are disposed on the lock levers 220, 222. The lock levers 220, 222 are biased by the compression springs 224, 226 in a direction in which the manipulation portions 220*b*, 222*b* are separated away from the gear housing 10.

In the electric power tool 202 of the present embodiment, the sensor units 84, 86 are supported by the spacer housing 8 in the state in which the protrusions 96*e*, 98*e* have entered the through holes 216*d*, 218*d* and the flanges 96*d*, 98*d* are in contact with the inner surface of the gear housing 10. For example, as illustrated in FIG. 16, when the side handle 204 is to be attached to the handle attachment portion 216, the engagement member 208 is inserted into the handle attachment hole 216*a* such that the cylindrical portion 208*a* enters the column recess 216*b* and the protruding ridge 208*b* enters the rectangular parallelepiped recess 216*c*. By the engagement portion 220*c* of the lock lever 220 engaging with the notch 208*c*, the side handle 204 is fixed to the gear housing 10. Consequently, the side handle 204 is fixed to the gear housing 10 in the posture in which the manipulation portion 210*b* of the lever member 210 protrudes frontward toward the front of the electric power tool 202. When the side handle 204 is attached to the handle attachment portion 216 as well, the protrusion 96*e* enters the interior of the cylindrical portion 208*a*, by which the swing member 96 does not swing and is maintained at the obstructing position. Therefore, in the state illustrated in FIG. 16, both the sensor units 84, 86 transmit the off signal to the control unit 28. In this case, the control unit 28 determines that the side handle 204 is not gripped by the user, and prohibits the rotation of the motor 18.

When the side handle 204 attached to the handle attachment portion 216 is to be detached, the engagement portion 220*c* of the lock lever 220 is separated away from the notch 208*c* of the engagement member 208 by the user pressing the manipulation portion 220*b* of the lock lever 220 against the biasing force of the compression spring 224. In this state, the engagement member 208 is pulled out of the handle attachment hole 216*a*, by which the side handle 204 can be detached from the handle attachment portion 216.

As illustrated in FIG. 16, when the user grips the side handle 204 and performs a pressing manipulation to the manipulation portion 210*b* with the side handle 204 attached to the handle attachment portion 216, as illustrated in FIG. 17, the end of the inner pin 214 protrudes beyond the end of the cylindrical portion 208*a* and presses the protrusion 96*e* of the contact arm 96*b*. Consequently, the swing member 96 swings from the first position to the second position, and the obstruction portion 96*f* is positioned not to obstruct the space between the light emitting element 92*a* and the light receiving element 92*b*. In this case, the sensor unit 86 transmits the off signal to the control unit 28, while the sensor unit 84 transmits the on signal to the control unit 28. Consequently, the control unit 28 determines that the side handle 204 is gripped by the user and allows rotation of the motor 18.

In the above description, the case in which the side handle 204 is attached to the handle attachment portion 216 is described, however, the same applies to the case in which the side handle 204 is attached to the handle attachment portion 218.

As described above, the electric power tool 202 of the present embodiment comprises: the motor 18; the bevel gear 46 (an example of the power transmission mechanism) connected to the motor 18; the housing 60 that houses the motor 18 and the bevel gear 46; the spindle 44 (an example of the end tool holder) to which the grinding wheel 58 (an example of the end tool) is configured to be attached and from which the grinding wheel 58 is configured to be detached, and connected to the bevel gear 46; and the side handle 204 (an example of the handle) attached to the housing 60. The electric power tool 202 is configured to prohibit rotation of the motor 18 when the user is not gripping the side handle 204.

According to the above configuration, since the rotation of the motor 18 is prohibited when the user is not gripping the side handle 204, it is possible to prevent the electric power tool 202 from being used while the side handle 204 is not gripped.

The electric power tool 202 of the present embodiment further comprises the swing members 96, 98 (examples of the intermediate member) each configured to move between the obstructing position (an example of the first position) and the release position (an example of the second position). The swing members 96, 98 are in the obstructing positions when the user is not gripping the side handle 204, and move from the obstructing positions to the release positions in response to the manipulation performed by the user while the user is gripping the side handle 204. The electric power tool 202 is configured to prohibit the rotation of the motor 18 when the swing members 96, 98 are in the obstructing positions, and allow the rotation of the motor 18 when the swing members 96, 98 are in the release positions.

According to the above configuration, the rotation of the motor 18 can be prohibited when the user is not gripping the side handle 204, and the rotation of the motor 18 can be allowed in response to the manipulation performed by the user while the user is gripping the side handle 204.

In the electric power tool 202 of the present embodiment, the side handle 204 comprises: the handle body 206; and the lever member 210 (an example of the handle manipulation member) disposed on the handle body 206 and is configured to be manipulated by the user. The swing members 96, 98 move from the obstructing positions to the release positions in conjunction with a manipulation to the lever member 210 by the user.

According to the above configuration, with a simple configuration, the rotation of the motor 18 can be prohibited when the user is not gripping the side handle 204, and the rotation of the motor 18 can be allowed in response to the manipulation performed by the user while the user is gripping the side handle 204.

In the electric power tool 202 of the present embodiment, the side handle 204 comprises the engagement member 208 (an example of the insertion pin) having a non-circular shape. The housing 60 comprises the handle attachment holes 216*a*, 218*a* (examples of the insertion hole) that accept the engagement member 208 such that the engagement member 208 is unable to rotate. The electric power tool 202 further comprises the lock levers 220, 222 (examples of the lock member) that prevent the engagement member 208 from coming out of the handle attachment holes 216*a*, 218*a* of the engagement member 208.

If the configuration in which the side handle 204 is attached to the housing by screwing the side handle 204 onto the housing 60 is employed, a position of the lever member 210 when the side handle 204 is attached to the housing 60 is not be constant and there is a possibility that the lever member 210 is disposed at a position which makes it difficult for the user to manipulate the lever member 210. According to the above-described configuration, since the position of the lever member 210 when the side handle 204 is attached to the housing 60 is constant, it is possible to arrange the lever member 210 at a position for the user to easily manipulate the lever member 210.

The electric power tool 202 of the present embodiment further comprises: the control unit 28 configured to control an operation of the motor 18; and the detection sensors 92, 94 connected to the control unit 28 and configured to detect movements of the swing members 96, 98. The control unit 28 is configured to prohibit the rotation of the motor 18 when the detection sensors 92, 94 do not detect that the swing members 96, 98 have moved from the obstructing positions to the release positions, and allow the rotation of the motor 18 when the detection sensors 92, 94 detect that the swing members 96, 98 have moved from the obstructing positions to the release positions.

According to the above configuration, since the state in which the rotation of the motor 18 is prohibited and the state in which the rotation of the motor 18 is allowed are switched in the control unit 28, it is possible to further simplify the mechanical configuration of the electric power tool 202.

In the electric power tool 202 of the present embodiment, the detection sensors 92, 94 are non-contact type detection sensors.

According to the above configuration, it is possible to prevent the detection sensors 92, 94 from failing due to vibration and/or impact being transmitted to the detection sensors 92, 94 via the swing members 96, 98.

In the electric power tool 202 of the present embodiment, the detection sensors 92, 94 and the swing members 96, 98 are disposed in the housing 60. The side handle 204 further comprises the inner pin 214 (an example of the relay member) that moves the swing members 96, 98 from the obstructing positions to the release positions in conjunction with the manipulation to the lever member 210 by the user.

According to the above configuration, since both the detection sensors 92, 94 and the swing members 96, 98 are disposed in the housing 60, it is possible to accurately align the detection sensors 92, 94 and the swing members 96, 98 with each other, by which detection accuracy of the detection sensors 92, 94 can be enhanced.

In the electric power tool 202 of the present embodiment, the detection sensors 92, 94 comprise the light emitting elements 92*a*, 94*a* and the light receiving elements 92*b*, 94*b* corresponding to the light emitting elements 92*a*, 94*a*.

According to the above configuration, it is possible to realize the detection sensors 92, 94 having compact sizes and high detection accuracy.

In the electric power tool 202 of the present embodiment, the light emitting elements 92*a*, 94*a* and the light receiving elements 92*b*, 94*b* are arranged to face each other. The swing members 96, 98 obstruct the spaces between the light emitting elements 92*a*, 94*a* and the light receiving elements 92*b*, 94*b* when the swing members 96, 98 are in the obstructing positions. The swing members 96, 98 do not obstruct the spaces between the light emitting elements 92*a*, 94*a* and the light receiving elements 92*b*, 94*b* when the swing members 96, 98 are in the release positions.

According to the above configuration, the movements of the swing members 96, 98 from the obstructing positions to the release positions can be detected with a simple configuration.

The electric power tool 202 of the present embodiment further comprises the battery 26 detachably attached to the housing 60 and configured to supply power to the motor 18.

According to the above configuration, it is possible to supply power to the motor 18 without connecting the electric power tool 202 to an external power source with a power cable.

The electric power tool 202 of the present embodiment is configured to use the grinding wheel 58 as the end tool. The electric power tool 202 is configured to function as a grinder.

According to the above configuration, it is possible to prevent the electric power tool 202 functioning as the grinder from being used while the side handle 204 is not gripped.

In the electric power tool 202 of the present embodiment, the housing 60 includes the motor housing 4 (an example of the grip). The user is able to use the electric power tool 202 with one hand gripping the motor housing 4 and the other hand gripping the side handle 204.

According to the above configuration, when using the electric power tool 202, the user can stably hold the electric power tool 202 by gripping the motor housing 4 with his/her one hand and gripping the side handle 204 with the other hand.

Third Embodiment

Figure 18:
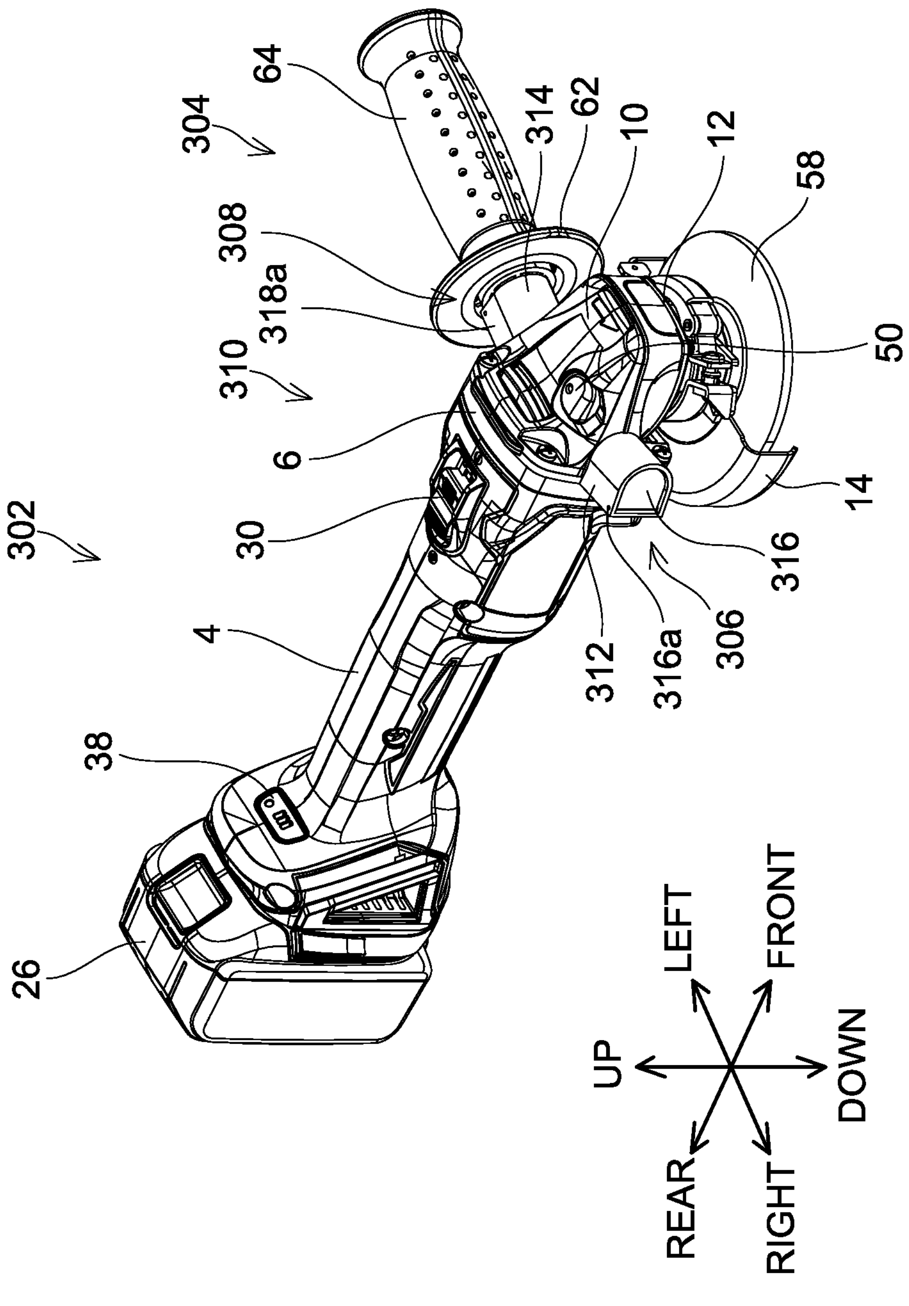
FIG. 18 illustrates a perspective view of an electric power tool 302 of a third embodiment viewed from the front right upper side.

As illustrated in FIG. 18, an electric power tool 302 of the present embodiment has a configuration substantially similar to the electric power tool 2 of the first embodiment. Hereinafter, points of the electric power tool 302 of the present embodiment different from the electric power tool 2 of the first embodiment will be described.

In the electric power tool 302 of the present embodiment, instead of the side handle 16, a side handle 304 is detachably attached to the gear housing 10. When the user uses the electric power tool 302, the user can stably hold the electric power tool 302 by gripping the motor housing 4 with one hand and gripping the side handle 304 with the other hand.

Figure 19:
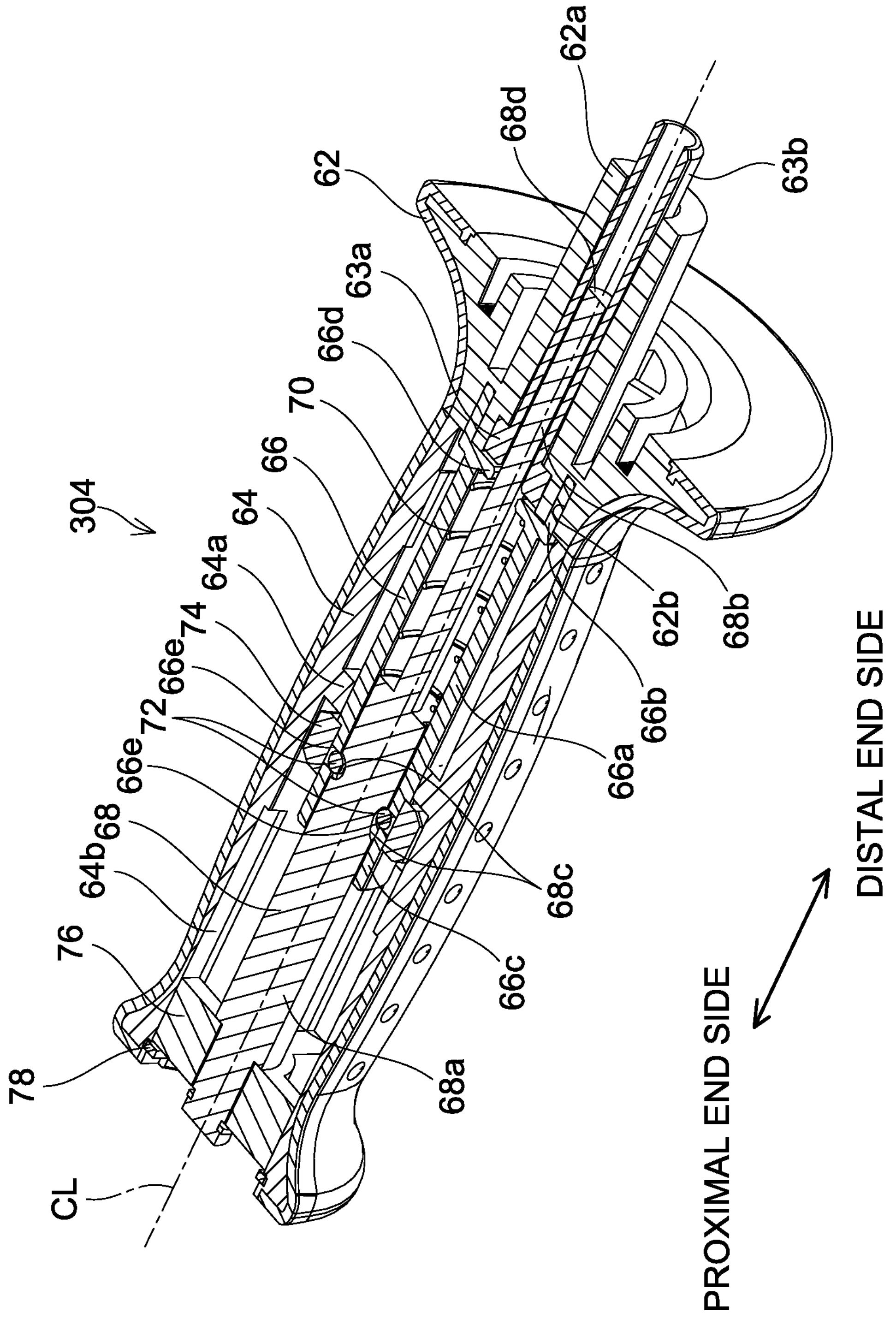
FIG. 19 illustrates a perspective cross-sectional view of a side handle 304 of the electric power tool 302 of the third embodiment.

As illustrated in FIG. 19, the side handle 304 has substantially the same configuration as the side handle 16. In the side handle 304, the end surface 68*d* of the protrusion 68*b* of the inner pin 68 is coated with a coating film (for example, white coating film) having a high reflectance. Alternatively, the protrusion 68*b* of the inner pin 68 may be constituted of a material having a high reflectance. Further, in the side handle 304, the hollow bolt 63 is constituted of a material having a low reflectance. Alternatively, a coating film having a low reflectance (for example, a black coating film) may be applied to the end surface and the inner circumferential surface of the hollow bolt 63.

Figure 20:
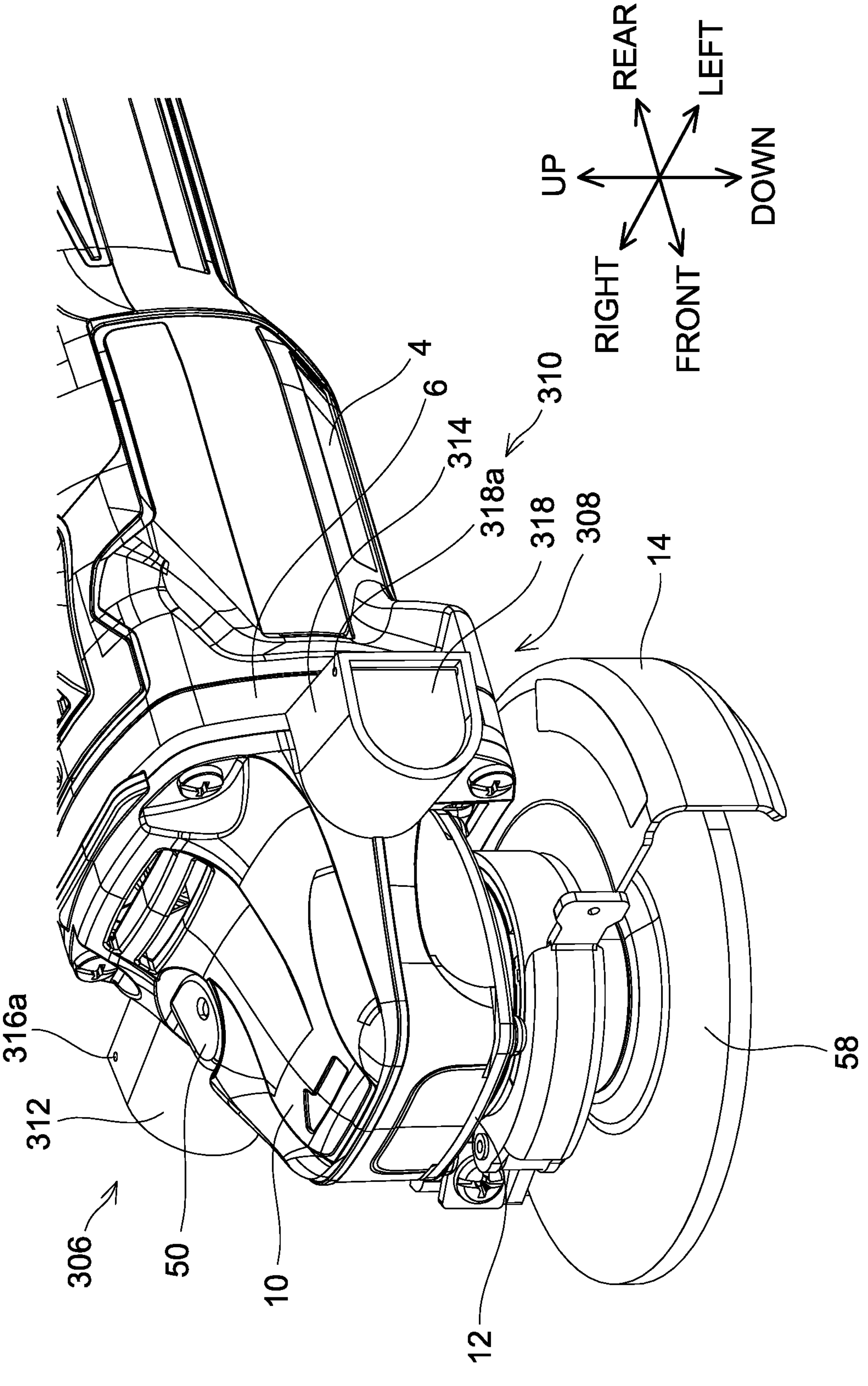
FIG. 20 illustrates a perspective view of a handle attachment portion 308 and its vicinity of the electric power tool 302 of the third embodiment viewed from the front left upper side.

As illustrated in FIGS. 18 and 20, the electric power tool 302 of the present embodiment does not include the spacer housing 8, and the gear housing 10 is attached in front of the motor cover 6. Further, in the electric power tool 302 of the present embodiment, instead of the handle attachment portions 80, 82, handle attachment portions 306, 308 are disposed at the gear housing 10. In the present embodiment, the motor housing 4, the motor cover 6, the gear housing 10 and the bearing box 12 may collectively and simply be referred to as a housing 310.

The handle attachment portion 306 is disposed at the right surface of the gear housing 10, and the handle attachment portion 308 is disposed at the left surface of the gear housing 10. The handle attachment portions 306, 308 include handle attachment holes 306*a*, 308*a* (see FIGS. 21 to 23), light blocking walls 312, 314 surrounding the handle attachment holes 306*a*, 308*a* and projecting toward the outside of the gear housing 10, and light blocking doors 316, 318 disposed at the ends of the light blocking walls 312 and 314. The handle attachment holes 306*a*, 308*a* penetrate the gear housing 10 from the outside to the inside, and internal threads corresponding to the external thread of the hollow bolt 63 of the side handle 304 are defined on the inner circumferential surfaces. The light blocking doors 316, 318 are swingably supported by the light blocking walls 312, 314 via hinges 316*a*, 318*a*. The light blocking doors 316, 318 open the ends of the light blocking walls 312, 314 when they swing inward, and close the ends of the light blocking walls 312, 314 when they swing outward. The light blocking doors 316, 318 are biased by torsion springs (not shown) in a direction closing the ends of the light blocking walls 312, 314.

Figure 21:
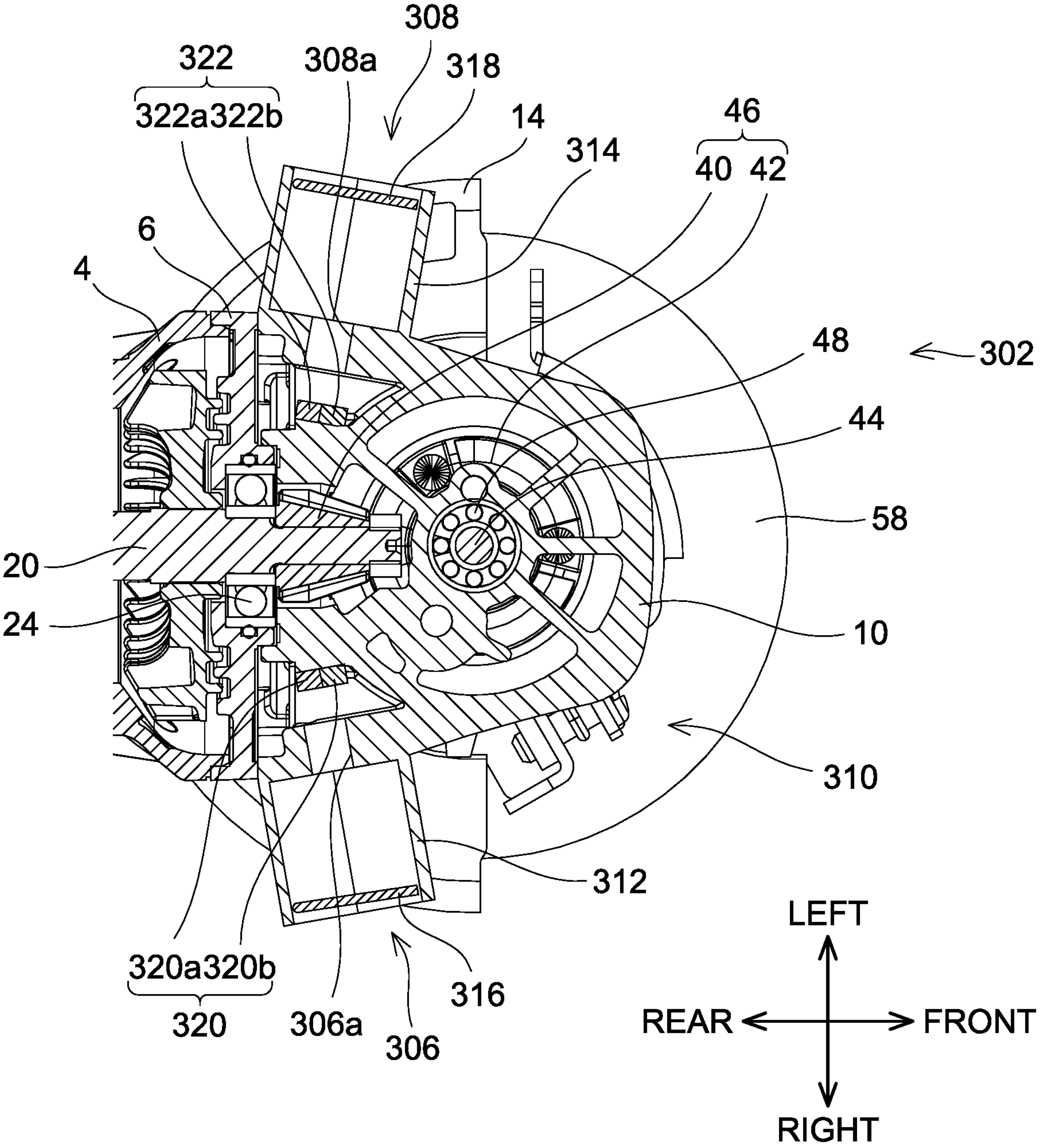
FIG. 21 illustrates a horizontal cross-sectional view of inner structures of handle attachment portions 306, 308 and their vicinity in the electric power tool 302 of the third embodiment with the side handle 304 detached from a gear housing 10.
Figure 22:
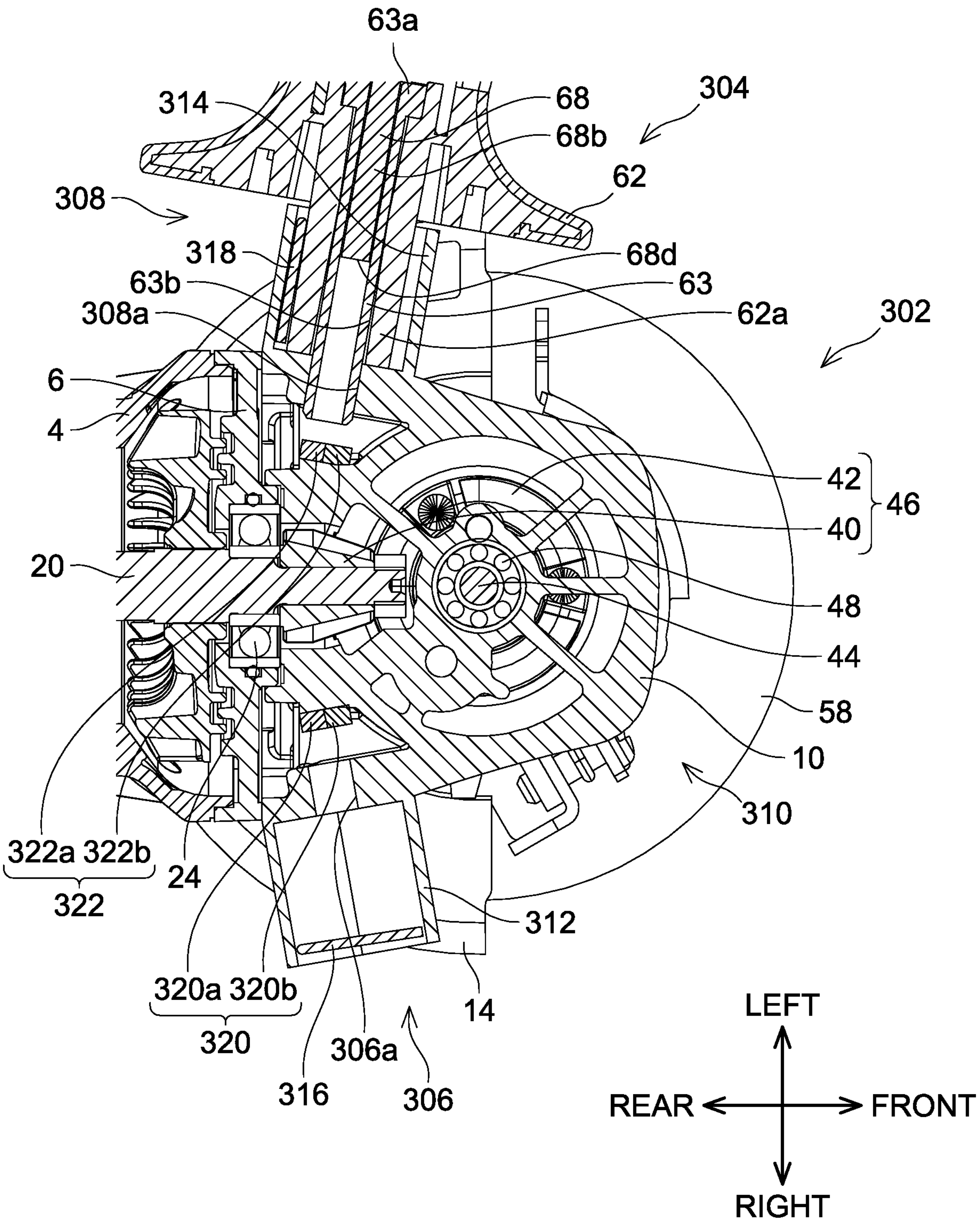
FIG. 22 is a horizontal cross-sectional view of the inner structures of the handle attachment portions 306, 308 and their vicinity in the electric power tool 302 of the third embodiment, in the state in which the side handle 304 is attached to the handle attachment portion 308 and the user has not rotated the handle portion 64 of the side handle 304 with respect to the flange portion 62.
Figure 23:
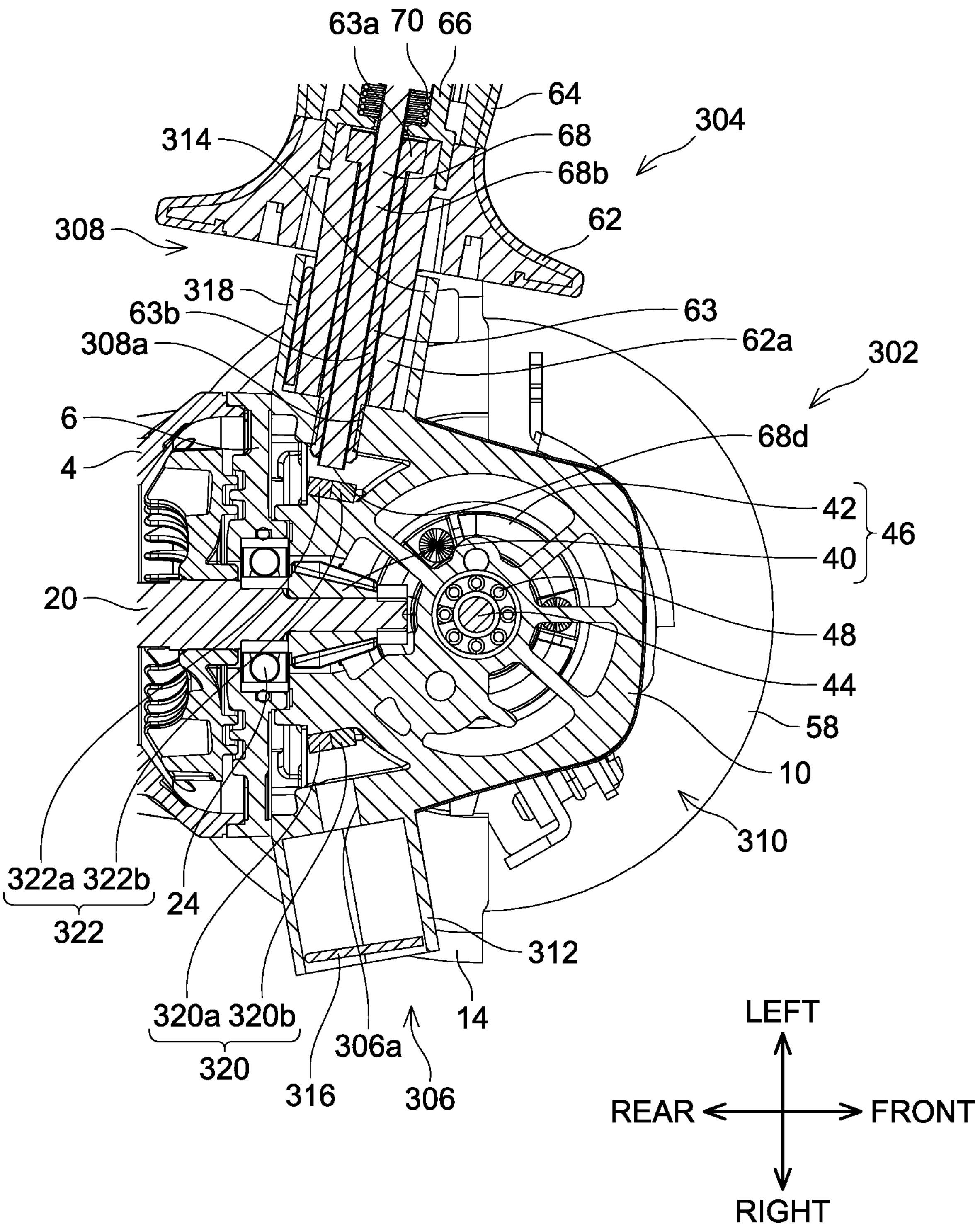
FIG. 23 is a horizontal cross-sectional view illustrating the inner structures of the handle attachment portions 306, 308 and their vicinity in the electric power tool 302 of the third embodiment, in the state in which the side handle 304 is attached to the handle attachment portion 308 and the user has rotated the handle portion 64 of the side handle 304 with respect to the flange portion 62.

As illustrated in FIGS. 21 to 23, the electric power tool 302 of the present embodiment includes detection sensors 320, 322 instead of the sensor units 84, 86. The detection sensors 320, 322 are housed in the gear housing 10. The detection sensor 320 is disposed corresponding to the handle attachment portion 306, and the detection sensor 322 is disposed corresponding to the handle attachment portion 308. The detection sensors 320, 322 are so-called photo reflectors arranged such that the light emitting elements 320*a*, 322*a* and the light receiving elements 320*b*, 322*b* are oriented in the same direction. In the detection sensor 320, the light emitting element 320*a* and the light receiving element 320*b* are arranged to be oriented in the direction of the handle attachment hole 306*a*. In the detection sensor 322, the light emitting element 322*a* and the light receiving element 322*b* are arranged to be oriented in the direction of the handle attachment hole 308*a*. The detection sensors 320, 322 are connected to the control unit 28. The detection sensors 320, 322 transmit the on signal to the control unit 28 when lights from the light emitting elements 320*a*, 322*a* are reflected and reach the light receiving elements 320*b*, 322*b*, and the detection sensors 320, 322 transmit the off signal to the control unit 28 when the lights from the light emitting elements 320*a*, 322*a* do not reach the light receiving elements 320*b*, 322*b*.

As illustrated in FIG. 21, if the side handle 304 is not attached to the gear housing 10, the ends of the light blocking walls 312, 314 are closed by the light blocking doors 316, 318. Therefore, in the detection sensors 320, 322, since the lights from the light emitting elements 320*a*, 322*a* do not reach the light receiving elements 320*b*, 322*b*, the detection sensors 320, 322 each transmit the off signal to the control unit 28. In this case, the control unit 28 prohibits rotation of the motor 18.

As illustrated in FIG. 22, when the side handle 304 is to be attached to the handle attachment portion 308 of the gear housing 10, the end of the hollow bolt 63 of the side handle 304 is caused to make contact with and press the light blocking door 318. Consequently, the light blocking door 318 swings inward, and the end of the light blocking wall 314 is opened. In this state, the hollow bolt 63 of the side handle 304 is screwed onto the handle attachment hole 308*a*, by which the side handle 304 can be attached to the handle attachment portion 308. In this case, the end surface 68*d* of the inner pin 68 inside the hollow bolt 63 is arranged to face the light emitting element 322*a* and the light receiving element 322*b* of the detection sensor 322. However, since the distance from the light emitting element 322*a* to the end surface 68*d* of the inner pin 68 and the distance from the end surface 68*d* of the inner pin 68 to the light receiving element 322*b* are such that the light from the light emitting element 322*a* is not reflected by the end surface 68*d* of the inner pin 68 and does not reach the light receiving element 322*b*. Thus, the detection sensors 320, 322 transmit the off signal to the control unit 28, and the control unit 28 prohibits rotation of the motor 18.

From the state illustrated in FIG. 22, when the user rotates the handle portion 64 of the side handle 304 with respect to the flange portion 62, the protrusion 68*b* of the inner pin 68 protrudes beyond the end of the hollow bolt 63, and the end surface 68*d* of the inner pin 68 is arranged close to the light emitting element 322*a* and the light receiving element 322*b* of the detection sensor 322. In this case, since the light from the light emitting element 322*a* is reflected by the end surface 68*d* of the inner pin 68 and reaches the light receiving element 322*b*, the detection sensor 322 transmits the on signal to the control unit 28. The control unit 28 determines that the side handle 304 is gripped by the user and allows rotation of the motor 18.

In the above description, the case in which the side handle 304 is attached to the handle attachment portion 308 is described, however, the same applies to the case in which the side handle 304 is attached to the handle attachment portion 306.

As described above, the electric power tool 302 of the present embodiment comprises: the motor 18; the bevel gear 46 (an example of the power transmission mechanism) connected to the motor 18; the housing 310 that houses the motor 18 and the bevel gear 46; the spindle 44 (an example of the end tool holder) to which the grinding wheel 58 (an example of the end tool) is configured to be attached and from which the end tool is configured to be detached, and connected to the bevel gear 46; and the side handle 304 (an example of the handle) attached to the housing 310. The electric power tool 302 is configured to prohibit rotation of the motor 18 when the user is not gripping the side handle 304.

According to the above configuration, since the rotation of the motor 18 is prohibited when the user is not gripping the side handle 304, it is possible to prevent the electric power tool 302 from being used while the side handle 304 is not gripped.

The electric power tool 302 of the present embodiment further comprises the inner pin 68 (an example of the intermediate member) configured to move between the retracted position (an example of the first position) and the protruding position (an example of the second position). The inner pin 68 is in the retracted position when the user is not gripping the side handle 304, and moves from the retracted position to the protruding position in response to a manipulation performed by the user while the user is gripping the side handle 304. The electric power tool 302 is configured to prohibit the rotation of the motor 18 when the inner pin 68 is in the retracted position, and allow the rotation of the motor 18 when the inner pin 68 is in the protruding position.

According to the above configuration, the rotation of the motor 18 can be prohibited when the user is not gripping the side handle 304, and the rotation of the motor 18 can be allowed in response to the manipulation performed by the user while the user is gripping the side handle 304.

In the electric power tool 302 of the present embodiment, the side handle 304 comprises: the flange portion 62 (an example of the handle body); and the handle portion 64 (an example of the handle manipulation member) disposed on the flange portion 62 and configured to be manipulated by the user. The inner pin 68 moves from the retracted position to the protruding position in conjunction with the manipulation to the handle portion 64 by the user.

According to the above configuration, with a simple configuration, the rotation of the motor 18 can be prohibited when the user is not gripping the side handle 304, and the rotation of the motor 18 can be allowed in response to the manipulation performed by the user while the user is gripping the side handle 304.

The electric power tool 302 of the present embodiment further comprises: the control unit 28 configured to control an operation of the motor 18; and the detection sensors 320, 322 connected to the control unit 28 and configured to detect a movement of the inner pin 68. The control unit 28 is configured to prohibit the rotation of the motor 18 when the detection sensors 320, 322 do not detect that the inner pin 68 has moved from the retracted positions to the protruding positions, and allow the rotation of the motor 18 when the detection sensors 320, 322 detect that the inner pin 68 has moved from the retracted position to the protruding position.

According to the above configuration, since the state in which the rotation of the motor 18 is prohibited and the state in which the rotation of the motor 18 is allowed are switched in the control unit 28, it is possible to further simplify the mechanical configuration of the electric power tool 302.

In the electric power tool 302 of the present embodiment, the detection sensors 320, 322 are non-contact type detection sensors.

According to the above configuration, it is possible to suppress the detection sensors 320, 322 from failing due to vibration and/or impact being transmitted to the detection sensors 320, 322 via the inner pin 68.

In the electric power tool 302 of the present embodiment, the detection sensors 320, 322 comprise the light emitting elements 320*a*, 322*a* and the light receiving elements 320*b*, 322*b* corresponding to the light emitting elements 320*a*, 322*a*.

According to the above configuration, it is possible to realize the detection sensors 320, 322 having compact sizes and high detection accuracy.

In the electric power tool 302 of the present embodiment, the light emitting elements 320*a*, 322*a* and the light receiving elements 320*b*, 320*b* are arranged to be oriented in the same direction. The lights emitted by the light emitting elements 320*a*, 322*a* are reflected by the inner pin 68 and received by the light receiving elements 320*b*, 322*b* when the inner pin 68 is in the protruding position. When the inner pin 68 is in the retracted position, the lights emitted by the light emitting elements 320*a*, 322*a* are not received by the light receiving elements 320*b*, 322*b*.

According to the above configuration, the movement of the inner pin 68 from the retracted position to the protruding position can be detected with a simple configuration.

The electric power tool 302 of the present embodiment further comprises the battery 26 detachably attached to the housing 310 and configured to supply power to the motor 18.

According to the above configuration, it is possible to supply power to the motor 18 without connecting the electric power tool 302 to an external power source with a power cable.

The electric power tool 302 of the present embodiment is configured to use the grinding wheel 58 as the end tool. The electric power tool 302 is configured to function as a grinder.

According to the above configuration, it is possible to prevent the electric power tool 302 functioning as the grinder from being used while the side handle 304 is not gripped.

In the electric power tool 302 of the present embodiment, the housing 310 includes the motor housing 4 (an example of the grip). The user is able to use the electric power tool 302 with one hand gripping the motor housing 4 and the other hand gripping the side handle 304.

According to the above configuration, when using the electric power tool 302, the user can stably hold the electric power tool 302 by gripping the motor housing 4 with his/her one hand and gripping the side handle 304 with the other hand.

Fourth Embodiment

Figure 24:
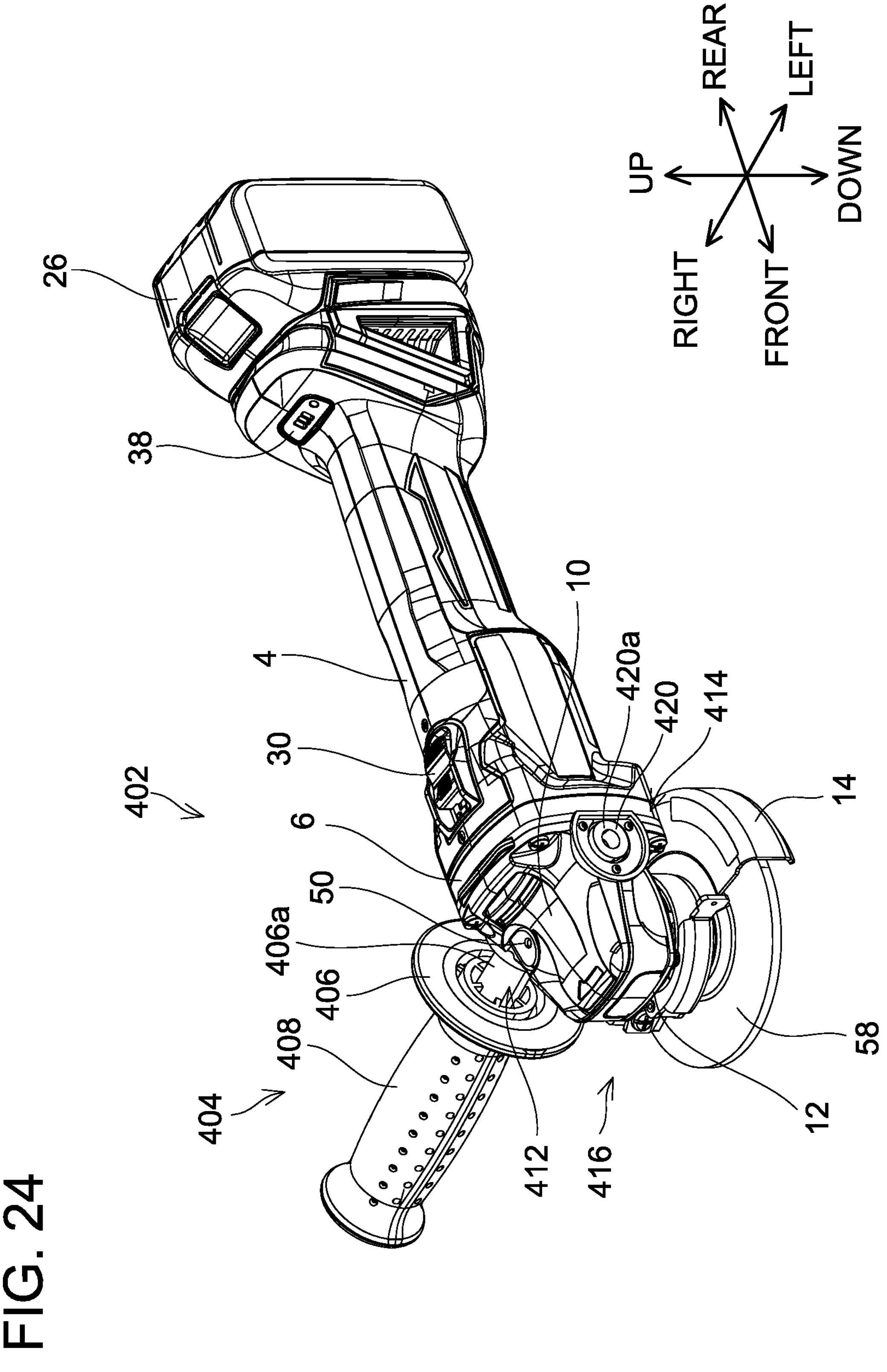
FIG. 24 illustrates a perspective view of an electric power tool 402 of a fourth embodiment viewed from the front left upper side.

As illustrated in FIG. 24, an electric power tool 402 of the present embodiment has a configuration substantially similar to the electric power tool 2 of the first embodiment. Hereinafter, points of the electric power tool 402 of the present embodiment different from the electric power tool 2 of the first embodiment will be described.

In the electric power tool 402 of the present embodiment, instead of the side handle 16, a side handle 404 is detachably attached to the gear housing 10. When the user uses the electric power tool 402, the user can stably hold the electric power tool 402 by gripping the motor housing 4 with one hand and gripping the side handle 404 with the other hand.

Figure 25:
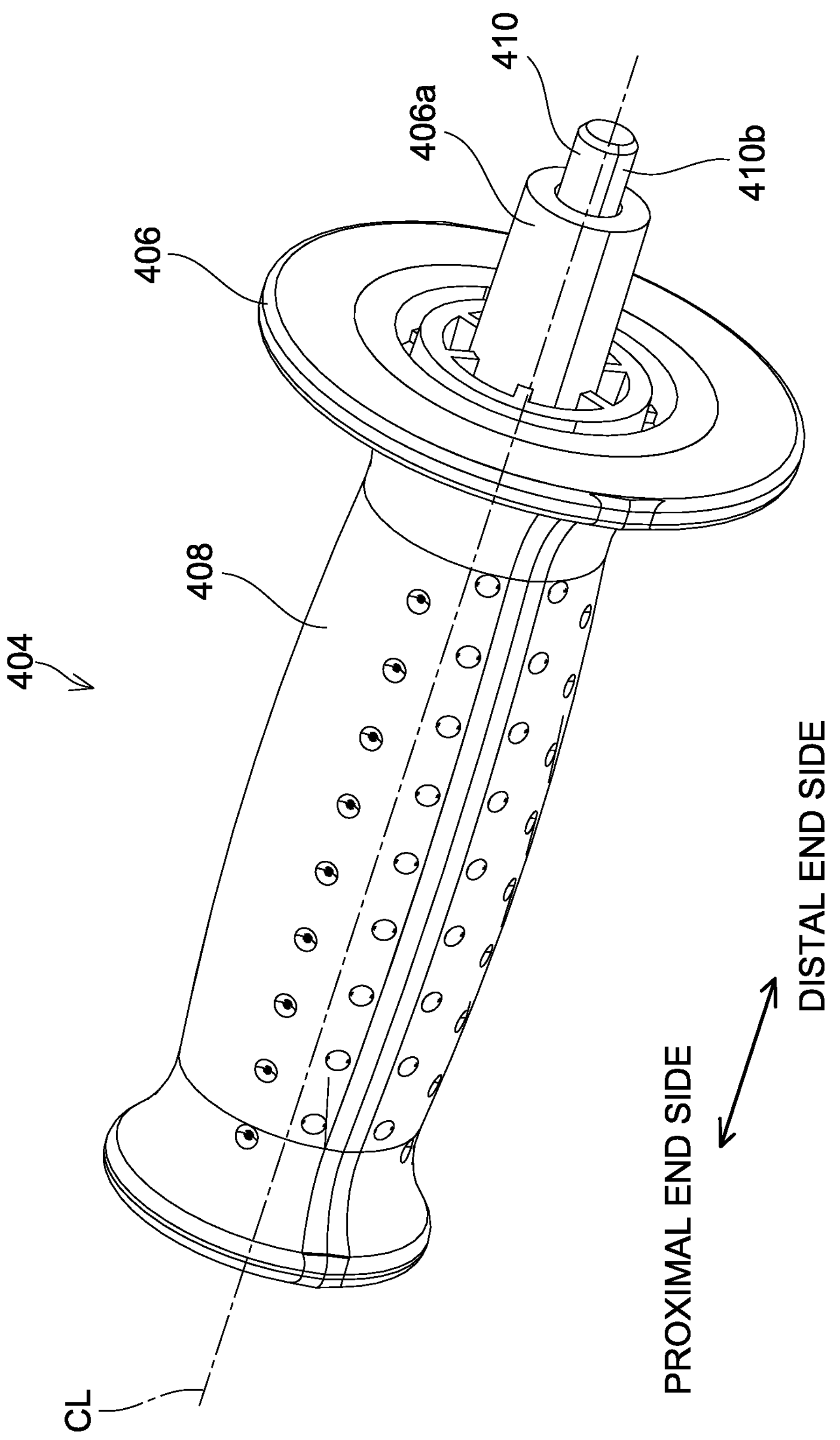
FIG. 25 illustrates a perspective view of a side handle 404 of the electric power tool 402 of the fourth embodiment.

As illustrated in FIG. 25, the side handle 404 is a common side handle which has conventionally been used. The side handle 404 includes a flange portion 406 and a handle portion 408. The flange portion 406 and the handle portion 408 are integrally formed. In the following explanation, along the central axis CL, a side where the flange portion 406 is when viewed from the handle portion 408 is referred to as the distal end side, and the opposite side of the distal end side is referred to as the proximal end side. The flange portion 406 includes a cylindrical portion 406*a* which protrudes toward the distal end side in a substantially cylindrical shape along the central axis CL. A bolt 410 is housed in the flange portion 62. A head portion 410*a* (see FIG. 28, FIG. 29) of the bolt 410 is non-rotatably held by the flange portion 406, and a shaft portion 410*b* protrudes beyond the end of the cylindrical portion 406*a* to the outside. An external thread is defined on the outer peripheral surface of the shaft portion 410*b* of the bolt 410.

Figure 26:
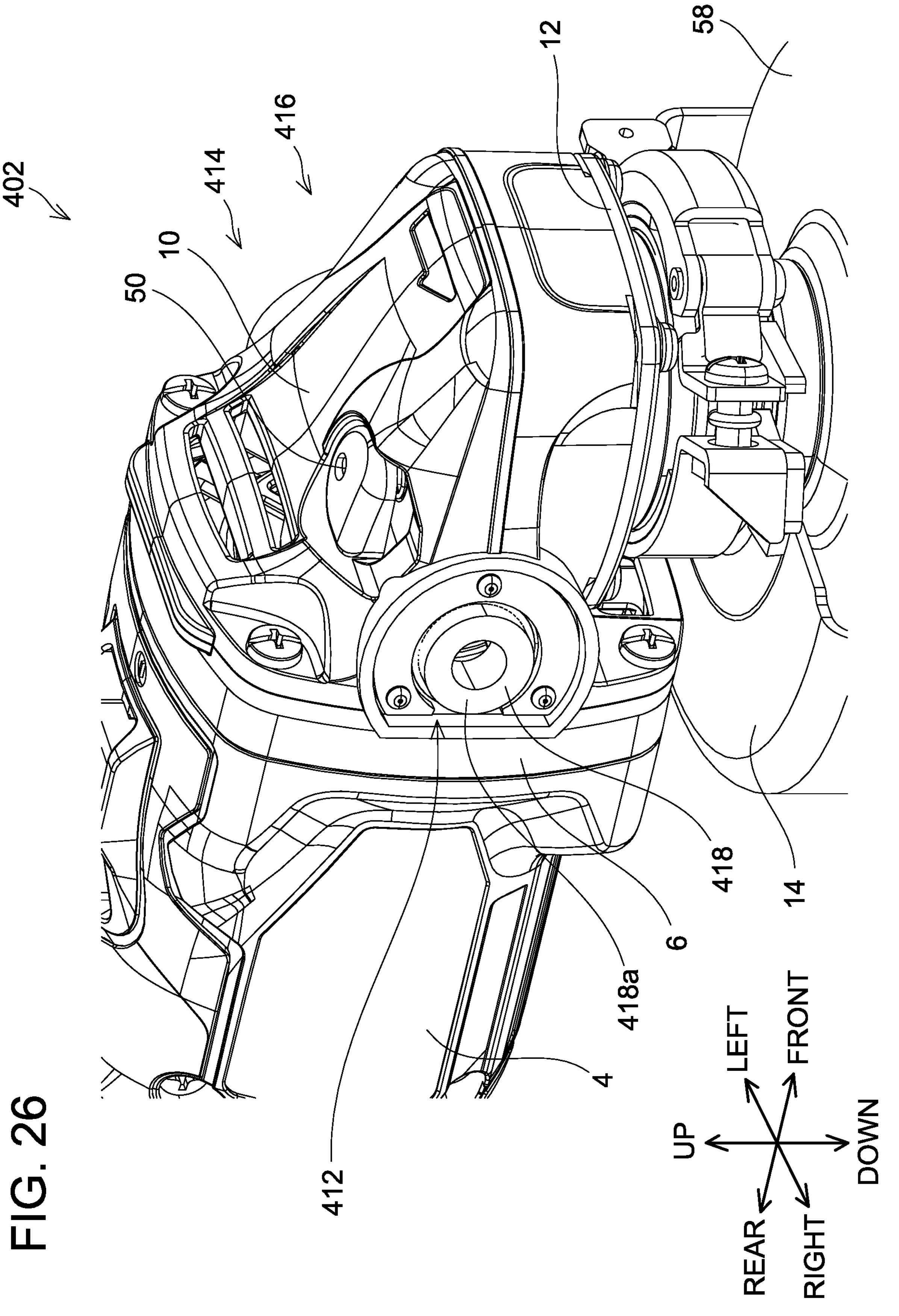
FIG. 26 illustrates a perspective view of a handle attachment portion 412 and its vicinity of the electric power tool 402 of the fourth embodiment viewed from the front right upper side.

As illustrated in FIGS. 24 and 26, the electric power tool 402 of the present embodiment does not include the spacer housing 8, and the gear housing 10 is attached in front of the motor cover 6. Further, in the electric power tool 402 of the present embodiment, instead of the handle attachment portions 80, 82, handle attachment portions 412, 414 are disposed at the gear housing 10. In the present embodiment, the motor housing 4, the motor cover 6, the gear housing 10 and the bearing box 12 may collectively and simply be referred to as a housing 416.

Figure 27:
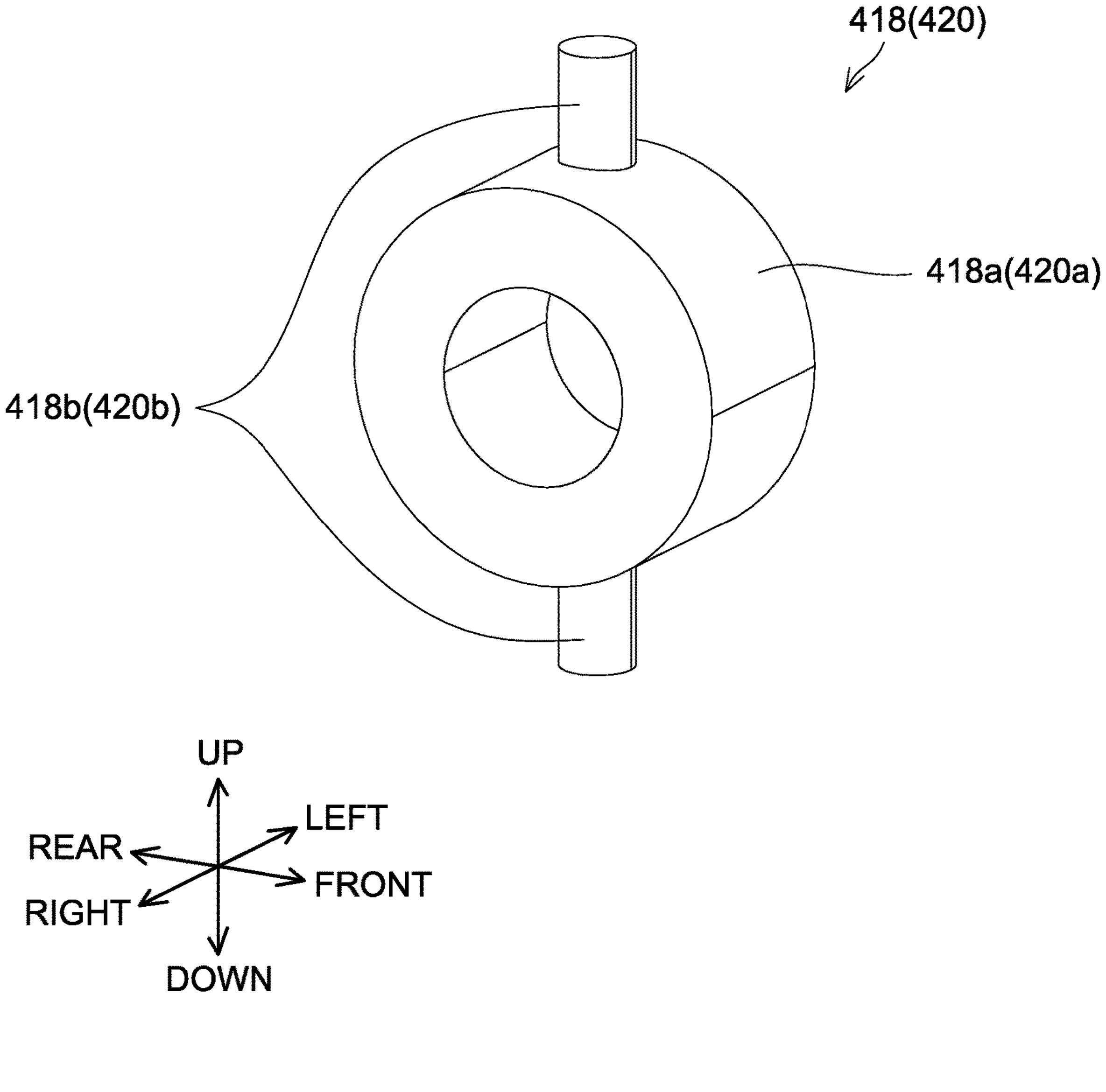
FIG. 27 illustrates a perspective view of holding members 418, 420 of the electric power tool 402 of the fourth embodiment.

The handle attachment portion 412 is disposed at the right surface of the gear housing 10, and the handle attachment portion 414 is disposed at the left surface of the gear housing 10. The handle attachment portions 412, 414 include holding members 418, 420. As illustrated in FIG. 27, the holding members 418, 420 include cylindrical portions 418*a*, 420*a* formed into substantially cylindrical shapes, and shaft portions 418*b*, 420*b* extending from the upper end and the lower end of the cylindrical portions 418*a*, 420*a* in the up-down direction. Internal screws corresponding to the external screw of the bolt 410 of the side handle 404 are defined on the inner peripheral surfaces of the cylindrical portions 418*a*, 420*a*. The holding members 418, 420 are supported by the gear housing 10 via the shaft portions 418*b*, 420*b* such that the holding members 418, 420 can swing about the swing axis which is along the up-down direction. The positions of the holding members 418, 420 when the holding members 418, 420 do not swing with respect to the gear housing 10 may be referred to stand-by positions, and the positions of the holding members 418, 420 when the holding members 418, 420 have swung with respect to the gear housing 10 may be referred to as swing positions.

Figure 28:
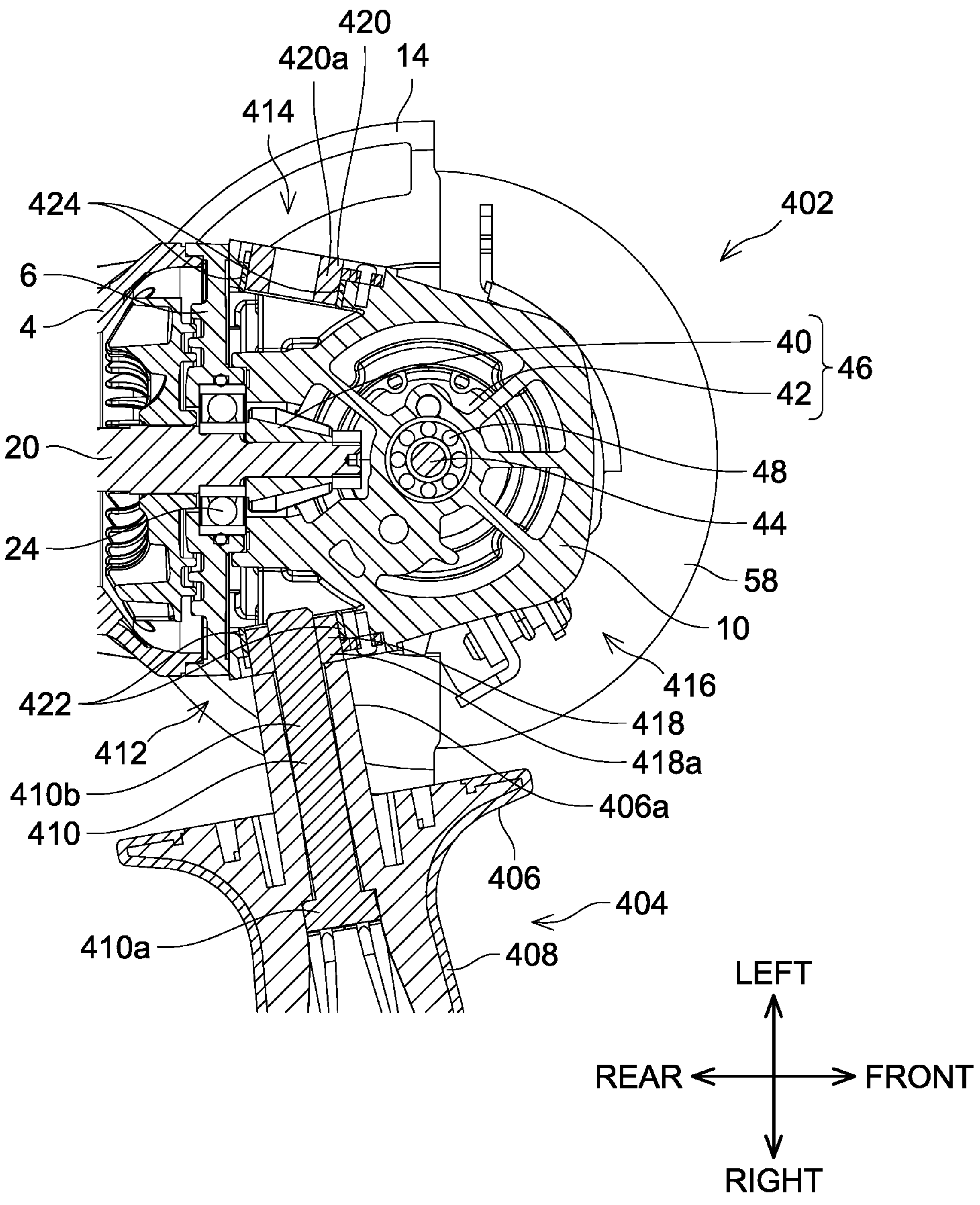
FIG. 28 illustrates a horizontal cross-sectional view of inner structures of handle attachment portions 412, 414 and their vicinity in the electric power tool 402 of the fourth embodiment, in the state in which the side handle 404 is attached to the handle attachment portion 412 and the user has not swung the side handle 404 with respect to the gear housing 10.
Figure 29:
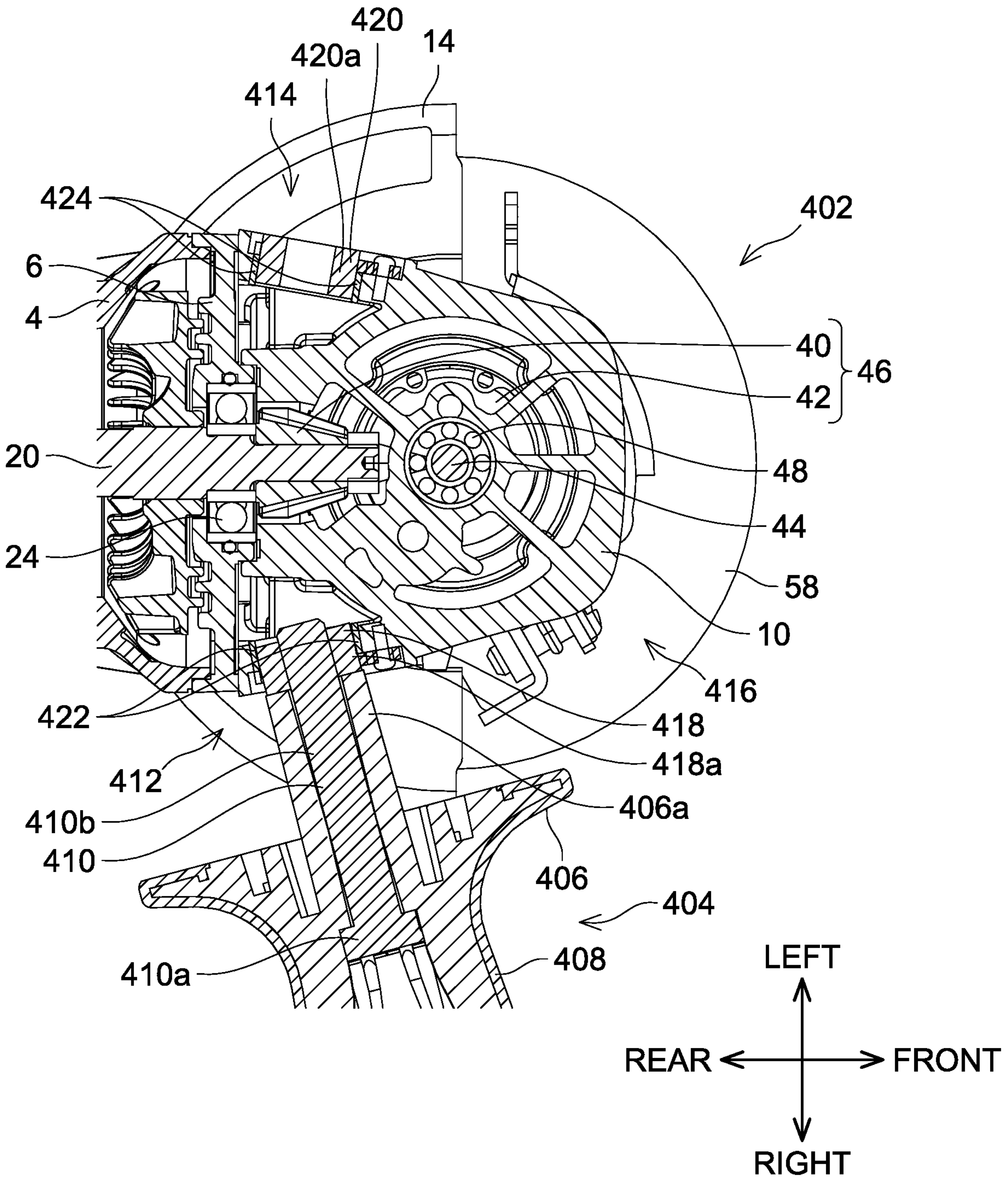
FIG. 29 illustrates a horizontal cross-sectional view illustrating the inner structures of the handle attachment portions 412, 414 and their vicinity in the electric power tool 402 of the fourth embodiment, in the state in which the side handle 404 is attached to the handle attachment portion 412 and the user has swung the side handle 404 with respect to the gear housing 10.

As illustrated in FIGS. 28 and 29, the electric power tool 402 of the present embodiment includes detection sensor 422, 424 instead of the sensor units 84, 86. The detection sensors 422, 424 are housed in the gear housing 10. The detection sensor 422 is disposed corresponding to the handle attachment portion 412, and the detection sensors 424 is disposed corresponding to the handle attachment portion 414. The detection sensors 422, 424 are pressure sensors disposed adjacent to the cylindrical portions 418*a*, 420*a* of the holding members 418, 420. The detection sensors 422, 424 are configured to detect pressures by which the cylindrical portions 418*a*, 420*a* press the detection sensors 422, 424 when the holding members 418, 420 have swung with respect to the gear housing 10. The detection sensors 422, 424 are connected to the control unit 28. The detection sensors 422, 424 transmit the on signal to the control unit 28 when the detection sensors 422, 424 detect pressures from the cylindrical portions 418*a*, 420*a* of the holding members 418, 420, and the detection sensors 422, 424 transmit the off signal to the control unit 28 when the detection sensors 422, 424 do not detect pressures from the cylindrical portions 418*a*, 420*a* of the holding members 418, 420.

As illustrated in FIG. 28, when the side handle 404 is to be attached to the handle attachment portion 412, the bolt 410 of the side handle 404 is screwed onto the cylindrical portion 418*a* of the holding member 418. Consequently, the side handle 404 can be attached to the handle attachment portion 412. In the state in which the side handle 404 is merely attached to the handle attachment portion 412, the detection sensors 422, 424 do not detect pressures from the cylindrical portions 418*a*, 420*a* of the holding members 418, 420, thus the detection sensors 422, 424 transmit the off signal to the control unit 28. In this case, the control unit 28 determines that the side handle 404 is not gripped by the user, and prohibits the rotation of the motor 18.

As described above, the holding member 418 is configured to swing about the swing axis along the up-down direction with respect to the gear housing 10. Therefore, the side handle 404 attached to the handle attachment portion 412 is also configured to swing about the swing axis along the up-down direction with respect to the gear housing 10. For example, as illustrated in FIG. 28, when the user swings the side handle 404 forward or rearward by gripping the side handle 404 with the side handle 404 attached to the handle attachment portion 412, as illustrated in FIG. 29, the cylindrical portion 418*a* of the holding member 418 presses the detection sensor 422, by which the detection sensor 422 transmits the on signal to the control unit 28. In this case, the control unit 28 determines that the side handle 404 is gripped by the user and allows rotation of the motor 18.

In the above description, the case in which the side handle 404 is attached to the handle attachment portion 412 is described, however, the same applies to the case in which the side handle 404 is attached to the handle attachment portion 414.

In the electric power tool 402 of the present embodiment, the detection sensors 422, 424 only need to detect the swings of the cylindrical portions 418*a*, 420*a* of the holding members 418, 420 in response to the user swinging the side handle 404, thus the detection sensors 422, 424 may by detections sensers other than pressure sensors, such as touch sensors.

As described above, the electric power tool 402 of the present embodiment comprises: the motor 18; the bevel gear 46 (an example of the power transmission mechanism) connected to the motor 18; the housing 416 that houses the motor 18 and the bevel gear 46; the spindle 44 (an example of the end tool holder) to which the grinding wheel 58 (an example of the end tool) is configured to be attached and from which the grinding wheel is configured to be detached, and connected to the bevel gear 46; and the side handle 404 (an example of the handle) attached to the housing 416. The electric power tool 402 is configured to prohibit rotation of the motor 18 when the user is not gripping the side handle 404.

According to the above configuration, since the rotation of the motor 18 is prohibited when the user is not gripping the side handle 404, it is possible to prevent the electric power tool 402 from being used while the side handle 404 is not gripped.

The electric power tool 402 of the present embodiment further comprises the holding members 418, 420 (examples of the intermediate member) each configured to move between the stand-by position (an example of the first position) and the swing position (an example of the second position). The holding members 418, 420 are in the stand-by positions when the user is not gripping the side handle 404, and move from the stand-by positions to the swing positions in response to the manipulation performed by the user while the user is gripping the side handle 404. The electric power tool 402 is configured to prohibit the rotation of the motor 18 when the holding members are in the stand-by positions, and allow the rotation of the motor 18 when the holding members 418, 420 are in the swing position.

According to the above configuration, the rotation of the motor 18 can be prohibited when the user is not gripping the side handle 404, and the rotation of the motor 18 can be allowed in response to the manipulation performed by the user while the user is gripping the side handle 404.

The electric power tool 402 of the present embodiment further comprises: the control unit 28 configured to control an operation of the motor 18; and the detection sensors 422, 424 connected to the control unit 28 and configured to detect movements of the holding members 418, 420. The control unit 28 is configured to prohibit the rotation of the motor 18 when the detection sensors 422, 424 do not detect that the holding members 418, 420 have moved from the stand-by positions to the swing positions, and allow the rotation of the motor 18 when the detection sensors 422, 424 detects that the holding members 418, 420 have moved from the stand-by positions to the swing positions.

According to the above configuration, since the state in which the rotation of the motor 18 is prohibited and the state in which the rotation of the motor 18 is allowed are switched in the control unit 28, it is possible to further simplify the mechanical configuration of the electric power tool 402.

In the electric power tool 402 of the present embodiment, the detection sensors 422, 424 are non-contact type detection sensors. The holding members 418, 420 press the detection sensors 422, 424 when the holding members 418, 420 are in the swing positions. The holding members 418,

420 do not press the detection sensors 422, 424 when the holding members 418, 420 are in the stand-by positions.

According to the above configuration, it is possible to further simplify the configuration of an electric system of the electric power tool 402.

In the electric power tool 402 of the present embodiment, the holding members 418, 420 are swingably supported by the housing 416. The side handle 404 is fixed to the holding members 418, 420. The holding members 418, 420 swing from the stand-by positions to the swing positions by the user swinging the side handle 404 with respect to the housing 416.

According to the above configuration, with a simple configuration, it is possible to prohibit the rotation of the motor when the user is not gripping the side handle 404, and it is possible to allow the rotation of the motor 18 when the user has swung the side handle 404 by gripping the side handle 404.

The electric power tool 402 of the present embodiment further comprises the battery 26 detachably attached to the housing 416 and configured to supply power to the motor 18.

According to the above configuration, it is possible to supply power to the motor 18 without connecting the electric power tool 402 to an external power source with a power cable.

The electric power tool 402 of the present embodiment is configured to use the grinding wheel 58 as the end tool. The electric power tool 402 is configured to function as a grinder.

According to the above configuration, it is possible to prevent the electric power tool 402 functioning as the grinder from being used while the side handle 404 is not gripped.

In the electric power tool 402 of the present embodiment, the housing 416 includes the motor housing 4 (an example of a grip). The user is able to use the electric power tool 402 with one hand gripping the motor housing 4 and the other hand gripping the side handle 404.

According to the above configuration, when using the electric power tool 402, the user can stably hold the electric power tool 402 by gripping the motor housing 4 with his/her one hand and gripping the side handle 404 with the other hand.

Fifth Embodiment

Figure 30:
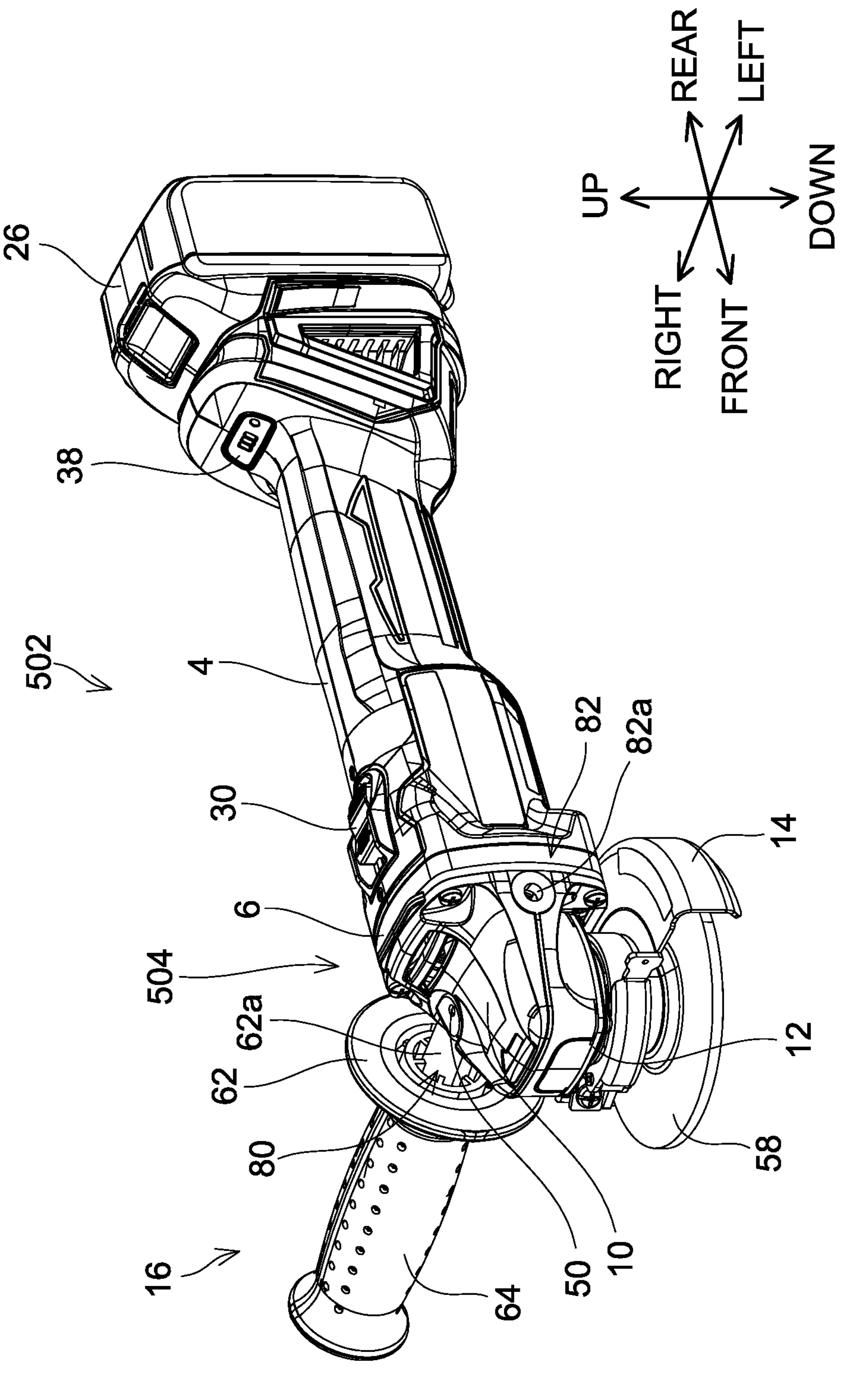
FIG. 30 illustrates a perspective view of an electric power tool 502 of a fifth embodiment viewed from the front left upper side.

As illustrated in FIG. 30, an electric power tool 502 of the present embodiment has a configuration substantially similar to the electric power tool 2 of the first embodiment. Hereinafter, points of the electric power tool 502 of the present embodiment different from the electric power tool 2 of the first embodiment will be described.

The electric power tool 502 of the present embodiment does not include the spacer housing 8, and the gear housing 10 is attached in front of the motor cover 6. Further, the electric power tool 502 of the present embodiment does not include the sensor units 84, 86. In the present embodiment, the motor housing 4, the motor cover 6, the gear housing 10 and the bearing box 12 may collectively and simply be referred to as a housing 504.

Figure 31:
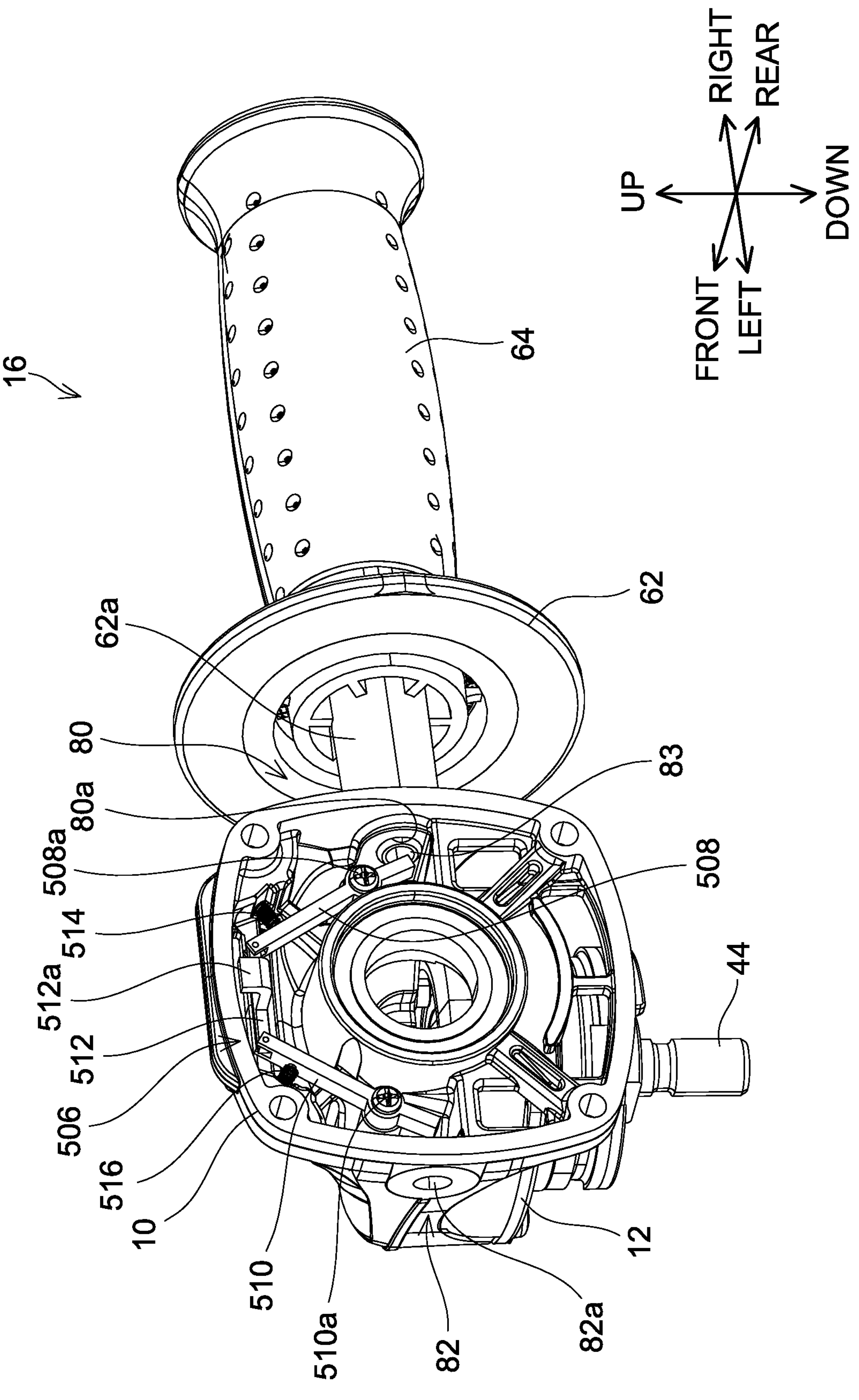
FIG. 31 illustrates a perspective view of the inner structure of the gear housing 10 of the electric power tool 502 of the fifth embodiment viewed from the rear left upper side.

As illustrated in FIG. 31, in the electric power tool 502 of the present embodiment, a lock mechanism 506 is housed inside the gear housing 10. The lock mechanism 506 includes a right arm member 508, a left arm member 510, an upper arm member 512, and compression springs 514, 516.

The right arm member 508 is swingably supported by the gear housing 10 about a swing shaft 508*a* extending along the front-rear direction. The right arm member 508 is disposed, inside the gear housing 10, tilting such that its upper end is disposed on the left side and its lower end is disposed on the right side. The lower end of the right arm member 508 is disposed to face the handle attachment hole 80*a* on the right surface of the gear housing 10. The upper end of the right arm member 508 is swingably connected to the right end of the upper arm member 512. The vicinity of the upper end of the right arm member 508 is biased downward and leftward with respect to the gear housing 10 by the compression spring 514.

The left arm member 510 is swingably supported by the gear housing 10 about a swing shaft 510*a* extending along the front-rear direction. The left arm member 510 is disposed, inside the gear housing 10, tilting such that its upper end is disposed on the right side and its lower end is disposed on the left side. The lower end of the left arm member 510 is disposed to face the handle attachment hole 82*a* on the left surface of the gear housing 10. The upper end of the left arm member 510 is swingably connected to the left end of the upper arm member 512. The vicinity of the upper end of the left arm member 510 is biased downward and rightward with respect to the gear housing 10 by the compression spring 516.

The upper arm member 512 is disposed along the left-right direction at the vicinity of the upper end of interior of the gear housing 10. At the center of the upper arm member 512, a stopper piece 512*a* having a shape projecting rearward and further bent upward is disposed.

Figure 32:
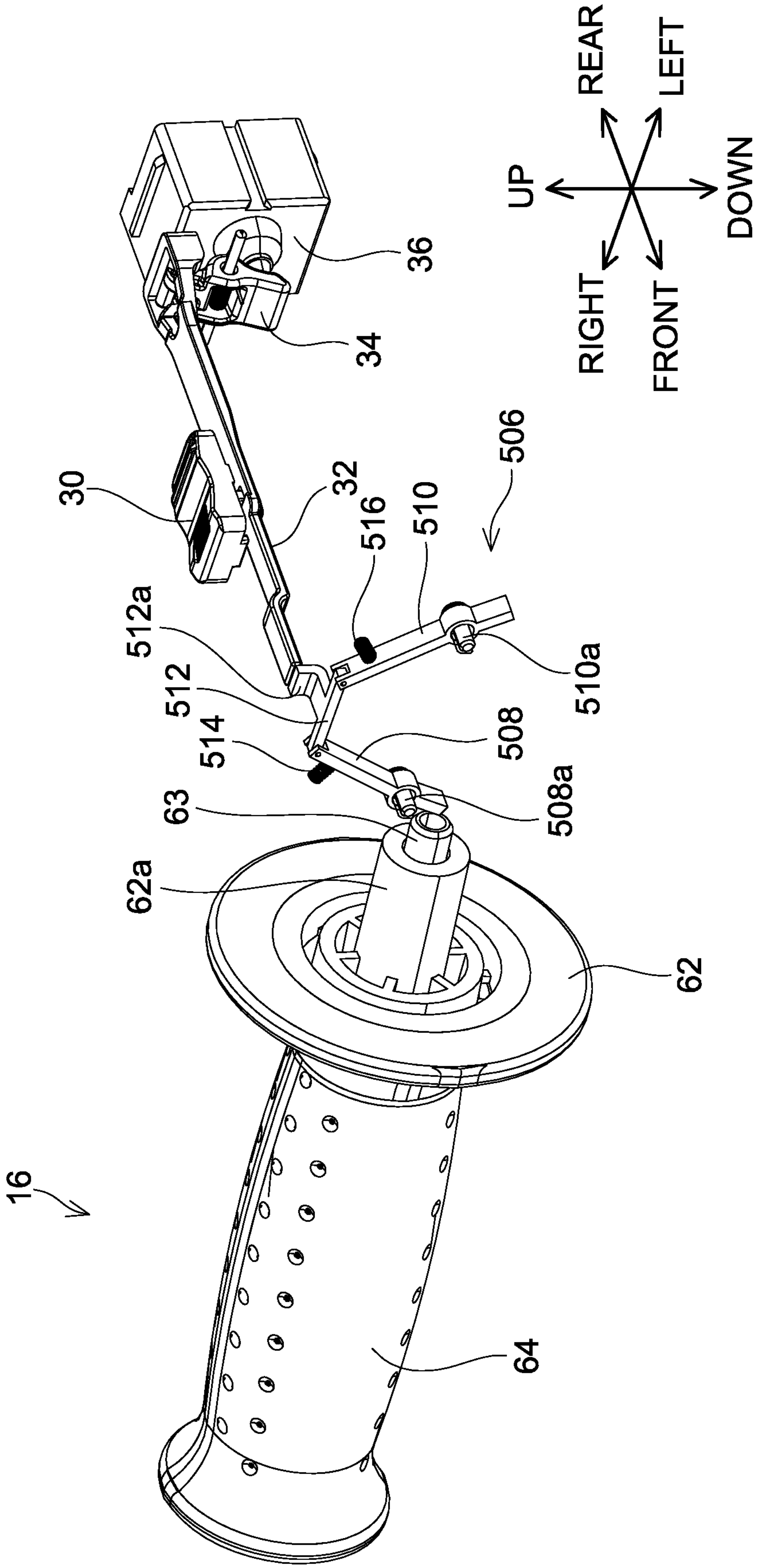
FIG. 32 illustrates a perspective view of a positional relationship of a main manipulation member 30, a first link member 32, a second link member 34, a main switch 36, a side handle 16 and a lock mechanism 506 in the electric power tool 502 of the fifth embodiment viewed from the front left upper side, in the state in which the side handle 16 is attached to the handle attachment portion 80 and the user has not rotated the handle portion 64 of the side handle 16 with respect to the flange portion 62.
Figure 33:
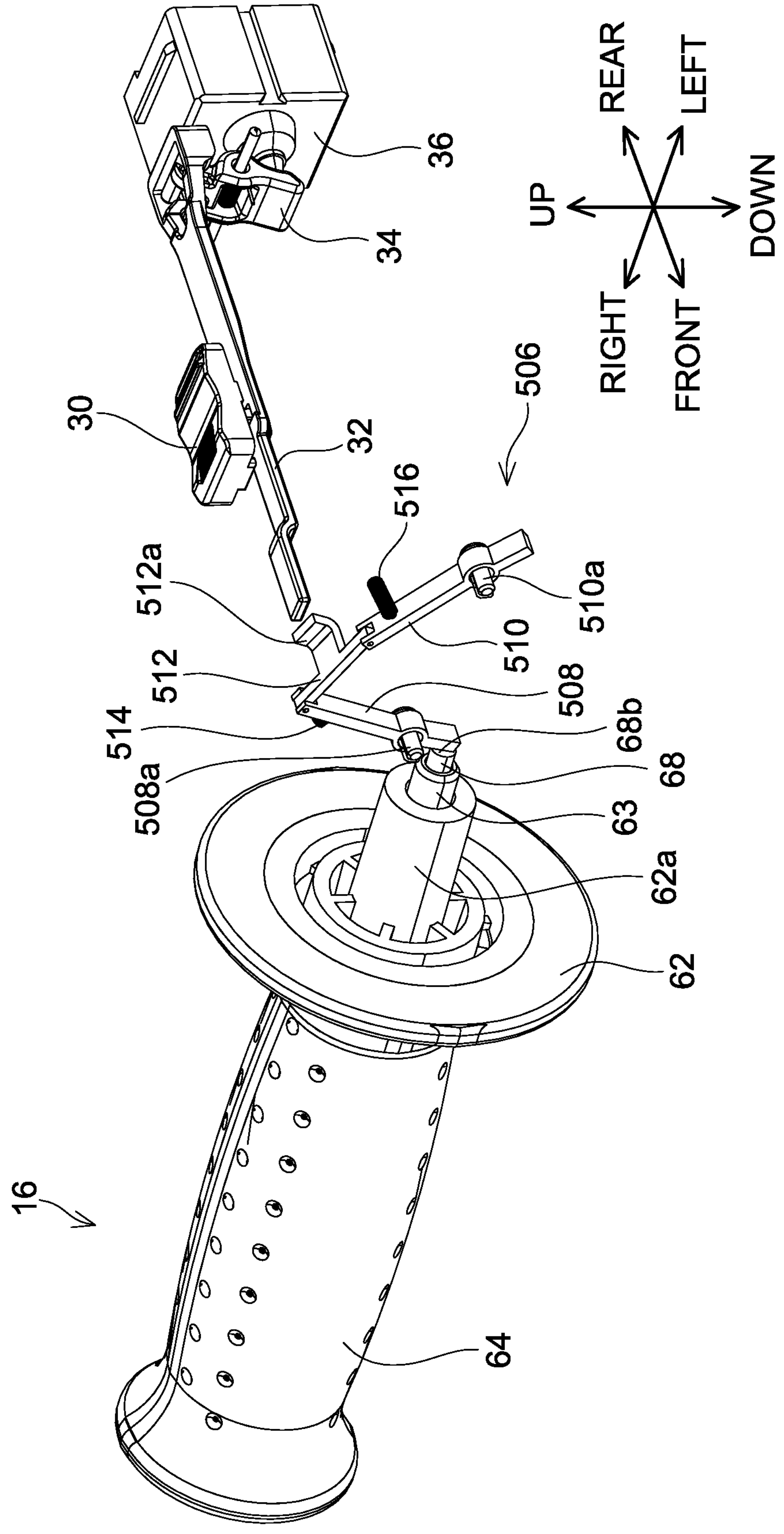
FIG. 33 illustrates a perspective view of the positional relationship of the main manipulation member 30, the first link member 32, the second link member 34, the main switch 36, the side handle 16 and the lock mechanism 506 in the electric power tool 502 of the fifth embodiment viewed from the front left upper side, in the state in which the side handle 16 is attached to the handle attachment portion 80 and the user has rotated the handle portion 64 of the side handle 16 with respect to the flange portion 62.

FIGS. 32 and 33 illustrate a positional relationship between the first link member 32 and the second link member 34 that transmit, to the main switch 36, a manipulation by the user to the main manipulation member 30 on the upper surface of the motor housing 4, the side handle 16, and the lock mechanism 506. In FIGS. 32 and 33, the side handle 16 is attached to the handle attachment portion 80, and the main manipulation member 30 is disposed in the off position on the rear side. Further, FIG. 32 illustrates the state in which the side handle 16 is not gripped by the user and the handle portion 64 has not rotated with respect to the flange portion 62, and FIG. 33 illustrates the state in which the side handle 16 is gripped by the user and the handle portion 64 has rotated with respect to the flange portion 62.

In the electric power tool 502 of the present embodiment, the front end of the first link member 32 extends forward beyond the main manipulation member 30. In the state in which the main manipulation member 30 is in the off position on the rear side, the front end of the first link member 32 is disposed at a position close to and facing the rear end of the stopper piece 512*a* of the upper arm member 512 of the lock mechanism 506. Therefore, as illustrated in FIG. 32, in the state in which the side handle 16 is not gripped by the user and the handle portion 64 has not rotated with respect to the flange portion 62, the manipulation by the user to move the main manipulation member 30 from the off position on the rear side to the on position on the front side is prohibited by the stopper piece 512*a*. In this case, since the main switch 36 does not transmit the on signal to the control unit 28, rotation of the motor 18 is prohibited. The position of the stopper piece 512*a* illustrated in FIG. 32 is also referred to as a prohibited position.

When the user grips the side handle 16 and rotates the handle portion 64 with respect to the flange portion 62 from the state illustrated in FIG. 32, as illustrated in FIG. 33, the protrusion 68*b* of the inner pin 68 protrudes beyond the end of the hollow bolt 63 and presses the lower end of the right arm member 508 leftward. Consequently, the right arm member 508 swings in the direction in which its upper end moves rightward, and in conjunction therewith the left arm member 510 and the upper arm member 512 also swing, by which the stopper piece 512*a* sinks in the rightward and downward direction relative to the front end of the first link member 32. In this state, the user's manipulation to move the main manipulation member 30 from the off position on the rear side to the on position on the front side is not prohibited by the stopper piece 512*a*. That is, the user's manipulation to move the main manipulation member 30 from the off position on the rear side to the on position on the front side is allowed, and when the main manipulation member 30 has moved from the off position to the on position, the main switch 36 transmits the on signal to the control unit 28, and the motor 18 rotates. The position of the stopper piece 512*a* illustrated in FIG. 33 is also referred to as an allowed position.

When the user releases his/her hand from the side handle 16 from the state illustrated in FIG. 33, the handle portion 64 rotates in the opposite direction with respect to the flange portion 62, by which the protrusion 68*b* of the inner pin 68 retracts into the interior of the hollow bolt 63. In this case, the right arm member 508, the left arm member 510, and the upper arm member 512 return to positions where the biasing force of the compression springs 514, 516 is balanced, by which the state illustrated in FIG. 32 recovers.

In the above description, the case in which the side handle 16 is attached to the handle attachment portion 80 is described, however, the same applies to the case in which the side handle 16 is attached to the handle attachment portion 82.

In the electric power tool 502 of the present embodiment, as with the electric power tool 202 of the second embodiment, the handle attachment portions 216, 218 (see FIGS. 16 and 17) may be disposed at the gear housing 10 instead of the handle attachment portions 80, 82, and the side handle 204 (see FIGS. 12-14) may be used instead of the side handle 16.

As described above, the electric power tool 502 of the present embodiment comprises: the motor 18; the bevel gear 46 (an example of the power transmission mechanism) connected to the motor 18; the housing 504 that houses the motor 18 and the bevel gear 46; the spindle 44 (an example of the end tool holder) to which the grinding wheel 58 (an example of the end tool) is configured to be attached and from which the grinding wheel is configured to be detached, and connected to the bevel gear 46; and the side handle 16 (an example of the handle) attached to the housing 504. The electric power tool 502 is configured to prohibit rotation of the motor 18 when the user is not gripping the side handle 16.

According to the above configuration, since the rotation of the motor 18 is prohibited when the user is not gripping the side handle 16, it is possible to prevent the electric power tool 502 from being used while the side handle 16 is not gripped.

The electric power tool 502 of the present embodiment further comprises the stopper piece 512*a* (an example of the intermediate member) configured to move between the prohibited position (an example of the first position) and the allowed position (an example of the second position). The stopper piece 512*a* is in the prohibited position when the user is not gripping the side handle 16, and moves from the prohibited position to the allowed position in response to the manipulation performed by the user while the user is gripping the side handle 16. The electric power tool 502 is configured to prohibit the rotation of the motor 18 when the stopper piece 512*a* is in the prohibited position, and allow the rotation of the motor 18 when the stopper piece 512*a* is in the allowed position.

According to the above configuration, the rotation of the motor 18 can be prohibited when the user is not gripping the side handle 16, and the rotation of the motor 18 can be allowed in response to the manipulation performed by the user while the user is gripping the side handle 16.

In the electric power tool 502 of the present embodiment, the side handle 16 comprises: the flange portion 62 (an example of the handle body); and the handle portion 64 (an example of the handle manipulation member) disposed on the flange portion 62 and configured to be manipulated by the user. The stopper piece 512*a* moves from the prohibited position to the allowed position in conjunction with the manipulation to the handle portion 64 by the user.

According to the above configuration, with a simple configuration, the rotation of the motor 18 can be prohibited when the user is not gripping the side handle 16, and the rotation of the motor 18 can be allowed in response to the manipulation performed by the user while the user is gripping the side handle 16.

The electric power tool 502 of the present embodiment further comprises the main manipulation member 30 configured to move between the on position and the off position according to the manipulation by the user. The electric power tool 502 is configured to rotate the motor 18 when the main manipulation member 30 is in the on position and stop the rotation of the motor 18 when the main manipulation member 30 is in the off position. The movement of the main manipulation member 30 from the off position to the on position is prohibited when the stopper piece 512*a* is in the prohibited position. The movement of the main manipulation member 30 from the off position to the on position is allowed when the stopper piece 512*a* is in the allowed position.

In the above configuration, when the movement of the main manipulation member 30 from the off position to the on position is prohibited, the rotation of the motor 18 is prohibited, and when the movement of the main manipulation member 30 from the off position to the on position is allowed, the rotation of the motor 18 is allowed. According to the above configuration, with a simple configuration, it is possible to prohibit the rotation of the motor 18 when the user is not gripping the side handle 16, and it is possible to allow the rotation of the motor 18 in response to the manipulation performed by the user while the user is gripping the side handle 16.

The electric power tool 502 of the present embodiment further comprises the battery 26 detachably attached to the housing 504 and configured to supply power to the motor 18.

According to the above configuration, it is possible to supply power to the motor 18 without connecting the electric power tool 502 to an external power source with a power cable.

The electric power tool 502 of the present embodiment is configured to use the grinding wheel 58 as the end tool. The electric power tool 502 is configured to function as a grinder.

According to the above configuration, it is possible to prevent the electric power tool 502 functioning as the grinder from being used while the side handle 16 is not gripped.

In the electric power tool 502 of the present embodiment, the housing 504 includes the motor housing 4 (an example of the grip). The user is able to use the electric power tool 502 with one hand gripping the motor housing 4 and the other hand gripping the side handle 16.

According to the above configuration, when using the electric power tool 502, the user can stably hold the electric power tool 502 by gripping the motor housing 4 with his/her one hand and gripping the side handle 16 with the other hand.

Sixth Embodiment

Figure 34:
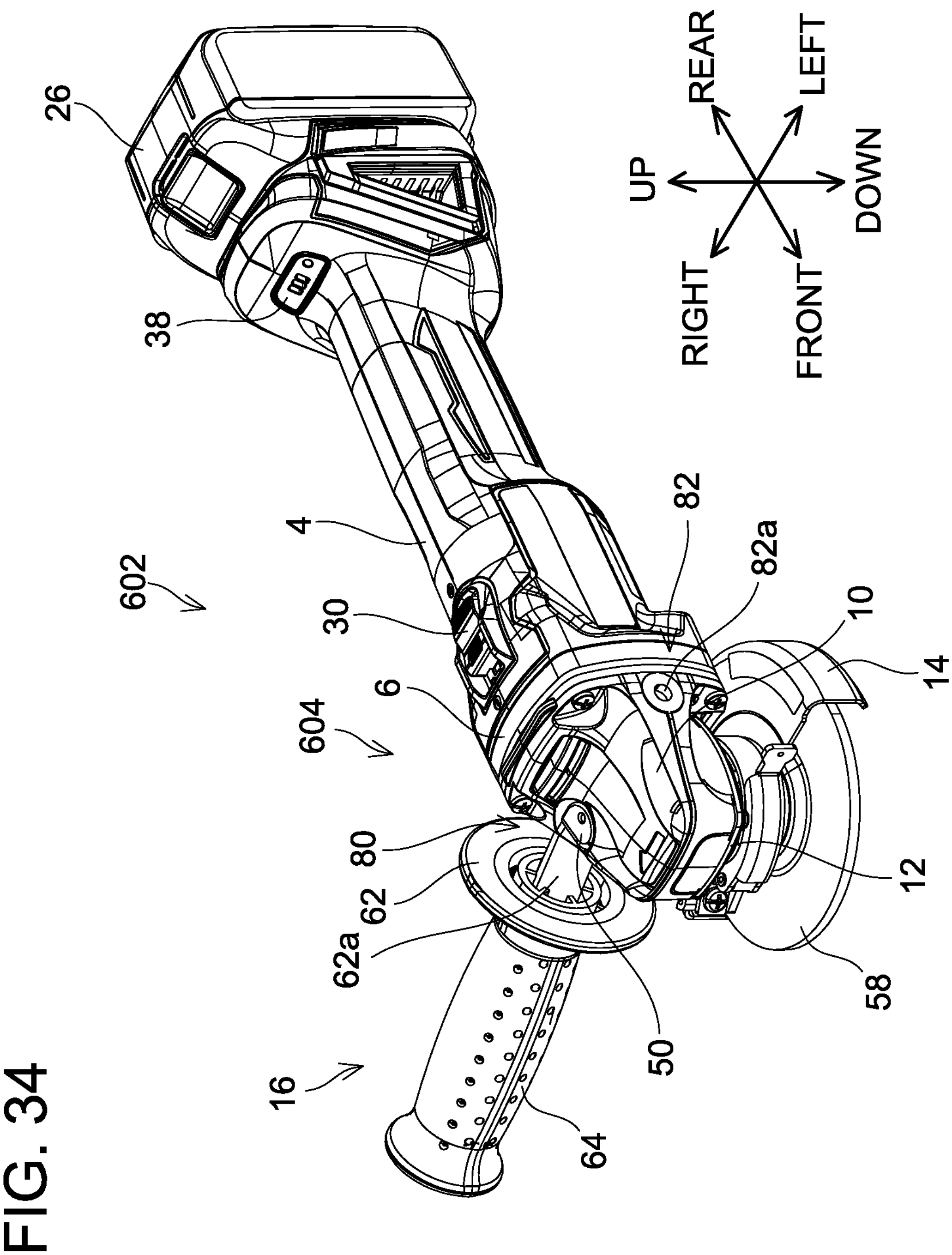
FIG. 34 illustrates a perspective view of an electric power tool 602 of a sixth embodiment viewed from the front left upper side.

As illustrated in FIG. 34, an electric power tool 602 of the present embodiment has a configuration substantially similar to the electric power tool 2 of the first embodiment. Hereinafter, points of the electric power tool 602 of the present embodiment different from the electric power tool 2 of the first embodiment will be described.

The electric power tool 602 of the present embodiment does not include the spacer housing 8, and the gear housing 10 is attached in front of the motor cover 6. Further, the electric power tool 602 of the present embodiment does not include the sensor units 84, 86. In the present embodiment, the motor housing 4, the motor cover 6, the gear housing 10 and the bearing box 12 may collectively and simply be referred to as a housing 604.

Figure 35:
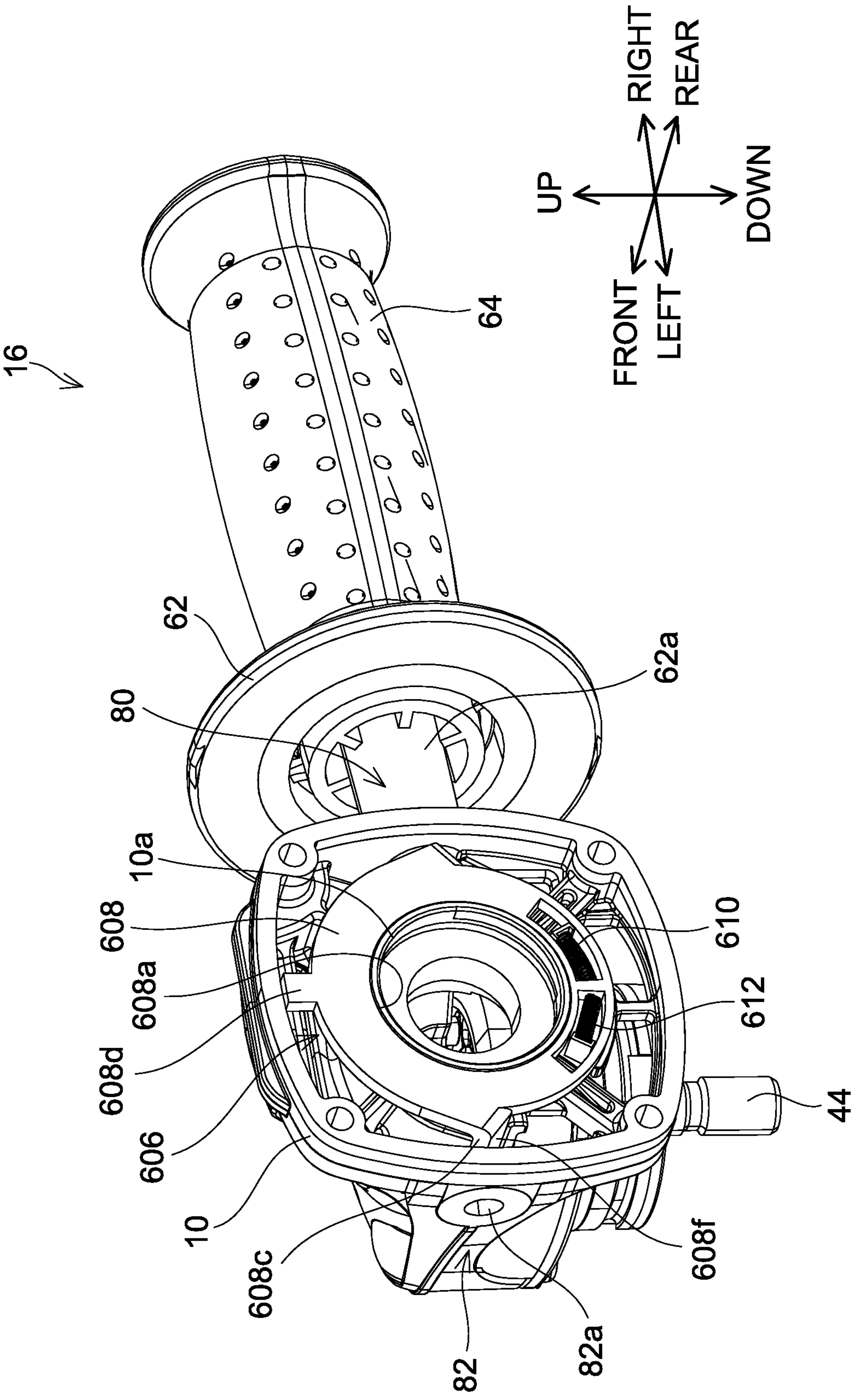
FIG. 35 illustrates a perspective view of an inner structure of the gear housing 10 of the electric power tool 602 of the sixth embodiment viewed from the rear left upper side.

As illustrated in FIG. 35, in the electric power tool 602 of the present embodiment, a lock mechanism 606 is housed inside the gear housing 10. The lock mechanism 606 includes a lock plate 608 and compression springs 610 and 612.

The lock plate 608 includes an opening **608*a* at its center, and is supported by the gear housing 10 by allowing a cylindrical portion 10*a* of the gear housing 10 to pass through the opening 608*a*. The cylindrical portion 10*a* has a substantially cylindrical shape extending along the front-rear direction, and the lock plate 608 is swingably supported by the gear housing 10 about the swing axis along the front-rear direction. The vicinity of the lower end of the lock plate 608 is biased leftward with respect to the gear housing 10 by the compression spring 610. The vicinity of the lower end of the lock plate 608 is biased rightward with respect to the gear housing 10 by the compression spring 612**.

Figure 36:
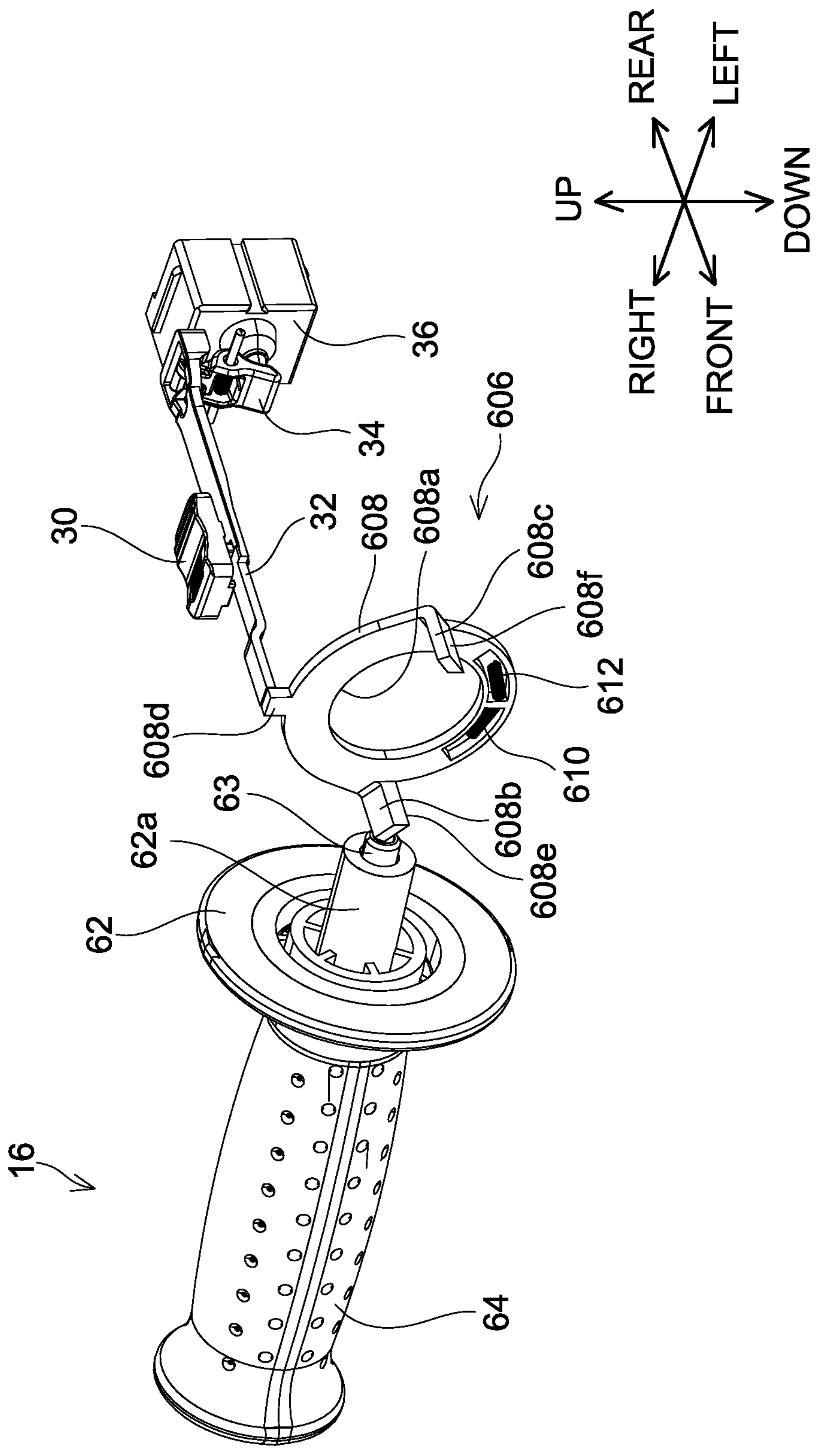
FIG. 36 illustrates a perspective view of a positional relationship of the main manipulation member 30, the first link member 32, the second link member 34, the main switch 36, the side handle 16 and a lock mechanism 606 in the electric power tool 602 of the sixth embodiment viewed from the front left upper side, in the state in which the side handle 16 is attached to the handle attachment portion 80 and the user has not rotated the handle portion 64 of the side handle 16 with respect to the flange portion 62.
Figure 37:
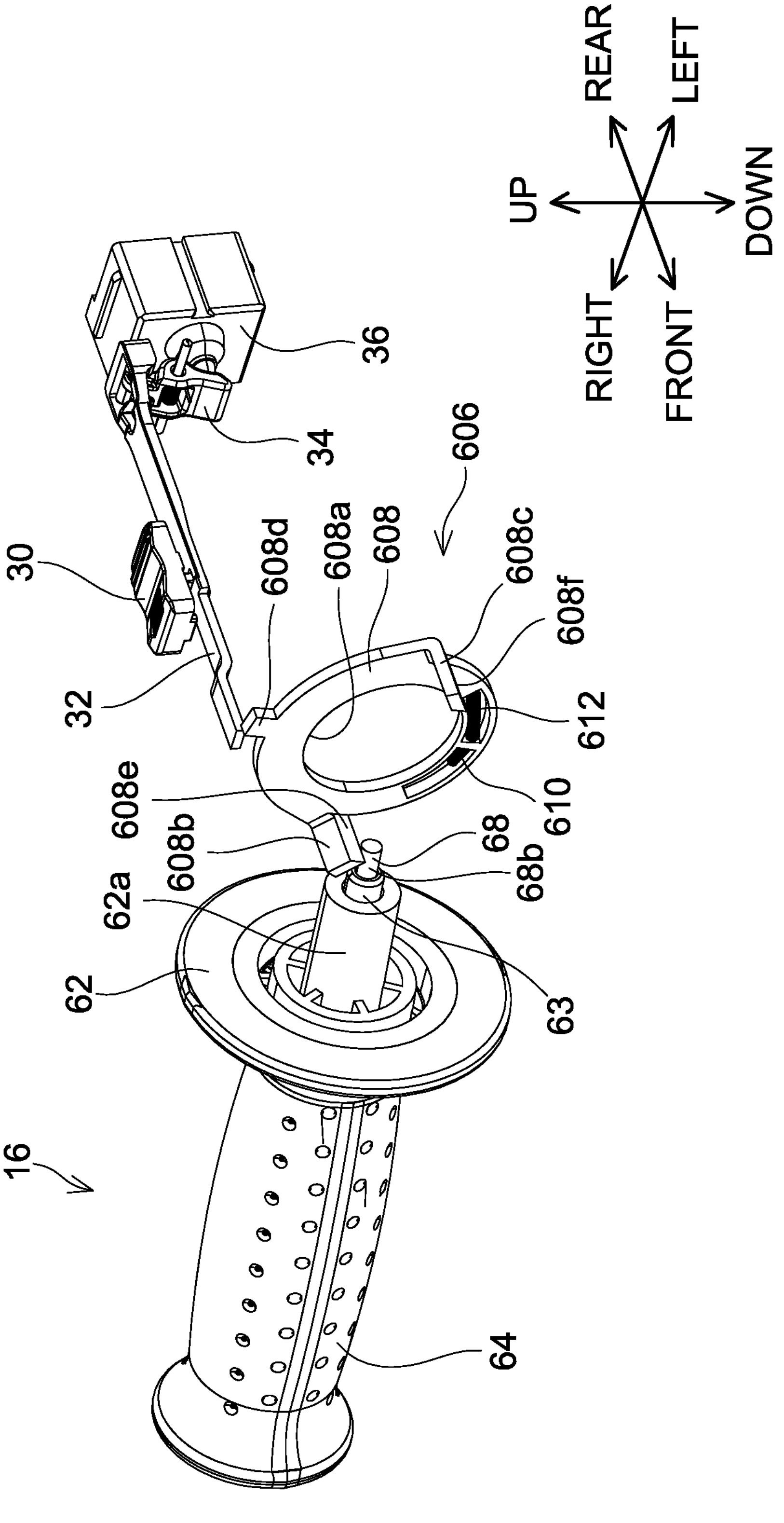
FIG. 37 illustrates a perspective view of the positional relationship of the main manipulation member 30, the first link member 32, the second link member 34, the main switch 36, the side handle 16 and the lock mechanism 606 in the electric power tool 602 of the sixth embodiment viewed from the front left upper side, in the state in which the side handle 16 is attached to the handle attachment portion 80 and the user has rotated the handle portion 64 of the side handle 16 with respect to the flange portion 62.

FIGS. 36 and 37 illustrate a positional relationship between the first link member 32 and the second link member 34 that transmit, to the main switch 36, a manipulation by the user to the main manipulation member 30 on the upper surface of the motor housing 4, and the lock mechanism 606. In FIGS. 36 and 37, the side handle 16 is attached to the handle attachment portion 80, and the main manipulation member 30 is disposed in the off position on the rear side. Further, FIG. 36 illustrates the state in which the side handle 16 is not gripped by the user and the handle portion 64 has not rotated with respect to the flange portion 62, and FIG. 37 illustrates the state in which the side handle 16 is gripped by the user and the handle portion 64 has rotated with respect to the flange portion 62.

The lock plate 608 includes a right cam piece **608*b* protruding forward at the vicinity of the right end, a left cam piece 608*c* protruding forward at the vicinity of the left end, and a stopper piece 608*d* protruding upward at the vicinity of the upper end. The lower surface of the right cam piece 608*b* constitutes a cam surface 608*e*. The cam surface 608*e* is inclined downward from the right side toward the left side. The cam surface 608*e* is disposed to face the handle attachment hole 80*a* on the right surface of the gear housing 10. The lower surface of the left cam piece 608*c* constitutes a cam surface 608*f*. The cam surface 608*f* is inclined downward from the left side toward the right side. The cam surface 608*f* is disposed to face the handle attachment hole 82*a* on the left surface of the gear housing 10**.

In the electric power tool 602 of the present embodiment, the front end of the first link member 32 extends forward beyond the main manipulation member 30. In the state in which the main manipulation member 30 is in the off position on the rear side, the front end of the first link member 32 is disposed at a position close to and facing the rear end of the stopper piece **608*d* of the lock plate 608 of the lock mechanism 606. Therefore, as illustrated in FIG. 36, in the state in which the side handle 16 is not gripped by the user and the handle portion 64 has not rotated with respect to the flange portion 62, the manipulation by the user to move the main manipulation member 30 from the off position on the rear side to the on position on the front side is prohibited by the stopper piece 608*d*. In this case, since the main switch 36 does not transmit the on signal to the control unit 28, rotation of the motor 18 is prohibited. The position of the stopper piece 608*d* illustrated in FIG. 36** is also referred to as a prohibited position.

When the user grips the side handle 16 and rotates the handle portion 64 with respect to the flange portion 62 from the state illustrated in FIG. 36, as illustrated in FIG. 37, the protrusion **68*b* of the inner pin 68 protrudes beyond the end of the hollow bolt 63 and presses the cam surface 608*e* of the right cam piece 608*b*. Consequently, the lock plate 608 swings in the direction in which the right cam piece 608*b* moves upward, by which the stopper piece 608*d* moves leftward relative to the front end of the first link member 32. In this state, the user's manipulation to move the main manipulation member 30 from the off position on the rear side to the on position on the front side is not prohibited by the stopper piece 608*d*. That is, the user's manipulation to move the main manipulation member 30 from the off position on the rear side to the on position on the front side is allowed, and when the main manipulation member 30 is moved from the off position to the on position, the main switch 36 transmits the on signal to the control unit 28, and the motor 18 rotates. The position of the stopper piece 608*d* illustrated in FIG. 37** is also referred to as an allowed position.

When the user releases his/her hand from the side handle 16 from the state illustrated in FIG. 37, the handle portion 64 rotates in the opposite direction with respect to the flange portion 62, by which the protrusion **68*b* of the inner pin 68 retracts into the interior of the hollow bolt 63. In this case, the lock plate 608 returns to the position where the biasing force of the compression springs 610, 612 is balanced, and the state illustrated in FIG. 36** recovers.

In the above description, the case in which the side handle 16 is attached to the handle attachment portion 80 is described, however, the same applies to the case in which the side handle 16 is attached to the handle attachment portion 82.

In the electric power tool 602 of the present embodiment, as with the electric power tool 202 of the second embodiment, the handle attachment portions 216, 218 (see FIGS. 16 and 17) may be disposed at the gear housing 10 instead of the handle attachment portions 80, 82, and the side handle 204 (see FIGS. 12-14) may be used instead of the side handle 16.

As described above, the electric power tool 602 of the present embodiment comprises: the motor 18; the bevel gear 46 (an example of the power transmission mechanism) connected to the motor 18; the housing 604 that houses the motor 18 and the bevel gear 46; the spindle 44 (an example of the end tool holder) to which the grinding wheel 58 (an example of the end tool) is configured to be attached and from which the grinding wheel is configured to be detached, and connected to the bevel gear 46; and the side handle 16 (an example of the handle) attached to the housing 604. The electric power tool 602 is configured to prohibit rotation of the motor 18 when the user is not gripping the side handle 16.

According to the above configuration, since the rotation of the motor 18 is prohibited when the user is not gripping the side handle 16, it is possible to prevent the electric power tool 602 from being used while the side handle 16 is not gripped.

The electric power tool 602 of the present embodiment further comprises the stopper piece 608*d* (an example of the intermediate member) configured to move between the prohibited position (an example of the first position) and the allowed position (an example of the second position). The stopper piece 608*d* is in the prohibited position when the user is not gripping the side handle 16, and moves from the prohibited position to the allowed position in response to the manipulation performed by the user while the user is gripping the side handle 16. The electric power tool 602 is configured to prohibit the rotation of the motor 18 when the stopper piece 608*d* is in the prohibited position, and allow the rotation of the motor 18 when the stopper piece 608*d* is in the allowed position.

According to the above configuration, the rotation of the motor 18 can be prohibited when the user is not gripping the side handle 16, and the rotation of the motor 18 can be allowed in response to the manipulation performed by the user while the user is gripping the side handle 16.

In the electric power tool 602 of the present embodiment, the side handle 16 comprises: the flange portion 62 (an example of the handle body); and the handle portion 64 (an example of the handle manipulation member) disposed on the flange portion 62 and configured to be manipulated by the user. The stopper piece 608*d* moves from the prohibited position to the allowed position in conjunction with the manipulation to the handle portion 64 by the user.

According to the above configuration, with a simple configuration, the rotation of the motor 18 can be prohibited when the user is not gripping the side handle 16, and the rotation of the motor 18 can be allowed in response to the manipulation performed by the user while the user is gripping the side handle 16.

The electric power tool 602 of the present embodiment further comprises the main manipulation member 30 configured to move between the on position and the off position according to the manipulation by the user. The electric power tool 602 is configured to rotate the motor 18 when the main manipulation member 30 is in the on position and stop the rotation of the motor 18 when the main manipulation member 30 is in the off position. The movement of the main manipulation member 30 from the off position to the on position is prohibited when the stopper piece 608*d* is in the prohibited position. The movement of the main manipulation member 30 from the off position to the on position is allowed when the stopper piece 608*d* is in the allowed position.

In the above configuration, when the movement of the main manipulation member 30 from the off position to the on position is prohibited, the rotation of the motor 18 is prohibited, and when the movement of the main manipulation member 30 from the off position to the on position is allowed, the rotation of the motor 18 is allowed. According to the above configuration, with a simple configuration, it is possible to prohibit the rotation of the motor 18 when the user is not gripping the side handle 16, and it is possible to allow the rotation of the motor 18 in response to the manipulation performed by the user while the user is gripping the side handle 16.

The electric power tool 602 of the present embodiment further comprises the battery 26 detachably attached to the housing 604 and configured to supply power to the motor 18.

According to the above configuration, it is possible to supply power to the motor 18 without connecting the electric power tool 602 to an external power source with a power cable.

The electric power tool 602 of the present embodiment is configured to use the grinding wheel 58 as the end tool. The electric power tool 602 functions as a grinder.

According to the above configuration, it is possible to prevent the electric power tool 602 functioning as the grinder from being used while the side handle 16 is not gripped.

In the electric power tool 602 of the present embodiment, the housing 604 includes the motor housing 4 (an example of the grip). The user is able to use the electric power tool 602 with one hand gripping the motor housing 4 and the other hand gripping the side handle 16.

According to the above configuration, when using the electric power tool 602, the user can stably hold the electric power tool 602 by gripping the motor housing 4 with one hand and gripping the side handle 16 with the other hand.

Seventh Embodiment

Figure 38:
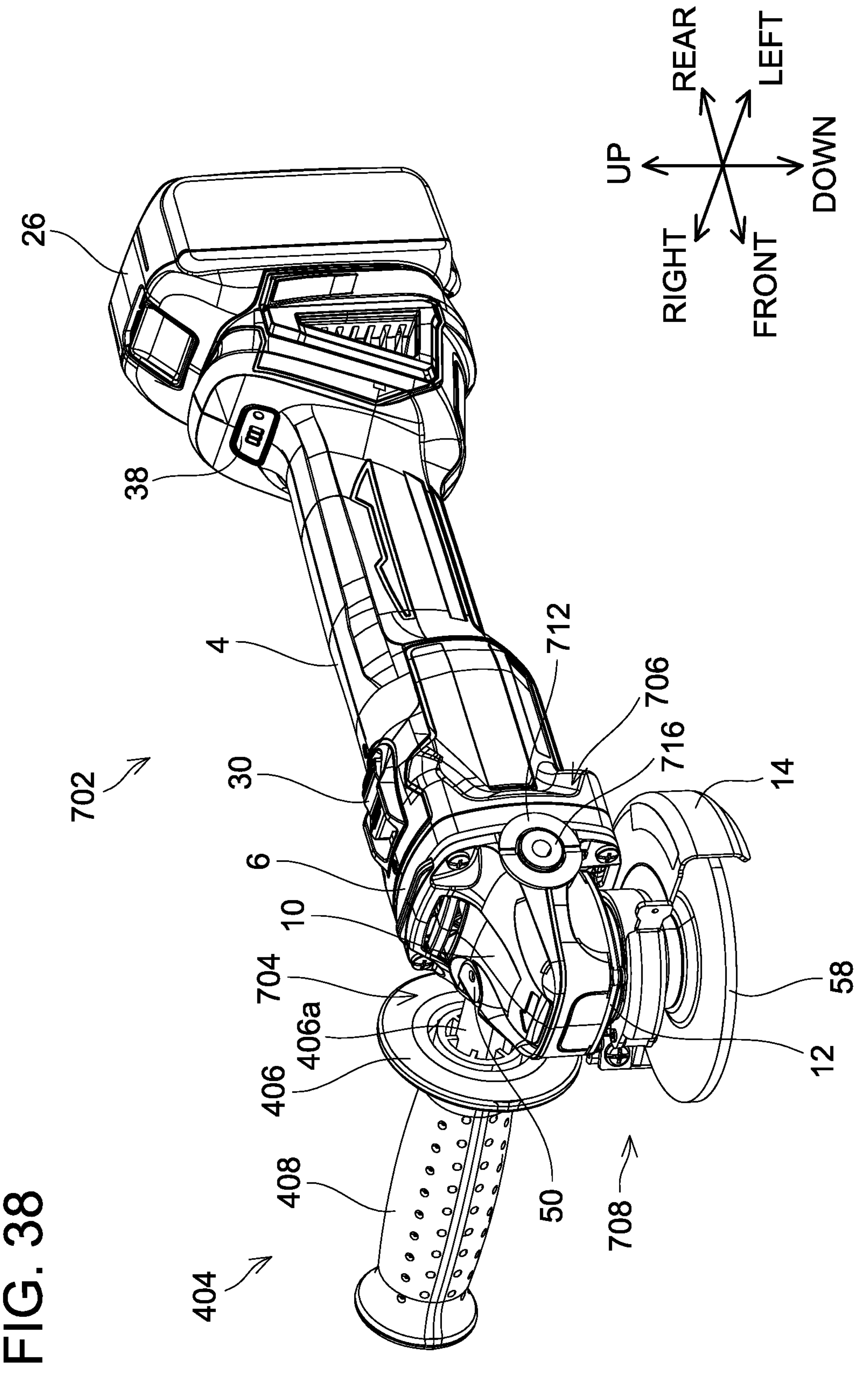
FIG. 38 illustrates a perspective view of an electric power tool 702 of a seventh embodiment viewed from the front left upper side.

As illustrated in FIG. 38, an electric power tool 702 of the present embodiment has a configuration substantially similar to the electric power tool 2 of the first embodiment. Hereinafter, points of the electric power tool 702 of the present embodiment different from the electric power tool 2 of the first embodiment will be described.

As with the electric power tool 402 of the fourth embodiment, in the electric power tool 702 of the present embodiment, the common side handle 404 that has been conventionally used is detachably attached to the gear housing 10 instead of the side handle 16. When the user uses the electric power tool 702, the user can stably hold the electric power tool 702 by gripping the motor housing 4 with one hand and gripping the side handle 404 with the other hand.

Figure 39:
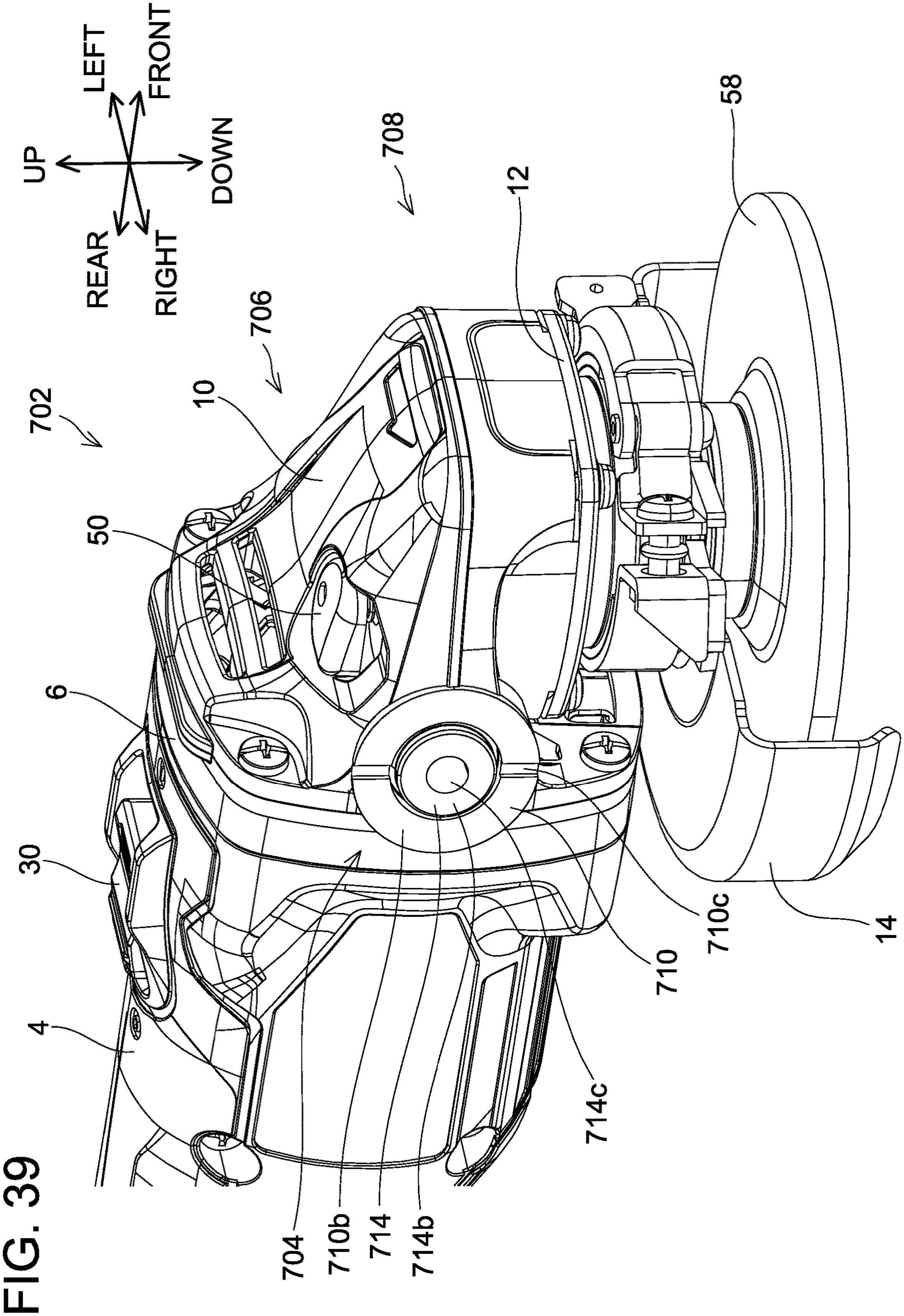
FIG. 39 illustrates a perspective view of a handle attachment portion 704 and its vicinity of the electric power tool 702 of the seventh embodiment viewed from the front right upper side.

As illustrated in FIGS. 38, 39, the electric power tool 702 of the present embodiment does not include the spacer housing 8, and the gear housing 10 is attached in front of the motor cover 6. Further, in the electric power tool 702 of the present embodiment, instead of the handle attachment portions 80, 82, handle attachment portions 704, 706 are disposed at the gear housing 10. In the present embodiment, the motor housing 4, the motor cover 6, the gear housing 10 and the bearing box 12 may collectively and simply be referred to as a housing 708. The handle attachment portion 704 is disposed at the right surface of the gear housing 10, and the handle attachment portion 706 is disposed at the left surface of the gear housing 10.

Figure 40:
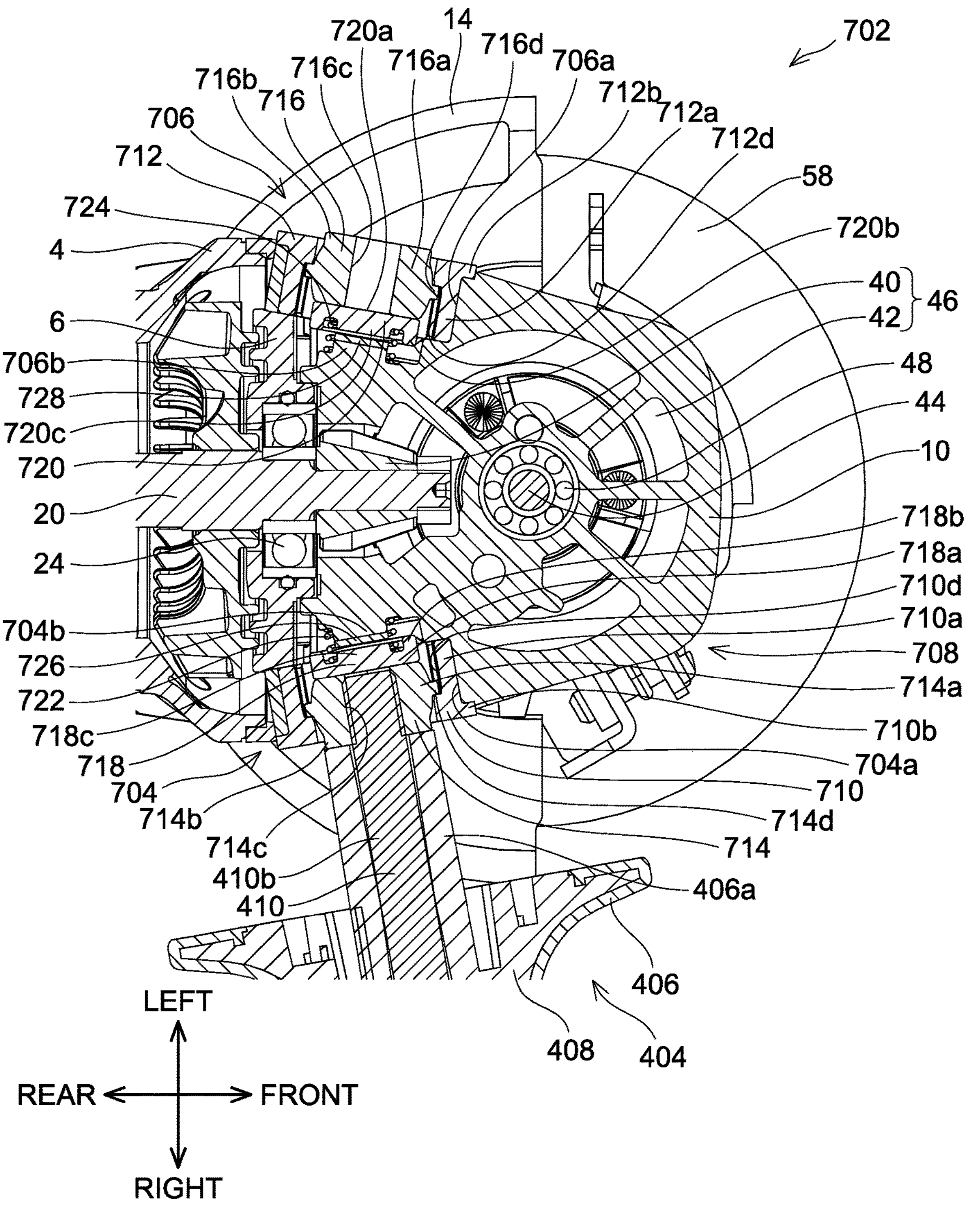
FIG. 40 illustrates a horizontal cross-sectional view of internal structures of the handle attachment portions 704, 706 and their vicinity in the electric power tool 702 of the seventh embodiment, in the state in which the side handle 404 is attached to the handle attachment portion 704 and the user has not swung the side handle 404 with respect to the gear housing 10.

As illustrated in FIG. 40, through holes 704*a*, 706*a* are defined in the handle attachment portions 704, 706. The through holes 704*a*, 706*a* penetrate the gear housing 10 from the outside to the inside, and internal threads are defined on their inner circumferential surfaces. Inside the gear housing 10, protrusions 704*b*, 706*b* are disposed. The protrusions 704*b*, 706*b* are disposed to face the through holes 704*a*, 706*a*, and protrude toward the through holes 704*a*, 706*a*. The handle attachment portions 704, 706 include holding members 710, 712, movable members 714, 716, contact members 718, 720, and compression springs 722, 724.

Figure 41:
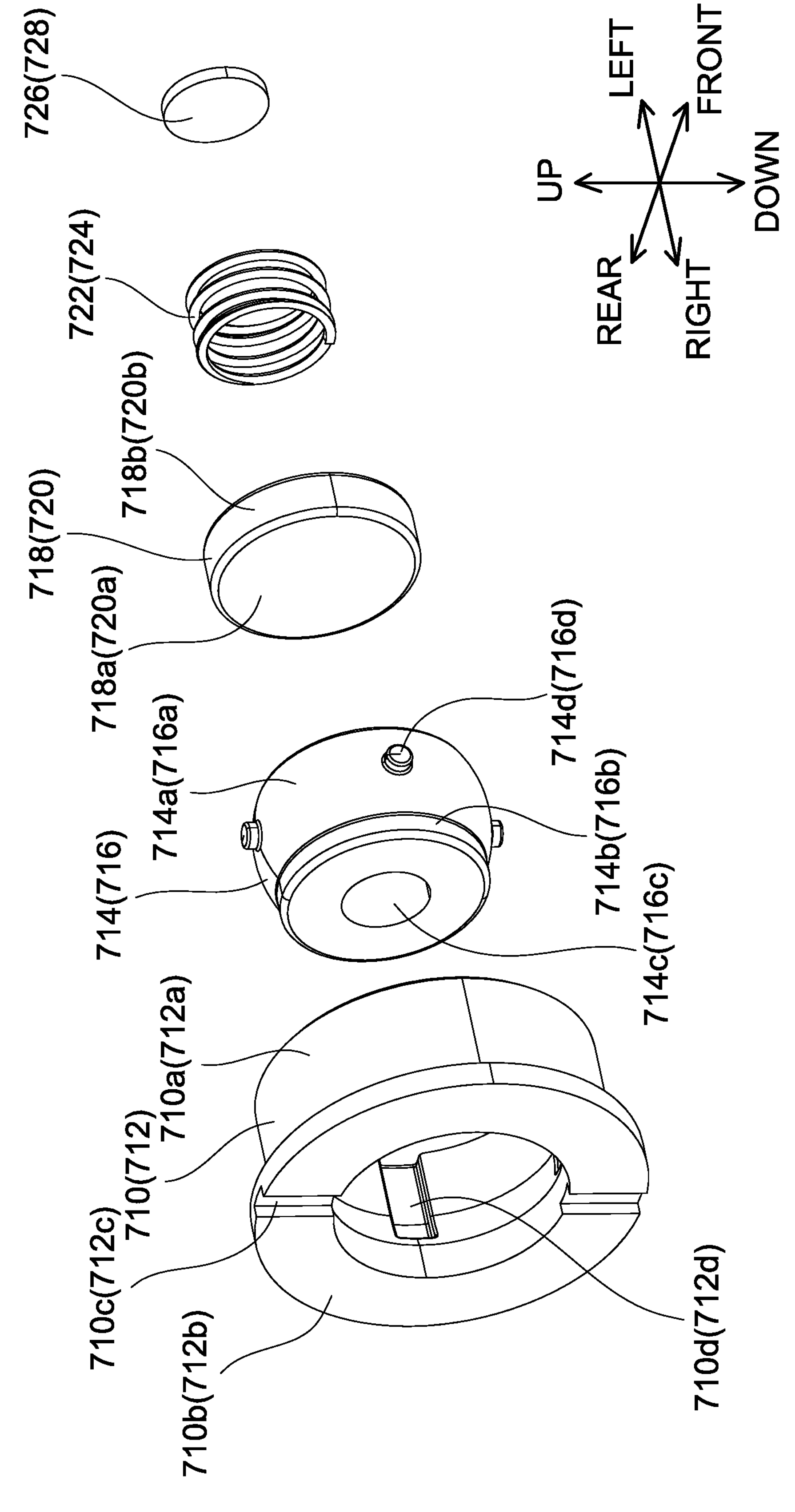
FIG. 41 illustrates an exploded perspective view of a positional relationship of holding members 710, 712, movable members 714, 716, contact members 718, 720, compression springs 722, 724, and detection sensors 726, 728 of the electric power tool 702 of the seventh embodiment, viewed from the front right upper side.
Figure 42:
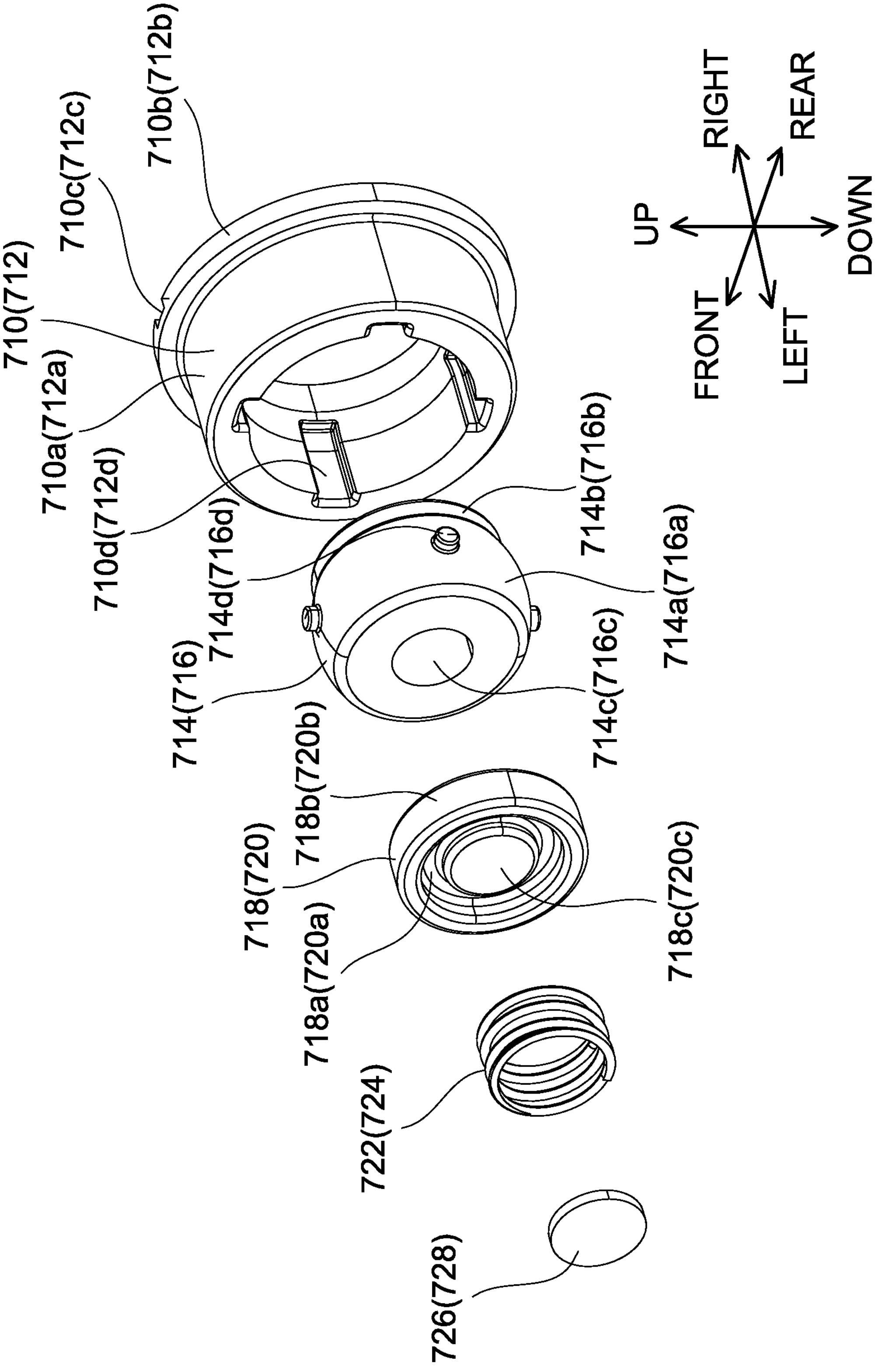
FIG. 42 illustrates an exploded perspective view of the positional relationship of the holding members 710, 712, the movable members 714, 716, the contact members 718, 720, the compression springs 722, 724, and the detection sensors 726, 728 of the electric power tool 702 of seventh embodiment, viewed from the rear left upper side.

As illustrated in FIG. 41, the holding members 710, 712 include cylindrical portions 710*a*, 712*a* formed into substantially cylindrical shapes and flange portions 710*b*, 712*b* projecting radially at the outer axial end of the cylindrical portions 710*a*, 712*a*. External threads corresponding to the internal threads of the through holes 704*a*, 706*a* of the gear housing 10 are defined on the outer circumferential surfaces of the cylindrical portions 710*a*, 712*a*. Grooves 710*c*, 712*c* that extend radially are defined on outer axial surfaces of the flange portions 710*b*, 712*b*. The holding members 710, 712 are fixed to the gear housing 10 by engaging an end of a fastening tool such as a driver with the grooves 710*c*, 712*c* and screwing the same onto the through holes 704*a*, 706*a* of the gear housing 10 from the outside. As illustrated in FIG. 42, a plurality of guide grooves 710*d*, 712*d* that extend axially from the inner axial ends of the cylindrical portions 710*a*, 712*a* are defined in the inner circumferential surfaces of the cylindrical portions 710*a*, 712*a*. The plurality of guide grooves 710*d*, 712*d* is arranged with a predetermined angle interval in the circumferential direction. In the present embodiment, four guide grooves 710*d*, 712*d* are arranged in cylindrical portions 710*a*, 712*a* with 90 degrees intervals in the circumferential direction.

As illustrated in FIG. 41, the movable members 714, 716 include barrel portions 714*a*, 716*a* having substantially barrel shapes with the central portions in the axial direction radially bulged, column portions 714*b*, 716*b* having substantially column shapes and protruding axially outward from the outer axial ends of the barrel portions 714*a*, 716*a*, through holes 714*c*, 716*c* axially penetrating the central portions of the barrel portions 714*a*, 716*a* and the central portions of the column portions 714*b*, 716*b*, and a plurality of guide protrusions 714*d* projecting radially from the central portions of the barrel portions 714*a*, 716*a* in the axial direction. The outer diameters of the barrel portions 714*a*, 716*a* and the outer diameters of the column portions 714*b*, 716*b* are slightly smaller than the inner diameters of the cylindrical portions 710*a*, 712*a* of the holding members 710, 712. Internal threads corresponding to the external thread of the bolt 410 of the side handle 404 are defined in the inner circumferential surfaces of the through holes 714*c*, 716*c*. The plurality of guide protrusions 714*d*, 716*d* is arranged corresponding to the plurality of guide grooves 710*d*, 712*d* of the holding members 710, 712. In the present embodiment, four guide protrusions 714*d*, 716*d* are disposed on the barrel portions 714*a*, 716*a* with 90 degrees interval in the circumferential direction. The movable members 714, 716 are attached to the holding members 710, 712 by inserting the same into the holding members 710, 712 from the inner axial side such that the plurality of guide protrusions 714*d*, 716*d* enters the plurality of guide grooves 710*d*, 712*d*.

As illustrated in FIG. 42, circumferential and radial sizes of the plurality of guide protrusions 714*d*, 716*d* are slightly smaller than circumferential and radial sizes of the plurality of guide grooves 710*d*, 712*d*. The plurality of guide protrusions 714*d*, 716*d* are configured to move axially within the plurality of guide grooves 710*d*, 712*d*. Therefore, the movable members 714, 716 are supported by the holding members 710, 712 such that the movable members 714, 716 can swing about any swing axis along a plane orthogonal to the axial direction. For example, the movable members 714, 716 are configured to swing with respect to the holding members 710, 712 in the direction in which the upper guide protrusions 714*d*, 716*d* move axially inward or outward with respect to the lower guide protrusions 714*d*,716*d*. Further, the movable members 714, 716 are also configured to swing with respect to the holding members 710, 712 in the direction in which the front guide protrusions 714*d*, 716*d* move axially inward or outward with respect to the rear guide protrusions 714*d*,716*d*. Furthermore, the movable members 714, 716 are also configured to swing with respect to the holding members 710, 712 in the direction in which the upper guide protrusions 714*d*, 716*d* move axially inward or outward with respect to the lower guide protrusions 714*d*, 716*d* and the front guide protrusions 714*d*, 716*d* move axially inward or outward with respect to the rear guide protrusions 714*d*, 716*d*. Further, the movable members 714, 716 are slidably supported by the holding members 710, 712 in the axial direction.

The contact members 718, 720 include disc portions 718*a*, 720*a* having substantially disc shapes, cylindrical portions 718*b*, 720*b* extending axially inward from the radial ends of the disc portions 718*a*, 720*a* and having substantially cylindrical shapes, column portions 718*c*, 720*c* protruding axially inward from the central portions of the disc portions 718*a*, 720*a* and having substantially column shapes.

As illustrated in FIG. 40, the compression springs 722, 724 are arranged such that the protrusions 704*b*, 706*b* of the gear housing 10 enter the inside at one end, and the column portions 718*c*, 720*c* of the contact members 718, 720 enter the inside at the other end. The compression springs 722, 724 bias the contact members 718, 720 axially outward with respect to the gear housing 10. The contact members 718, 720 are pressed against the movable members 714, 716 by the biasing force of the compression springs 722, 724.

The electric power tool 702 of the present embodiment includes detection sensors 726, 728 instead of the sensor units 84, 86. The detection sensors 726, 728 are disposed inside the gear housing 10. The detection sensor 726 is disposed corresponding to the handle attachment portion 704, and the detection sensor 728 is disposed corresponding to the handle attachment portion 706. The detection sensors 726, 728 are pressure sensors fixed to the end surfaces of the protrusions 704*b*, 706*b* of the gear housing 10. The detection sensors 726, 728 are connected to the control unit 28 (see FIG. 2).

As illustrated in FIG. 40, when the side handle 404 is to be attached to the handle attachment portion 704, the bolt 410 of the side handle 404 is screwed onto the through hole 714*c* of the movable member 714. Since the movable member 714 cannot rotate about the axial direction with respect to the holding member 710, thus by rotating the side handle 404 with respect to the gear housing 10, the bolt 410 of the side handle 404 can be screwed onto the through hole 714*c* of the movable member 714. Consequently, the side handle 404 is attached to the handle attachment portion 704. In the state in which the side handle 404 is merely attached to the handle attachment portion 704, the contact members 718, 720 are separated away from the detection sensors 726, 728 by the biasing force of the compression springs 722, 724. Therefore, the detection sensors 726, 728 do not detect the pressure and transmit the off signal to the control unit 28. In this case, the control unit 28 determines that the side handle 404 is not gripped by the user and prohibits the rotation of the motor 18.

Figure 43:
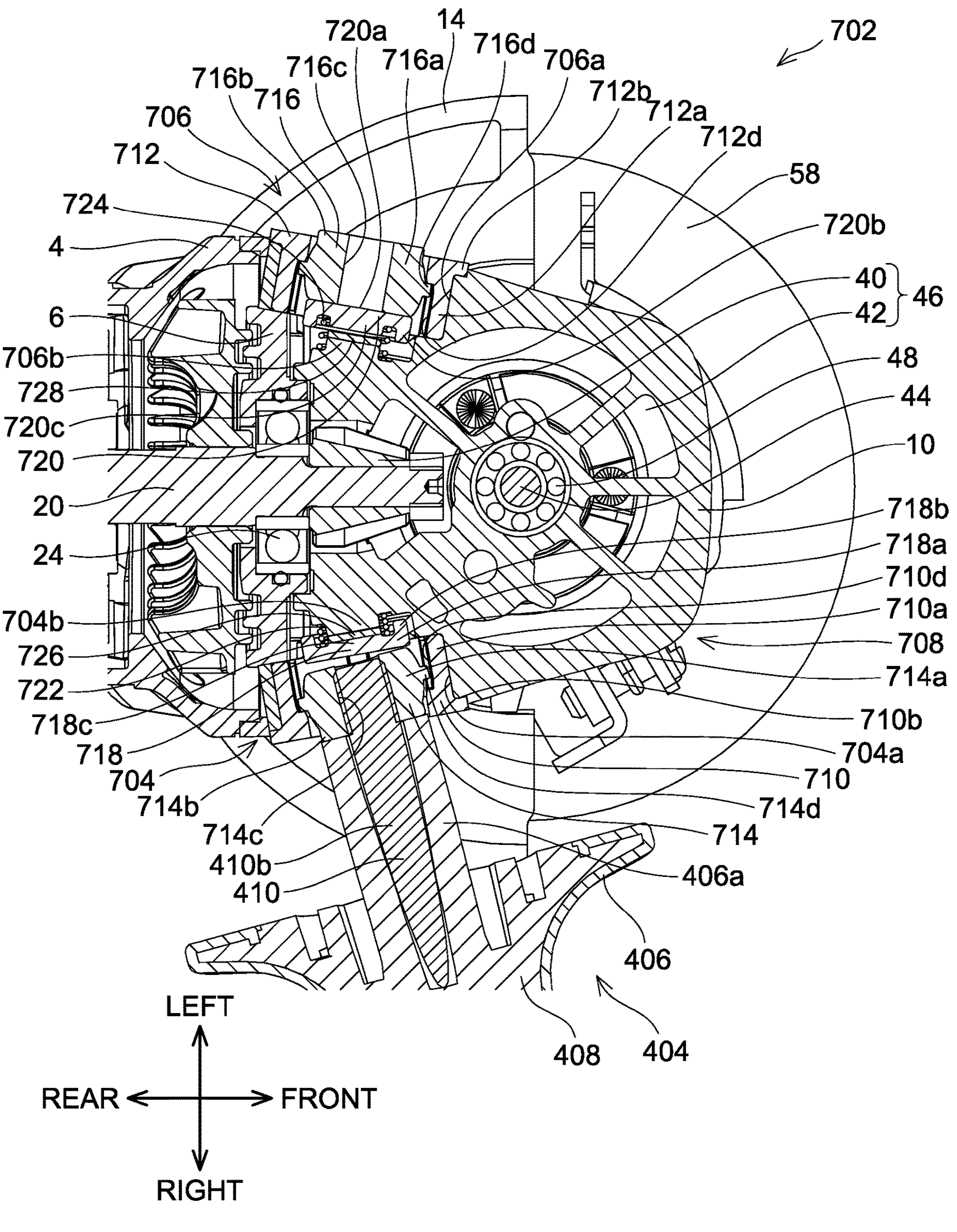
FIG. 43 illustrates a horizontal cross-sectional view illustrating inner structures of handle attachment portions 704, 706 and their vicinity in the electric power tool 702 of the seventh embodiment, in which the side handle 404 is attached to the handle attachment portion 704 and the user has swung the side handle 404 with respect to the gear housing 10.

As described above, the movable member 714 is configured to swing, with respect to the holding member 710, about any swing axis along the plane orthogonal to the axial direction. Therefore, the side handle 404 attached to the handle attachment portion 704 is also configured to swing about any swing axis along the plane orthogonal to the axial direction with respect to the gear housing 10. As illustrated in FIG. 40, when the user grips the side handle 404 and swings the side handle 404 in a desired direction with the side handle 404 attached to the handle attachment portion 704, the contact member 718 is pressed inward by the inner end of the movable member 714 as illustrated in FIG. 43. As a result, the contact member 718 moves inward against the biasing force of the compression spring 722, and the column portion 718*c* of the contact member 718 makes contact with the detection sensor 726. Therefore, the detection sensor 726 detects the pressure and transmits the on signal to the control unit 28. In this case, the control unit 28 determines that the side handle 404 is gripped by the user and allows rotation of the motor 18.

In the above description, the case in which the side handle 404 is attached to the handle attachment portion 704 is described, however, the same applies to the case in which the side handle 404 is attached to the handle attachment portion 706. The positions of the contact members 718, 720 when the contact members 718, 720 are separated away from the detection sensors 726, 728 may also referred to as separated positions, and the positions of the contact members 718, 720 when the contact members 718, 720 are in contact with the detection sensors 726, 728 may also be referred to as contact positions.

In the electric power tool 702 of the present embodiment, the holding members 710, 712 are fixed to the gear housing 10 by screwing the cylindrical portions 710*a*, 712*a* onto the through holes 704*a*, 706*a* of the gear housing 10. Therefore, due to engineering tolerance, variation can occur in a relative positional relationship between the plurality of guide grooves 710*d*, 712*d* and the gear housing 10 when the holding members 710, 712 are fixed to the gear housing 10. However, in the electric power tool 702 of the present embodiment, the movable member 714 is configured to swing, with respect to the holding member 710, about any swing axis along the plane orthogonal to the axial direction. With such a configuration, even if variation occurs in the relative positional relationship between the plurality of guide grooves 710*d*, 712*d* and the gear housing 10, the user can swing the side handle 404 in a desired direction.

In the electric power tool 702 of the present embodiment, the detection sensors 726, 728 only need to detect the movements of the contact members 718, 720 in response to the user swinging the side handle 404, thus the detection sensors 422, 424 may be detections sensers other than pressure sensors, such as touch sensors.

As described above, the electric power tool 702 of the present embodiment comprises: the motor 18; the bevel gear 46 (an example of the power transmission mechanism) connected to the motor 18; the housing 708 that houses the motor 18 and the bevel gear 46; the spindle 44 (an example of the end tool holder) to which the grinding wheel 58 (an example of the end tool) is configured to be attached and from which the grinding wheel 58 is configured to be detached, and connected to the bevel gear 46; and the side handle 404 (an example of the handle) attached to the housing 708. The electric power tool 702 is configured to prohibit rotation of the motor 18 when the user is not gripping the side handle 404.

According to the above configuration, since the rotation of the motor 18 is prohibited when the user is not gripping the side handle 404, it is possible to prevent the electric power tool 702 from being used while the side handle 404 is not gripped.

The electric power tool 702 of the present embodiment further comprises the contact members 718, 720 (examples of the intermediate member) configured to move between the separated positions (examples of the first position) and the contact positions (examples of the second position). The contact members 718, 720 are in the separated positions when the user is not gripping the side handle 404, and move from the separated positions to the contact positions in response to the manipulation performed by the user while the user is gripping the side handle 404. The electric power tool 402 is configured to prohibit the rotation of the motor 18 when the contact members 718, 720 are in the separated positions, and allow the rotation of the motor 18 when the contact members 718, 720 are in the contact positions.

According to the above configuration, the rotation of the motor 18 can be prohibited when the user is not gripping the side handle 404, and the rotation of the motor 18 can be allowed in response to the manipulation performed by the user while the user is gripping the side handle 404.

The electric power tool 702 of the present embodiment further comprises: the control unit 28 configured to control an operation of the motor 18; and the detection sensors 726, 728 connected to the control unit 28 and configured to detect movements of the contact members 718, 720. The control unit 28 is configured to prohibit the rotation of the motor 18 when the detection sensors 726, 728 do not detect that the contact members 718, 720 have moved from the separated positions to the contact positions, and allow the rotation of the motor 18 when the detection sensors 726, 728 detect that the contact members 718, 720 have moved from the separated positions to the contact positions.

According to the above configuration, since the state in which the rotation of the motor 18 is prohibited and the state in which the rotation of the motor 18 is allowed are switched in the control unit 28, it is possible to further simplify the mechanical configuration of the electric power tool 702.

In the electric power tool 702 of the present embodiment, the detection sensors 726, 728 are non-contact type detection sensors. The contact members 718, 720 press the detection sensors 726, 728 when the contact members 718, 720 are in the contact positions. The contact members 718, 720 do not press the detection sensors 726, 728 when the contact members 718, 720 are in the separated positions.

According to the above configuration, it is possible to further simplify the configuration of an electric system of the electric power tool 702.

In the electric power tool 702, the contact members 718, 720 are slidably supported by the housing 708. The electric power tool 702 further comprises: the movable members 714, 716 (examples of the relay member) swingably supported by the housing 708; and the compression springs 722, 724 (examples of the bias member) that bias the movable members 714, 716 in the direction to press the contact members against the movable members 714, 716. The side handle 404 is fixed to the movable members 714, 716. The movable members 714, 716 swing and the contact members 718, 720 slide from the separated position to the contact position by the user swinging the side handle 404 with respect to the housing 708.

According to the above configuration, with a simple configuration, it is possible to prohibit the rotation of the motor 18 when the user is not gripping the side handle 404, and it is possible to allow the rotation of the motor 18 when the user has swung the side handle 404 by gripping the side handle 404.

In the electric power tool 702 of the present embodiment, the movable members 714, 716 are swingably supported by the housing 708 about the first swing axis and the second swing axis orthogonal to the first swing axis.

According to the above configuration, the user can move the contact members 718, 720 from the separated positions to the contact positions by swinging the side handle 404 in a desired direction.

The electric power tool 702 of the present embodiment further comprises the battery 26 detachably attached to the housing 708 and configured to supply power to the motor 18.

According to the above configuration, it is possible to supply power to the motor 18 without connecting the electric power tool 702 to an external power source with a power cable.

The electric power tool 702 of the present embodiment is configured to use the grinding wheel 58 as the end tool. The electric power tool 702 functions as a grinder.

According to the above configuration, it is possible to prevent the electric power tool 702 functioning as the grinder from being used while the side handle 404 is not gripped.

In the electric power tool 702 of the present embodiment, the housing 708 includes the motor housing 4 (an example of the grip). The user is able to use the electric power tool 702 with one hand gripping the motor housing 4 and the other hand gripping the side handle 404.

According to the above configuration, when using the electric power tool 702, the user can stably hold the electric power tool 702 by gripping the motor housing 4 with his/her one hand and gripping the side handle 404 with the other hand.

(Variants)

In the above embodiments, the cases in which the electric power tools 2, 202, 302, 402, 502, 602 are grinders, the power transmission mechanism is the bevel gear 46, the end tool is the grinding wheel 58, the end tool holder is the spindle 44, the grip is the motor housing 4, and the handle is the side handles 16, 204, 304, 404 have been described. Different from this, the electric power tools 2, 202, 302, 402, 502, 602 may be other types of electric power tools, such as drill drivers or hammer drills. Further, the power transmission mechanism may also be another type of power transmission mechanism, the end tool may be another type of accessory tool, the end tool holder may be another type of end tool holder, the grip may be another type of grip, and the handle may be another type of handle.

In the above embodiments, the configurations in which the electric power tools 2, 202, 302, 402, 502, 602 are each powered from the battery 26 configured to be attached to and detached from the housings 60, 310, 416, 504, 604 have been described. Different from this, the electric power tools 2, 202, 302, 402, 502, 602 may be configured to be powered from external power sources via power cables.

What is claimed is:

1. An electric power tool comprising:

a motor;

a power transmission mechanism connected to the motor;

a housing that houses the motor and the power transmission mechanism;

an end tool holder to which an end tool is configured to be attached and from which the end tool is configured to be detached, and connected to the power transmission mechanism;

a handle attached to the housing;

an intermediate member configured to move between a first position and a second position;

a control unit configured to control an operation of the motor; and a detection sensor connected to the control unit and configured to detect a movement of the intermediate member, wherein the intermediate member is in the first position when the user is not gripping the handle, and moves from the first position to the second position in response to a manipulation performed by the user while the user is gripping the handle, the detection sensor is disposed inside the housing, and the control unit is configured to prohibit the rotation of the motor when the detection sensor does not detect that the intermediate member has moved from the first position to the second position, and allow the rotation of the motor when the detection sensor detects that the intermediate member has moved from the first position to the second position.

2. The electric power tool according to claim 1, wherein the detection sensor is a non-contact type detection sensor.

3. The electric power tool according to claim 2, wherein the detection sensor and the intermediate member are disposed in the housing, and the handle further comprises a relay member that moves the intermediate member from the first position to the second position in conjunction with a manipulation performed by the user while the user is gripping the handle.

4. The electric power tool according to claim 2, wherein the detection sensor comprises a light emitting element and a light receiving element corresponding to the light emitting element.

5. The electric power tool according to claim 4, wherein the light emitting element and the light receiving element are arranged to face each other;

the intermediate member is positioned between the light emitting element and the light receiving element when the intermediate member is in one of the first position and the second position, and the intermediate member is not positioned between the light emitting element and the light receiving element when the intermediate member is in the other of the first position and the second position.

6. The electric power tool according to claim 4, wherein the light emitting element and the light receiving element are arranged to be oriented in a same direction, light emitted by the light emitting element is reflected by the intermediate member and received by the light receiving element when the intermediate member is in one of the first position and the second position, and the light emitted by the light emitting element is not received by the light receiving element when the intermediate member is in the other of the first position and the second position.

7. The electric power tool according to claim 1, wherein the detection sensor is a contact type detection sensor, the intermediate member presses the detection sensor when the intermediate member is in one of the first position and the second position, and the intermediate member does not press the detection sensor when the intermediate member is in the other of the first position and the second position.

8. The electric power tool according to claim 7, wherein the intermediate member is swingably supported by the housing, the handle is fixed to the intermediate member, and the intermediate member swings from the first position to the second position by the user swinging the handle with respect to the housing.

9. The electric power tool according to claim 7, wherein the intermediate member is slidably supported by the housing,
the electric power tool further comprises:
a relay member swingably supported by the housing; and
a bias member that biases the intermediate member in a direction to press the intermediate member against the relay member,
the handle is fixed to the relay member, and
the relay member swings and the intermediate member slides from the first position to the second position by the user swinging the handle with respect to the housing.

10. The electric power tool according to claim 9, wherein the relay member is swingably supported by the housing about a first swing axis and a second swing axis orthogonal to the first swing axis.

11. The electric power tool according to claim 1, wherein the handle comprises:
a handle body; and
a handle manipulation member disposed on the handle body and configured to be manipulated by the user, and
the intermediate member moves from the first position to the second position in conjunction with a manipulation to the handle manipulation member by the user.

12. The electric power tool according to claim 11, wherein one of the handle and the housing comprises an insertion pin having a non-circular shape;
the other of the handle and the housing comprises an insertion hole that accepts the insertion pin such that the insertion pin is unable to rotate, and
the electric power tool further comprises a lock member that prevents the insertion pin from coming out of the insertion hole.

13. The electric power tool according to claim 1, further comprising a battery detachably attached to the housing and configured to supply power to the motor.

14. The electric power tool according to claim 1, that is configured to use a grinding wheel as the end tool and configured to function as a grinder.

15. The electric power tool according to claim 1, wherein the housing includes a grip, and
the electric power tool is configured to be used by the user with one hand gripping the grip and the other hand gripping the handle.

16. An electric power tool comprising:
a motor;
a power transmission mechanism connected to the motor;
a housing that houses the motor and the power transmission mechanism;
an end tool holder to which an end tool is configured to be attached and from which the end tool is configured to be detached, and connected to the power transmission mechanism;
a handle attached to the housing;
an intermediate member configured to move between a first position and a second position; and
a main manipulation member configured to move between an on position and an off position according to a manipulation by the user,
wherein the electric power tool is configured to rotate the motor when the main manipulation member is in the on position and stop the rotation of the motor when the main manipulation member is in the off position,
the intermediate member is in the first position when the user is not gripping the handle, and moves from the first position to the second position in response to a manipulation performed by the user while the user is gripping the handle, and
a movement of the main manipulation member from the off position to the on position is prohibited when the intermediate member is in the first position and the movement of the main manipulation member from the off position to the on position is allowed when the intermediate member is in the second position.

* * * * *